(12) United States Patent
Kim et al.

(10) Patent No.: US 11,309,613 B2
(45) Date of Patent: Apr. 19, 2022

(54) ORGANIZED NANOPARTICULATE AND MICROPARTICULATE COATINGS AND METHODS OF MAKING AND USING SAME

(71) Applicant: Cornell University, Ithaca, NY (US)

(72) Inventors: Mun Sek Kim, Seoul (KR); Snehashis Choudhury, Kolkata (IN); Lin Ma, Ithaca, NY (US); Lynden A. Archer, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 67 days.

(21) Appl. No.: 16/060,779

(22) PCT Filed: Dec. 12, 2016

(86) PCT No.: PCT/US2016/066144
§ 371 (c)(1),
(2) Date: Jun. 8, 2018

(87) PCT Pub. No.: WO2017/100758
PCT Pub. Date: Jun. 15, 2017

(65) Prior Publication Data
US 2018/0309109 A1 Oct. 25, 2018

Related U.S. Application Data

(60) Provisional application No. 62/265,539, filed on Dec. 10, 2015.

(51) Int. Cl.
*H01M 50/449* (2021.01)
*H01M 4/139* (2010.01)
(Continued)

(52) U.S. Cl.
CPC ........ *H01M 50/449* (2021.01); *B01D 71/021* (2013.01); *B01D 71/027* (2013.01); *C02F 1/44* (2013.01); *H01G 11/28* (2013.01); *H01G 11/36* (2013.01); *H01G 11/38* (2013.01); *H01G 11/46* (2013.01); *H01G 11/52* (2013.01);
(Continued)

(58) Field of Classification Search
None
See application file for complete search history.

(56) References Cited

U.S. PATENT DOCUMENTS 6,284,310 B2   9/2001  Picard
2010/0092809 A1*  4/2010  Drzal .................. H01M 4/8882
                                              429/413
(Continued)

FOREIGN PATENT DOCUMENTS

CN      1425707 A    6/2003
CN    101376599 A    3/2009

*Primary Examiner* — Wyatt P McConnell
(74) *Attorney, Agent, or Firm* — Johnson, Marcou, Isaacs & Nix LLC; Paul J. Roman, Jr.

(57) ABSTRACT

Organized materials on a substrate. The organized materials are monolayer(s) of close-packed nanoparticles and/or microparticles. The organized materials can be formed by transfer of one or more monolayers to a substrate from a coating composition on which a monolayer of close-packed nanoparticles and/or microparticles is formed. Organized materials on a substrate can be used in devices such as, for example, batteries, capacitors, and wearable electronics.

35 Claims, 60 Drawing Sheets

(51) Int. Cl.
*H01M 4/13* (2010.01)
*H01G 11/46* (2013.01)
*H01G 11/28* (2013.01)
*H01G 11/36* (2013.01)
*H01G 11/86* (2013.01)
*H01G 11/38* (2013.01)
*H01M 50/403* (2021.01)
*H01M 50/411* (2021.01)
*H01M 50/431* (2021.01)
*B01D 71/02* (2006.01)
*C02F 1/44* (2006.01)
*H01G 11/52* (2013.01)
*H01G 11/84* (2013.01)

(52) U.S. Cl.
CPC .............. *H01G 11/86* (2013.01); *H01M 4/13* (2013.01); *H01M 4/139* (2013.01); *H01M 50/403* (2021.01); *H01M 50/411* (2021.01); *H01M 50/431* (2021.01); *C02F 2305/08* (2013.01); *H01G 11/84* (2013.01)

(56) References Cited

U.S. PATENT DOCUMENTS

| | | |
|---|---|---|
| 2011/0027599 A1 | 2/2011 | Hoek et al. |
| 2011/0033746 A1 | 2/2011 | Liu et al. |
| 2011/0229759 A1 | 9/2011 | Yazami et al. |
| 2011/0284456 A1 | 11/2011 | Brozell |
| 2013/0142677 A1* | 6/2013 | Snyder .................... C02F 1/008 417/357 |
| 2013/0146521 A1* | 6/2013 | Brozell .................... C02F 1/44 210/259 |
| 2014/0017550 A1 | 1/2014 | Wang et al. |
| 2014/0319044 A1 | 10/2014 | Giannelis et al. |
| 2015/0318532 A1 | 11/2015 | Manthiram et al. |

* cited by examiner a b a b

After 100th Discharge

Cross Sectional

Top View

ORGANIZED NANOPARTICULATE AND MICROPARTICULATE COATINGS AND METHODS OF MAKING AND USING SAME

CROSS REFERENCE TO RELATED APPLICATIONS

This application claims priority to U.S. Provisional Application No. 62/265,539, filed on Dec. 10, 2015, the disclosure of which is hereby incorporated by reference.

STATEMENT REGARDING FEDERALLY SPONSORED RESEARCH

This invention was made with government support under contract nos. IIP-1237622 awarded by the National Science Foundation Partnerships for Innovation Program, DMR-1120296 awarded by the National Science Foundation, and DE-AR0000750 awarded by the Department of Energy. The government has certain rights in the invention.

FIELD OF THE DISCLOSURE

The disclosure generally relates to organized layers of nanoparticles and/or microparticles. More particularly, the disclosure generally relates to use of monolayers of organized nanoparticles and/or microparticles in devices.

BACKGROUND OF THE DISCLOSURE

The Langmuir-Blodgett (LB) technique is a powerful, widely used method for preparing coatings of amphiphilic molecules at air/water interfaces with thickness of one molecule. The method is attractive for a variety of reasons, including its ability to precisely control the thicknesses of coatings down to molecular dimensions, for the versatility of substrates that can be coated, and for its scalability. Ever since its discovery in the 1920s and its rise in popularity following Irving Langmuir's receipt of the Nobel prize in chemistry in 1932, it has been applied in numerous fields of science and technology. With LB assembly it is now possible to produce monolayers of colloidal films composed of particles of various sizes and shapes, which may be used for tuning film properties and for coating applications to create thin film devices.

Electrochemical energy storage systems that are cost-effective, safe, environmentally-friendly and possess long cycle/shelf-life are needed in multiple fields of technology, including transportation, portable devices, robotics, and power generation from intermittent sources. Currently, Li-ion (150 Wh $kg^{-1}$) and Li-ion-polymer (180 Wh $kg^{-1}$) batteries are the most promising storage platforms for many applications. It is understood however that the intercalation-based cathodes used in these technologies provide limited opportunities for the sort of advancement in specific energy required to keep pace with growing demand. Replacing cathodes with conversion materials such as sulfur, oxygen, or carbon-dioxide, removes these limitations, but introduce new challenges associated with dissolution, transport, and parasitic reactions between battery anodes and redox products in cathodes. Lithium-sulfur (Li—S) battery is the most studied and arguably the most promising candidate for commercial use for at least three reasons: i) The Li—S battery offers tenfold higher energy storage capacity (Specific capacity 1675 mAh $g^{-1}$ and Theoretical energy density 2600 Wh $kg^{-1}$) than any of the commercial Li-ion batteries; ii) sulfur is earth abundant and inexpensive (\$0.02 g $sulfur^{-1}$), leading to low cost high-energy batteries; iii) sulfur is environmentally benign, reacts spontaneously and reversibly with lithium. Despite these benefit, Li—S cells suffer from poor cycling efficiency and short lifetimes stemming from the complex solution chemistry of lithium sulfide and lithium polysulfide (LiPS) products from the cathode. The most successful efforts have been devoted to cathode configurations/materials to provide physical confinement and chemical adsorption for LiPS to prevent its dissolution and uncontrolled redox reaction with lithium metal.

Membranes able to regulate diffusion of cathode products, without compromising ion transport between anode and cathode provide a means for controlling LiPS loss from the cathode and for preventing shuttling in the Li—S cells. For instance, carbon and ceramic coatings on the porous separator using slurry/tape casting methods have been argued to provide a mechanism for blocking passage of LiPS to the anode, while providing a mechanism for electrochemical utilization and adsorption of the LiPS during the cycle. A persistent challenge has been how to implement these changes in a practical Li—S cell, where the mass of inactive material required for stable operation is already a serious concern. Such membranes are also broadly applicable in batteries based on conversion cathodes (e.g. $O_2$ & $CO_2$) and liquid electrolytes to regulate transport of species generated in the cathode to the anode where they would react parasitically with the anode.

Batteries such as the Li—S cell that use reactive metals, such as lithium (Li), sodium (Na), aluminum (Al), silicon (Si), zinc (Zn), or tin (Sn), as the anode offer significant improvements in anode storage capacity, cost, and portability relative to commonly used graphite or hard carbon anodes. Unfortunately uncontrolled reaction between the reactive metal anode and electrolyte depletes the anode and increases the cell resistance over time, compromising performance and lifetime.

The development of a practical Li—S rechargeable battery has been hindered by fundamental problems associated with multiple transport and thermodynamics. First, sulfur suffers from poor electrical conductivity ($5 \times 10^{-30}$ S $cm^{-1}$ at R.T.) and produces a discharge product ($Li_2S$) that has an insulating characteristic. Second, the volume of sulfur increases by ~80% when it is fully lithiated. Furthermore, the redox reaction product, $Li_2S$, is always accompanied by the formation of various intermediate lithium polysulfides (LPS=$Li_2S_n$, 2≤n≤8), which leads to challenges in active material loss and reutilization. LPS are highly soluble in organic electrolytes and therefore cause the loss of active materials in the cathode. Once in the electrolyte, the LPS species can diffuse through the separator and reach the Li anode, establishing an internal shuttling pathway between the lithium anode and sulfur cathode. During this process, the active materials in both electrodes are continuously consumed by the LPS reacting with the Li metal. As a result, rapid capacity fading, poor cycling lifetime, and low coulombic efficiency are observed in the Li—S battery.

To resolve the issue of dissolution and shuttling, efforts are mostly devoted to the design of the cathode. Different nanoengineered carbons are applied to the cathode as conductive additives and as to function as a physical barrier that hinders the dissolution of the LPS. Examples of such nanoengineered carbons include porous carbon, carbon nanotubes and graphite sheets. Other strategies include incorporating metal oxide additives, such as $SiO_2$, $Al_2O_3$, and $TiO_2$, into the cathode as sorbents for the LPS, or applying polymer coatings on the cathode as an additional barrier. On the anode side, $LiNO_3$ is found to be very effective in protecting the Li metal anode as it provides a protective layer on the metal surface. However, not much attention is paid to the design or modification of the separator, which is also a very important component of the Li—S battery. Despite the efforts put into the sequester of the LPS by the cathode design, there is always a certain amount of LPS dissolved in the electrolyte due to the chemical potential equilibrium of the LPS in the electrolyte and the cathode. Some part of the LPS will be adsorbed and trapped in the pores of the separator, and become unusable due to the insulating property of the separator.

At the anode, uneven deposition of lithium during battery recharge poses a major technological challenge. Uneven deposition leads to the formation of metallic protrusions that grow and eventually short circuit the cell by piercing the separator. This is a major safety concern because such a short circuit can produce heat and sparks that may ignite the electrolyte that is comprised of a flammable organic liquid. Continuous reaction between the Lithium metal and liquid electrolyte poses entirely different challenges. In each successive charge and discharge cycle, the protective film on the Lithium anode, so called the Solid Electrode Interface (SEI), breaks down, and a new layer is formed by the reaction of the electrolyte with the exposed Lithium. Such unwanted processes lead to the continuous degradation of the electrolyte and the formation of insulating species inside the battery, thus compromising battery capacity. A proposed method for dealing with such shortcomings is the modification of the metal battery's separator surface by adding a thin layer of a desired material that can impede dendrite growth.

Over the years, various coating methods (tape-casting, vacuum filtration, spin-coating, screen-printing, etc.) have been discovered for coating a film of conductive carbons, functional metal oxides, and polymers on the separator; however, these methods are still not perfectly suitable for separator coating. More recently, related work on a nanocomposite structure coating of a carbon and metal oxide mixture on a porous polymer membrane and LS cathode to alleviate LPS shuttling was described. In this case, the nanocomposite structure coating was created by a laser pulse deposition, a method that requires advanced tools and involves complex procedures. Similarly, the current coating methods from existing literatures require a chemical binder, unreliable thickness control, and complicated coating procedures. These features result in an unnecessary amount of coating materials, an unadoptable optimization of coating thickness for various battery systems, and a low utilization rate of the electrochemically active area of the coating materials.

SUMMARY OF THE DISCLOSURE

The present disclosure provides organized materials. The present disclosure also provides methods of making organized material layers and uses of the organized material layers.

In an aspect, the present disclosure provides organized materials. The organized materials can be one or more monolayers disposed on a substrate. By "organized materials" it is meant that monolayer of the materials (e.g., nanoparticles and/or microparticles) adopt a close packed structure. In an example, the organized material comprises one or more monolayers of nanoparticles and/or microparticles disposed on at least a surface of a substrate, and each monolayer of the layer is a close-packed arrangement of the nanoparticles and/or microparticles.

In an aspect, the present disclosure provides methods of making one or more organized material layer on a substrate. The methods are based on contacting a substrate with a coating composition which provides a monolayer of organized material that can be transferred to the substrate.

In an example, a method of making an organized material on a substrate, where the organized material comprises one or more monolayers of nanoparticles disposed on at least a surface of a substrate and each monolayer of the layer is a close-packed arrangement of the nanoparticles (e.g., an organized material of the present disclosure), comprises: a) providing a coating composition comprising a monolayer of organized nanoparticles disposed on a liquid material (e.g. water, amides, aprotic carbonates, ethers, hydrocarbons, ionic liquids, dimethyl sulfoxide, siloxanes, sulfones) and b) transferring the monolayer of organized nanoparticles to the substrate, where the organized material on the substrate is formed.

In an aspect, the present disclosure provides devices. The devices comprise at least one organized material on a substrate, where the organized material comprises one or more monolayers of nanoparticles disposed on at least a surface of a substrate and each monolayer of the layer is a close-packed arrangement of the nanoparticles, (e.g., an organized material of the present disclosure). Examples of devices include, but are not limited to, batteries, supercapacitors, and wearable electronics, and water filtration apparatuses.

BRIEF DESCRIPTION OF THE FIGURES

For a fuller understanding of the nature and objects of the disclosure, reference should be made to the following detailed description taken in conjunction with the accompanying figures.

DETAILED DESCRIPTION OF THE DISCLOSURE

Figure 1:
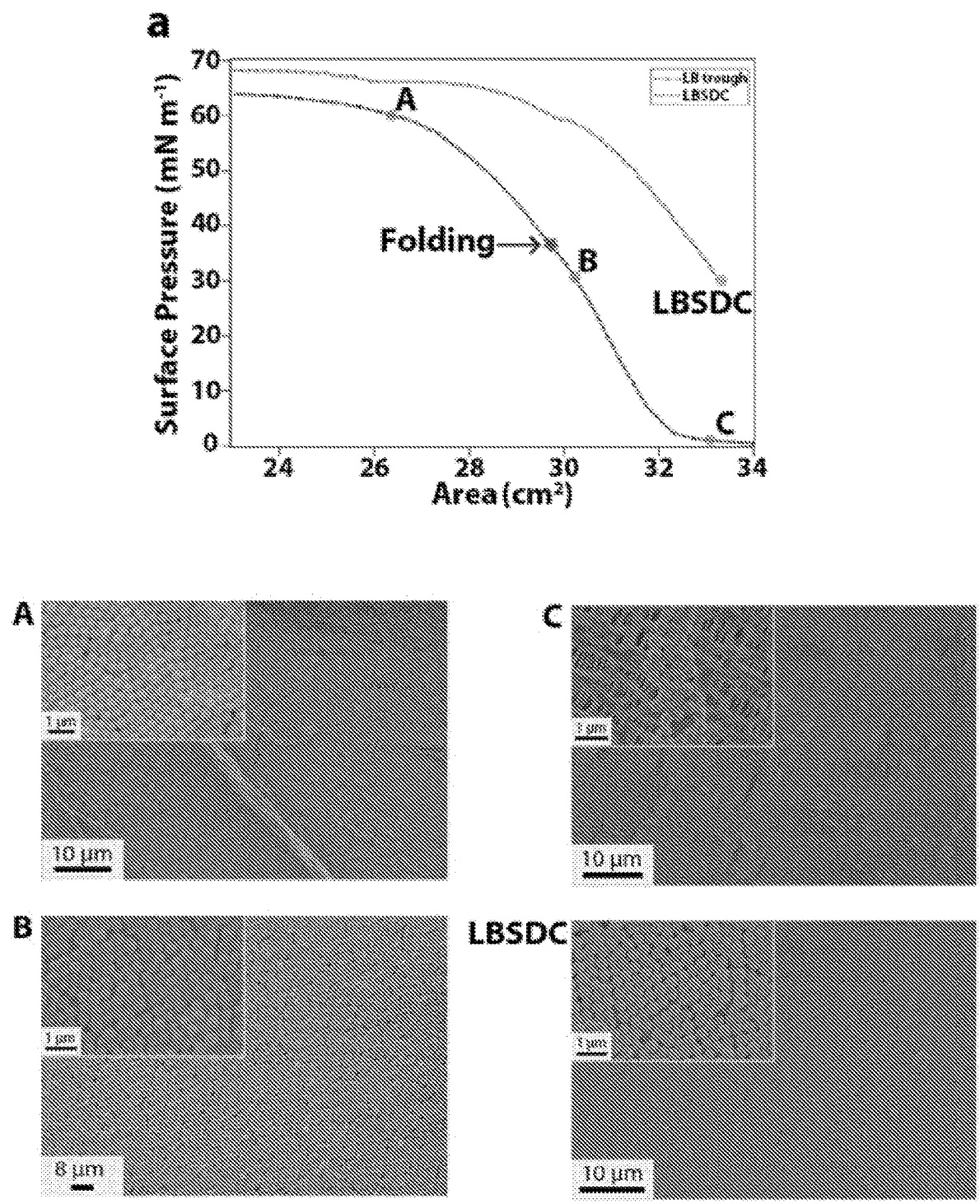
FIG. 1 shows Langmuir-Blodgett surface pressure profiles and corresponding coating qualities of silica nanospheres and MWCNTs at designated surface pressures. (a) Silica nanosphere surface pressure profiles of conventional LB trough and LBSDC methods with SEM images of the coating qualities at 60 mN m$^{-1}$, 33 mN m$^{-1}$, and 2 mN m$^{-1}$. (b) MWCNT surface pressure profiles of conventional LB trough and LBS methods with SEM images of the coating qualities at 61 mN m$^{-1}$, 37 mN m$^{-1}$, and 1 mN m$^{-1}$.
Figure 1:
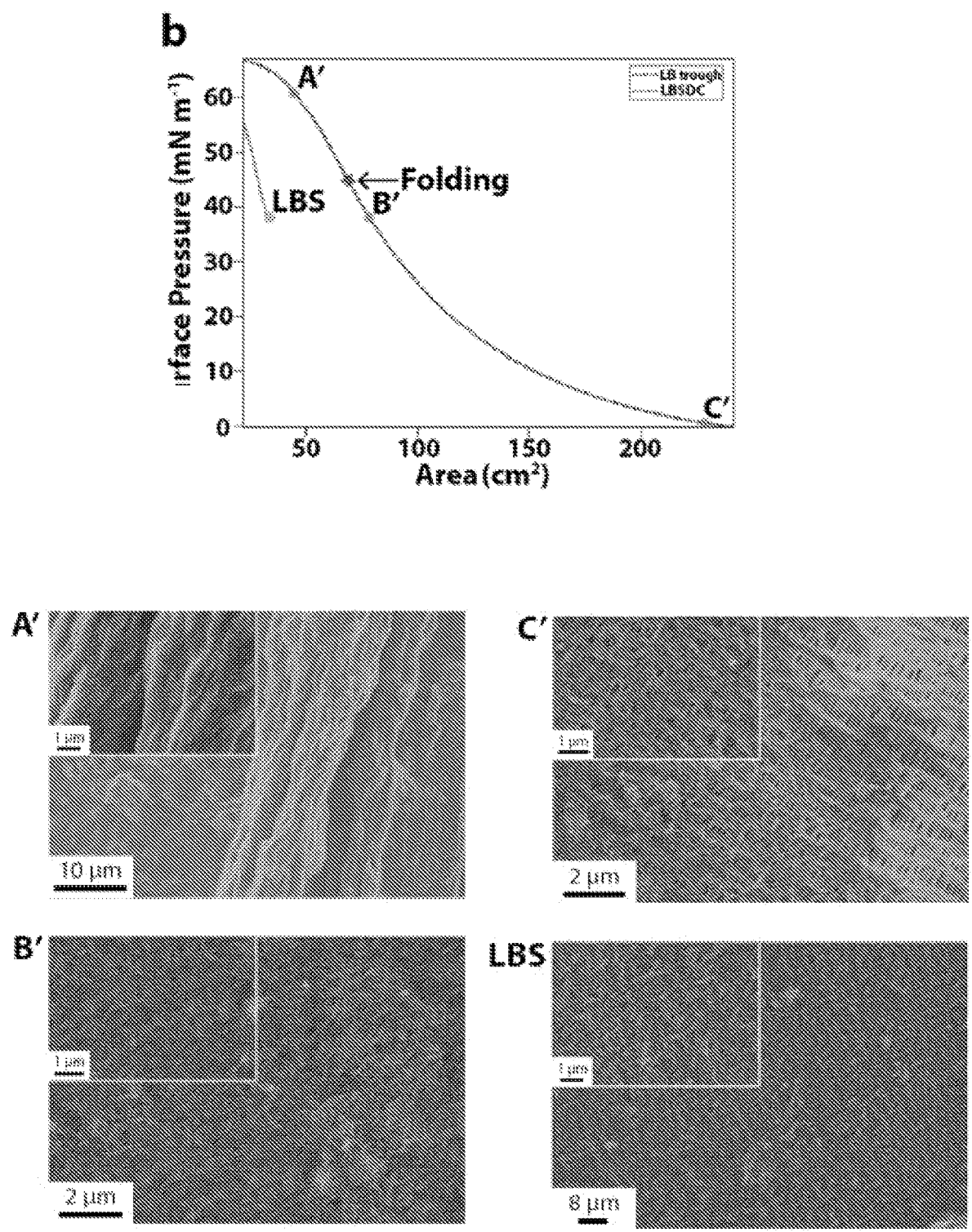

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

The present disclosure provides organized materials. The present disclosure also provides methods of making organized material layers and uses of the organized material layers.

This disclosure presents methods that can coat diverse forms and selections of nanomaterials and/or micromaterials on, for example, a conventional separator in a layer-by-layer fashion without utilizing chemical binders for lithium sulfur or lithium metal batteries. The Langmuir Blodgett (LB) film technique was used to form a particle-size monolayer on a surface of liquid media, and the resulting monolayer is coated on a solid substrate by, for example, a simple dip coating method.

For example, a monolayer of various nanomaterials, including nanospheres, nanopowders, nanofibers, and polymer powders, can be finely coated on a separator with two methods: the Langmuir Blodgett Sequential Dip Coating (LBSDC) method and the Langmuir Blodgett Scooping (LBS) method. The entire coating process can be managed by hand, yet maintains particle-sized quality control.

In various examples, the present disclosure is directed to overcoming limitations at both electrodes in Li—S batteries, while more generally addressing other deficiencies and challenges in the art of metal-anode based batteries that utilize liquid electrolytes. Thus, in various examples, this disclosure aims to devise simple coating procedure protocols, binder free coating, and layer-by-layer controlled coatings that takes advantage of the wide range of functionalities available in nano- and micro-particulate materials for controlling transport of reactive species between anode and cathode of a battery and across the liquid-electrode interphases.

The present disclosure resolves important issues, namely the LPS shuttling caused by the dissolution of the LPS during the discharge of LS cells, and the dendritic growth of lithium metal for the LM cells which diminish the battery's electrochemical performance, cause poor cycling lifetime and low coulombic efficiency, and raise safety concerns.

In an aspect, the present disclosure provides organized materials. The organized materials can be one or more monolayers disposed on a substrate. By "organized materials" it is meant that monolayer of the materials (e.g., nanoparticles and/or microparticles) adopt a close packed structure. An organized material on a substrate can have a porous, three-dimensional morphology. Organized materials of the present disclosure can be made by methods disclosed herein. Accordingly, in an example, an organized material of the present disclosure is made by a method of the present disclosure.

In an example, the organized material comprises one or more monolayers of nanoparticles and/or microparticles disposed on at least a surface of a substrate, and each monolayer of the layer is a close-packed arrangement of the nanoparticles and/or microparticles.

The organized material can be various nanoparticles and/or microparticles. For example, the organized materials are inorganic nanoparticles and/or microparticles (e.g., metal and/or metalloid nanoparticles and/or microparticles, metal and/or metalloid oxide nanoparticles and/or microparticles, or a combination thereof, organic nanoparticles and/or microparticles, or a combination thereof. Nanoparticles and microparticles are commercially available and can be made by methods known in the art.

In various examples, the metal and/or metalloid nanoparticles and/or microparticles are or comprise metals and/or metalloids such as, for example, aluminum, copper, gold, lithium, magnesium, manganese, molybdenum, nickel, tin, titanium, zinc, silver, silicon, boron, germanium, sulfur, and combinations thereof and/or the metal oxide and/or metalloid oxide nanoparticles and/or microparticles are or comprise metal oxides and/or metalloid oxides such as, for example, alumina, cobalt oxides, cupric oxides, hafnium oxides, iron oxides, lithium oxide, nickel oxides, manganese oxides, molybdenum oxides, palladium oxides, silver oxides, sodium oxide, tin oxides, titanium oxides, zinc oxide, germanium oxide, boron oxides, silicon oxides, and combinations thereof.

In various examples, the organic nanoparticles and/or microparticles are carbon-material nanoparticles and/or microparticles or polymer nanoparticles and/or microparticles. Examples of carbon-material nanoparticles and/or microparticles include, but are not limited to, carbon nanotubes (CNTs) (e.g., single-wall CNTs and multiwall CNTs), functionalized CNTs (e.g., carboxylized CNTs), graphene, graphene oxides, reduced graphene oxides, graphites, fullerenes, buckytubes, diamond, amorphous carbon (e.g., soot and charcoal), Super P carbon, Ketjen Black carbon, carbon fibers (e.g., vapor-grown carbon nanofibers), hard carbon, hollow carbon nanoparticles, porous carbon nanoparticles (e.g., microporous carbon nanoparticles, and mesoporous carbon nanoparticles) carbon nanorattles, and combinations thereof. Examples, of polymer nanoparticles and/or microparticles include, but are not limited to, nanoparticles comprising or formed from polyanilines, polyacrylic acids, polyacrylates, polyacrylonitriles, polycarbonates, polyethers, polyolefins, polyimides, polymethylmethacrylate, polystyrenes, halogenated analogs thereof, (i.e. where one or more hydrogen atoms in the polymer are replaced by a halogen (e.g., F, Cl, Br, I, and combinations thereof), and combinations thereof.

Nanoparticles and/or microparticles of various sizes can be used. For example, the nanoparticles and/or microparticles have a size (e.g., at least one dimension) of 10 nm to 5,000 nm, including all integer nm values and ranges therebetween. In various examples, the nanoparticles and/or microparticles have a size of 200 nm to 5000 nm or 10 nm to 200 nm. In various other examples, the nanoparticles and/or microparticles have a size of 10 nm to 195 nm or 205 nm to 5000 nm.

Nanoparticles and/or microparticles can have various shapes. In various examples, the nanoparticles and/or microparticles are spherical, fibers, nano rods, core-shell spheres, nanorattles, nanotubes, or nanosheets.

The nanoparticles can be functionalized. For example, functionalized nanoparticles (i.e., functionalized nanoparticle analogs) have organic molecules or groups formed from organic molecules, polymers or groups formed from ionic liquids, polymers (e.g., polyanilines, polyacrylic acids, polyacrylates, polyacrylonitriles, polycarbonates, polyethers, polyolefins, polyimides, polymethylmethacrylate, polystyrenes, halogenated analogs thereof, (i.e. where one or more hydrogen atoms in the polymer are replaced by a halogen (e.g., F, Cl, Br, I, and combinations thereof), and combinations thereof), or functional groups (e.g., phosphates, phosphonates) bonded (e.g., covalently or ionically bonded) to at least a portion of the nanoparticles surface. The nanoparticles can have two or more different types of functionalization. Functionalized nanoparticles can be made by methods known in the art. For example, functionalized nanoparticles are formed by grafting-to or grafting-from methods known in the art.

Various substrates can be used. Substrates can be formed from various materials. Substrates can be formed from combinations of materials. Substrates can have a layer of material on which the layer(s) of organized material are formed. For example, a substrate comprises a reactive metal and/or metalloid external surface (e.g., aluminum, calcium, copper, lithium, magnesium, potassium, sodium, titanium, zinc, germanium, boron, silicon, or a combination thereof), a carbon surface, silicon oxide surface, or a silicon carbide surface. In another example, a substrate comprises a material selected from metal oxides, metal nitrides, metal carbonates, non-metals substrates (e.g., aluminates, silicates, glass fiber) or polymers (e.g., polyacrylates, polyacrylonitriles, polyamides, polyesters, polyethers, polyolefins, polycarbonates, polymethacrylates, polyimides, polysulfones, polysultones, polyethylenes, polyvinyl alcohol, nylons, rubbers, and halogenated analogs of these polymers).

A substrate can have a single monolayer of organized material disposed on at least a portion or all of a surface of the substrate. A substrate can have two or more layers of organized materials. In an example, all the monolayers comprise the same material. In various other examples, two or more, three or more, or four or more monolayers comprise different materials. The monolayer or monolayers can be disposed on two or more surfaces of a substrate (e.g., a first surface of a substrate and a second surface of a substrate). In an example, the two surfaces (e.g., a first surface and a second surface) are opposite surfaces of a substrate, where, optionally, at least one monolayer disposed on the first surface is a different material than at least one monolayer disposed on the second surface of the substrate. An organized material on a substrate can comprise one or more layers of substrate materials and/or one or more monolayers disposed on a portion of or all of the layers of substrate materials.

The substrate can be a current collector, electrode, or separator. The organized material on the substrate enables its use in an electrochemical cell (e.g. a lithium ion battery or a lithium-sulfur battery).

The monolayer(s) are continuous layers. For example, a monolayer or each monolayer has no unoccupied space (e.g., discontinuity) greater than or equal to the largest particle in the monolayer. In various examples, a monolayer or each monolayer has 5 or less, 4 or less, 3 or less, 2 or less, or 1 or less unoccupied space (e.g., discontinuity) greater than or equal to the largest particle in the monolayer per $nm^2$ or $cm^2$ of the monolayer. Unoccupied space can be observed by methods known in the art. For example, unoccupied space can be observed by electron microscopy methods.

In various examples, the organized materials can consist essentially of nanoparticles and/or microparticles or consist of nanoparticles and/or microparticles. In various examples, the organized materials do not contain any binder material. Examples of binder materials are known in the art. Examples of binder materials include, but are not limited to, polymers such as, for example, polyacrylates, polyacrylonitriles, polyamides, polyesters, polyethers, polyolefins, polycarbonates, polymethacrylates, polyimides, polysulfones, polysultones, polyethylenes, polyvinyl alcohol, nylons, rubbers, and halogenated analogs of these polymers.

A monolayer can provide a conformal coating (e.g. a conformal coating of a substrate or a conformal coating of another monolayer. A monolayer may cover an area smaller or greater than an adjacent monolayer or adjacent monolayers. In an example, one or more monolayer is encapsulated between a substrate and an adjacent monolayer and/or adjacent monolayers. In an example, a monolayer disposed between a substrate and another monolayer or disposed between two monolayers covers less than 100% of a surface of the substrate on which the monolayer is disposed and/or a surface of one or both adjacent monolayers on which the monolayer is disposed.

In an aspect, the present disclosure provides methods of making one or more organized material layer on a substrate. The methods are based on contacting a substrate with a coating composition which provides a monolayer of organized material that can be transferred to the substrate.

In an example, a method of making an organized material on a substrate, where the organized material comprises one or more monolayers of nanoparticles disposed on at least a surface of a substrate and each monolayer of the layer is a close-packed arrangement of the nanoparticles (e.g., an organized material of the present disclosure), comprises: a) providing a coating composition comprising a monolayer of organized nanoparticles disposed on a liquid material (e.g. water, amides, aprotic carbonates, ethers, hydrocarbons, ionic liquids, dimethyl sulfoxide, siloxanes, sulfones) and b) transferring the monolayer of organized nanoparticles to the substrate, where the organized material on the substrate is formed.

The coating composition can comprise various amounts of nanoparticles and/or microparticles. For example, the coating composition comprises 1 to 3% by weight (based on the total weight of the coating composition) nanoparticles and/or microparticles. The amount of nanoparticles and/or microparticles can be replenished during the method (e.g., after successive monolayer transfers) or maintained during the method (e.g., during monolayer transfer in a continuous process so that a monolayer of close-packed nanoparticles and/or microparticles is formed/maintained on the coating composition.

The coating composition can be present in a container. In various examples, the coating composition is not disposed on a belt (e.g., a rotating belt) or drum (e.g., a rotary drum).

The nanoparticles and/or microparticles self assemble to form a monolayer of organized material on a surface of the liquid material of the coating composition. These methods are referred to herein as LBS methods. The coating composition has water and one or more additional liquid components (e.g., one or more alcohols such as, for example, ethanol or isopropanol) that have lower surface tension than water and lower the surface tension of the water. The coating composition can be formed by mixing (e.g., by magnetic or mechanical stirring or ultrasonication) to create a suspension of the nanoparticles and/or microparticles in an additional (e.g., non-aqueous) liquid component(s) of the coating composition. Without intending to be bound by any particular theory, it is considered that the mixing of the nanoparticle and/or microparticle suspension with water results in formation of an organized monolayer of the nanoparticles and/or microparticles.

It is desirable that the nanoparticle and/or microparticle surface have an appropriate hydrophilic character. If the nanoparticle and/or microparticle surface is too hydrophilic the nanoparticles and/or microparticles will not self-assemble on a surface of the coating composition due to high affinity with the water component of the coating composition. If the nanoparticle surface is too hydrophobic, the particles may segregate to form poorly ordered islands on the water surface, which is also not desirable.

In an example, the coating composition has (e.g., further comprise) a surfactant or mixture of surfactants. LBSDC methods as described herein use of a surfactant in the coating composition. The surfactant(s) have lower surface tension than that of the liquid material of the coating composition. The surfactant can be one or more amphiphilic molecules that lowers the surface tension of the materials in the coating process. The surfactant does not function as a dispersant in the coating composition. It is desirable that that surfactant does not absorb on a surface of the nanoparticles and/or microparticles. Without intending to be bound by any particular theory, it is considered that the surfactant creates a surface tension gradient that provides a compressive force, which can be a unidirectional force, that "pushes" the nanoparticles and/or microparticles to the surface of the coating composition forming an organized monolayer of the nanoparticles and/or microparticles. Examples of surfactants include, but are not limited to, soaps, such as, for example, sodium dodecyl sulfate (SDS). Mixtures of surfactants can be used. In various examples, polyelectrolytes are not surfactants.

Various amounts of surfactants can be used. For example, 0.01 to 10 weight percent surfactant (based on the total mass of the coating composition) can be used.

It is desirable that the surfactant remain in the coating composition. In an example, there is no observable surfactant in the monolayer(s). In various examples, there is less than 5%, 4%, 3%, 2%, 1%, 0.1% or 0.01% by weight (based on the weight of surfactant, if present, and nanoparticles and/or microparticles) surfactant in the monolayer(s). The amount of surfactant in the monolayer(s) can be determined by methods known in the art. For example, the amount of surfactant in the monolayer(s) is determined by a spectroscopic method.

According to an embodiment, the separator coating process requires a simple adjustable height platform, a beaker with tap water, nanomaterial suspensions, and a 3 wt % sodium dodecyl sulfate surfactant with DI water. The nanoparticle suspension (CNT, Super P carbon, Ketjen Black carbon, carbon fibers, graphite, hard carbon, micro/mesoporous carbon, silica & titania & alumina nanospheres/nanorods/nanopowders, and polyaniline) is comprised of 1 wt % of one of the nanomaterials listed above in pure ethanol. The suspension can have also the mixture of the listed nanomaterials. The suspension is sonicated for an hour to provide an even dispersion of the nanoparticles in ethanol.

Once the suspensions are prepared, a particle-size monolayer of the desired nanomaterials can be coated on the separator (Celgard™ 2500). First, the separator is hole punched into a ⅝-inch disk. Then, each end of the separator is taped onto a glass slide using kapton tape (See, e.g., FIG. 1). Next, the prepared separator is fully immersed in tap water, and the desired amount of the suspension is slowly injected at the surface of the tap water to form an LB film (See, e.g., FIG. 1). Finally, one of the two methods (LBSDC or LBS) is chosen to coat the film on the separator.

When the surface tension of the water causes the nanomaterial to float, it tends to move like an ideal gas at the surface; the floating particles are not stationary unless there is an extra force that pushes them in one direction. Therefore, once the LB film is formed, a small amount of the SDS surfactant can be added onto the water surface to provide a constant unidirectional force on the particles by lowering the surface energy at the surface where no spheres are present. This helps the particles to remain stationary and in close-packed form. Sometimes, adding a drop of the surfactant causes the LB film to collapse. This usually happens when the particle size is smaller than 100 nm and the particle surface is hydrophilic. In such case, the LBS method can be used. And once the LB film survives, then the LBSDC method can be used for the coating (See, e.g., FIG. 1). In other words, the LBS method simply saturates the surface of the water with the particles to provide a close-packed form with stability, whereas the LBSDC method uses an adequate amount of the particle to coat and add the surfactant to stabilize the particles.

Once a coating method is chosen and implemented, the immersed substrate is slowly raised with minimal turbulence to successfully coat one layer of the monolayer. Then, the coated separator is dried on the hotplate at 100 degrees Celsius for 30 seconds, and the process is repeated until the desired number of layer coatings is obtained. The fully coated and dried separators are applied to lithium sulfur and metal cells. Lithium sulfur and metal coin cells are made in a glove box. One molar of bis(trifluoromethane)sulfonamide lithium salt is used with a 1:1 volume of dioxolane and dimethoxyethane as an electrolyte system for both cells. For the lithium metal coulombic test, 0.4 molar of lithium nitrate is added to the electrolyte.

Figure 2:
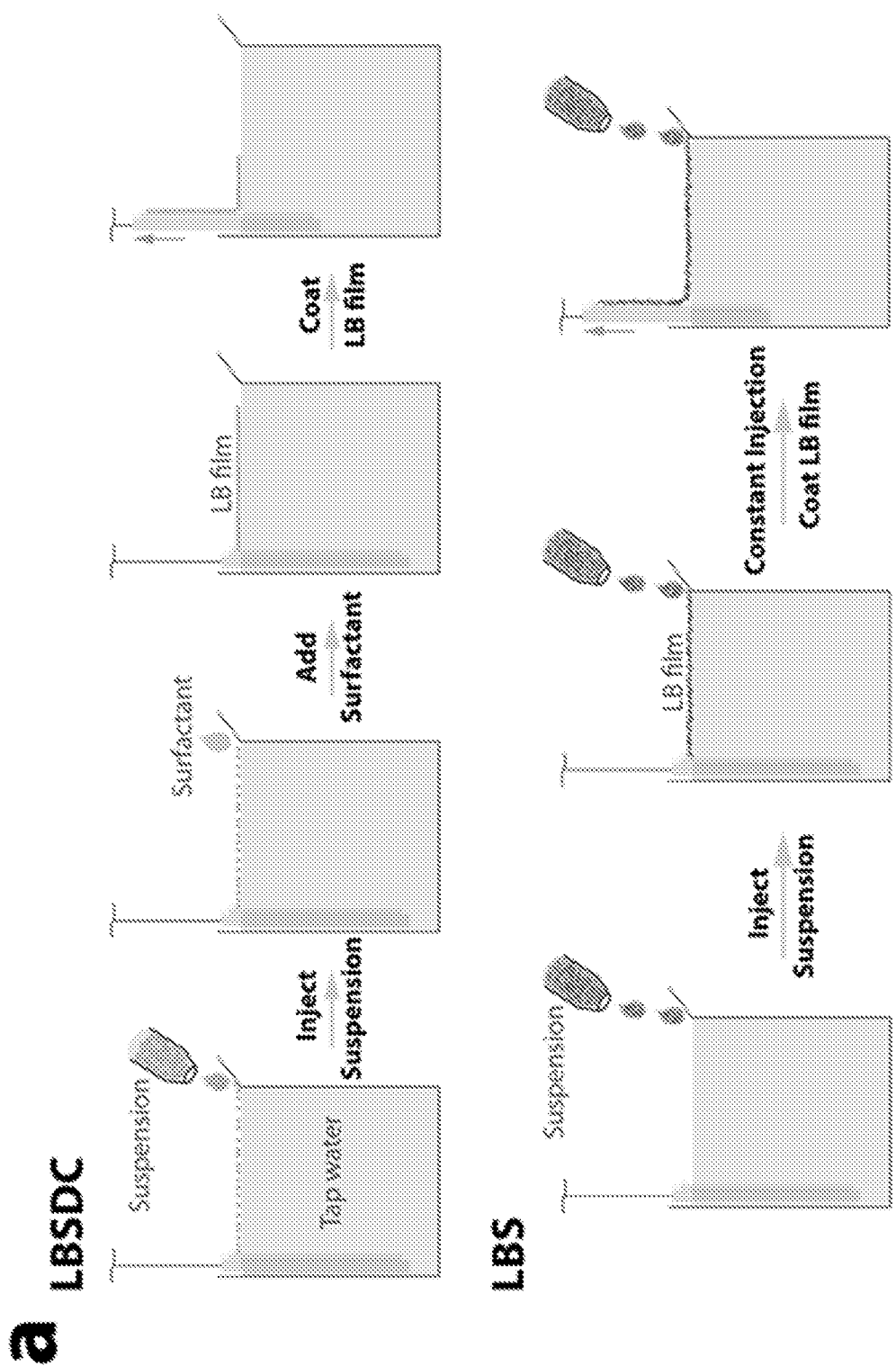
FIG. 2 shows LBSDC and LBS coating methods and Langmuir-Blodgett films. (a) Schematic illustrations of LBSDC and LBS coating methods. (b) Thicknesses, self-assembled Langmuir-Blodgett films, and gravimetrical areal density of single coating layer of MWCNT, KB, SP, and silica nanospheres on the separator using LBS method. One coating layer thickness of MWCNT (~80 nm), KB (~350 nm), SP (~850 nm), and silica (~350 nm).
Figure 2:
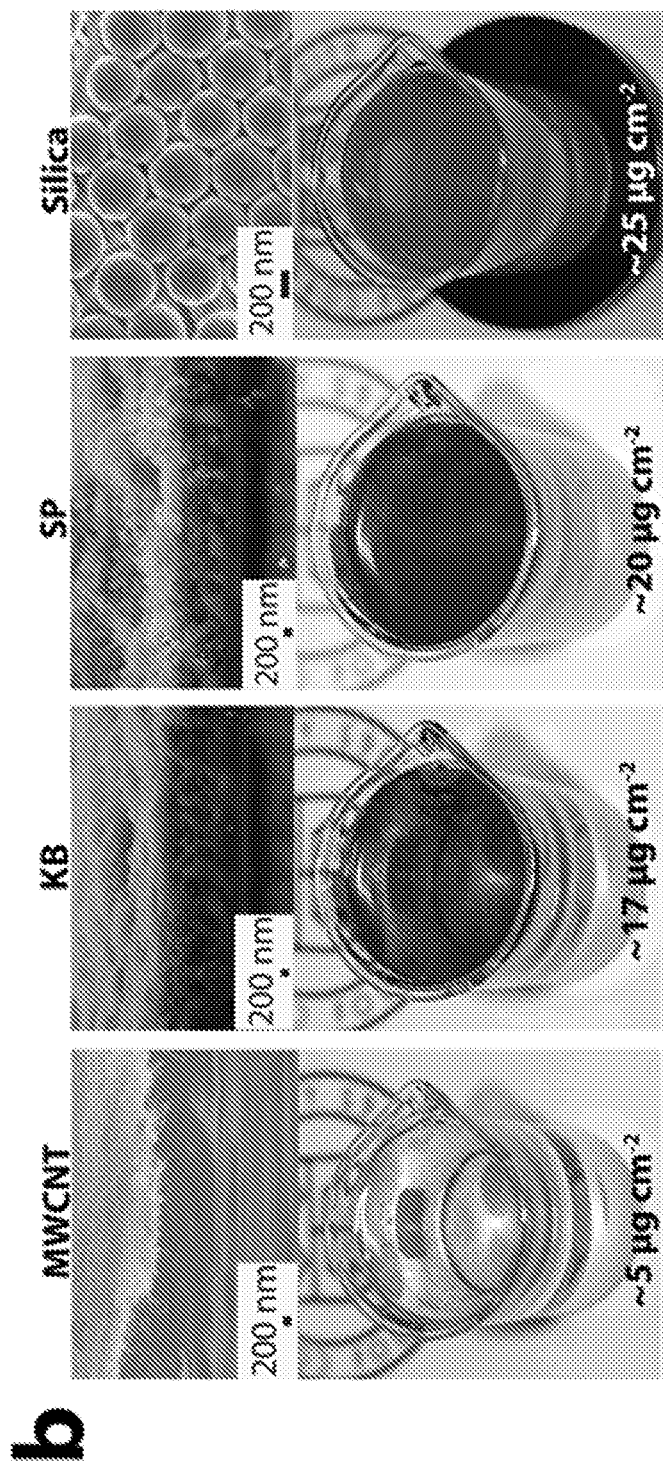
Figure 3:
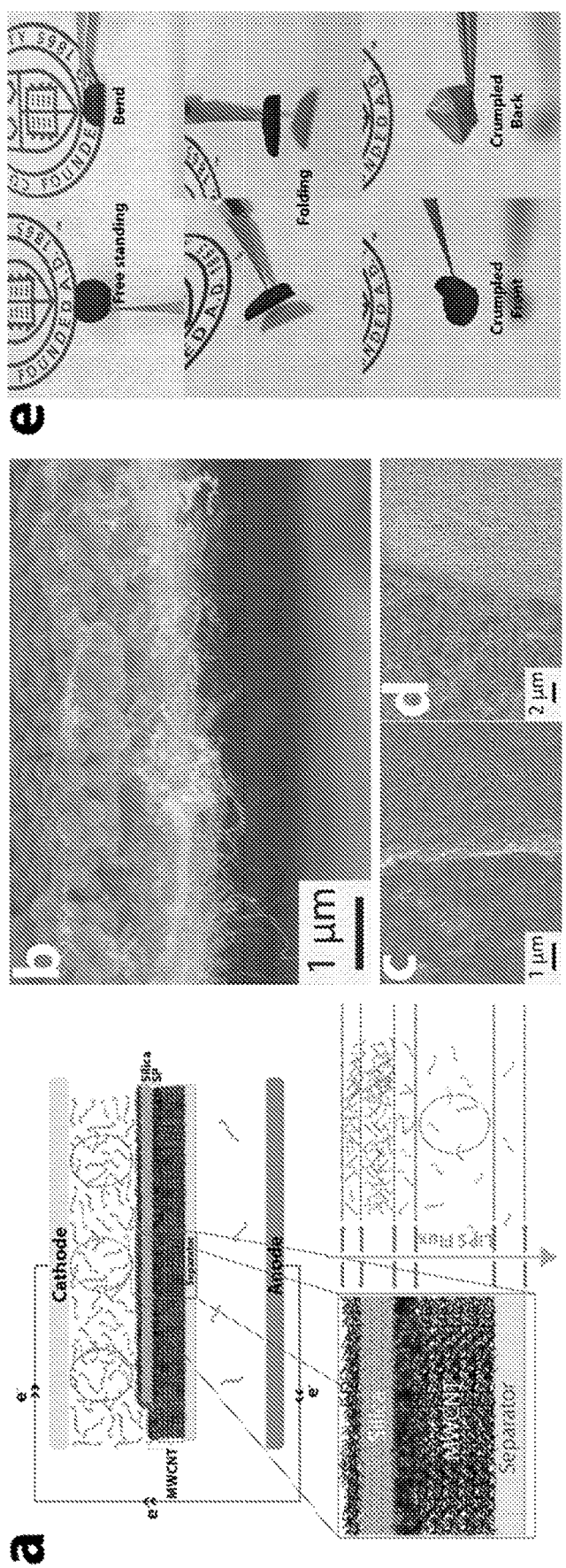
FIG. 3 shows clip configuration coatings on the separator. (a) Clip configuration architecture design and LiPS flux diagram across the separator during the discharge of Li—S cell. (b) Cross-sectional SEM image of the clip coated separator. (c) SEM image of the clip coated separator at the silica-SP boundary layer. (d) SEM image of the clip coated separator at the boundary without final MWCNT coating. (e) Mechanical strength of the clip coated separator.
Figure 4:
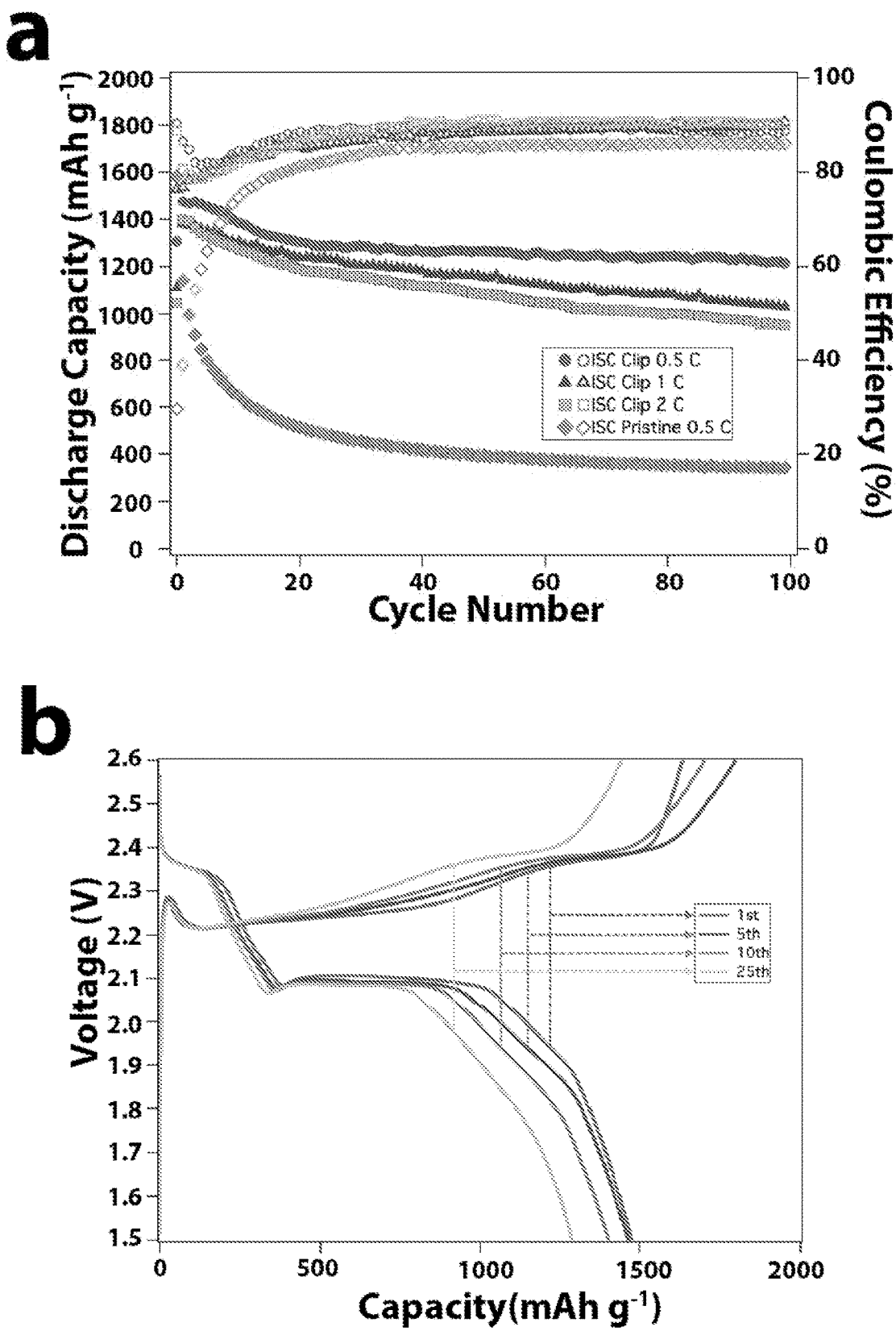
FIG. 4 shows electrochemical performance of the clip coated separators without LiNO$_3$. (a) Cycling performance of pristine Li anode Li—S cell with/without the clip coated separator and with ISC at three different C rates. (b) Discharge-charge voltage profiles of the corresponding Li—S cell with the clip coated separator and ISC for various cycles at 0.5 C. (c) Cycling performance of pristine Li anode with the clip coated separator Li—S cells with ISC and VISC at various C rates. (d) Cyclic voltammograms of the pristine Li anode with the clip coated separator Li—S cell with ISC at 0.1 mV s-1 for various cycles. (e) Cycling performance of the clip coated separator Li—S cells with ISC and VISC at 0.5 C for 250 cycles.
Figure 4:
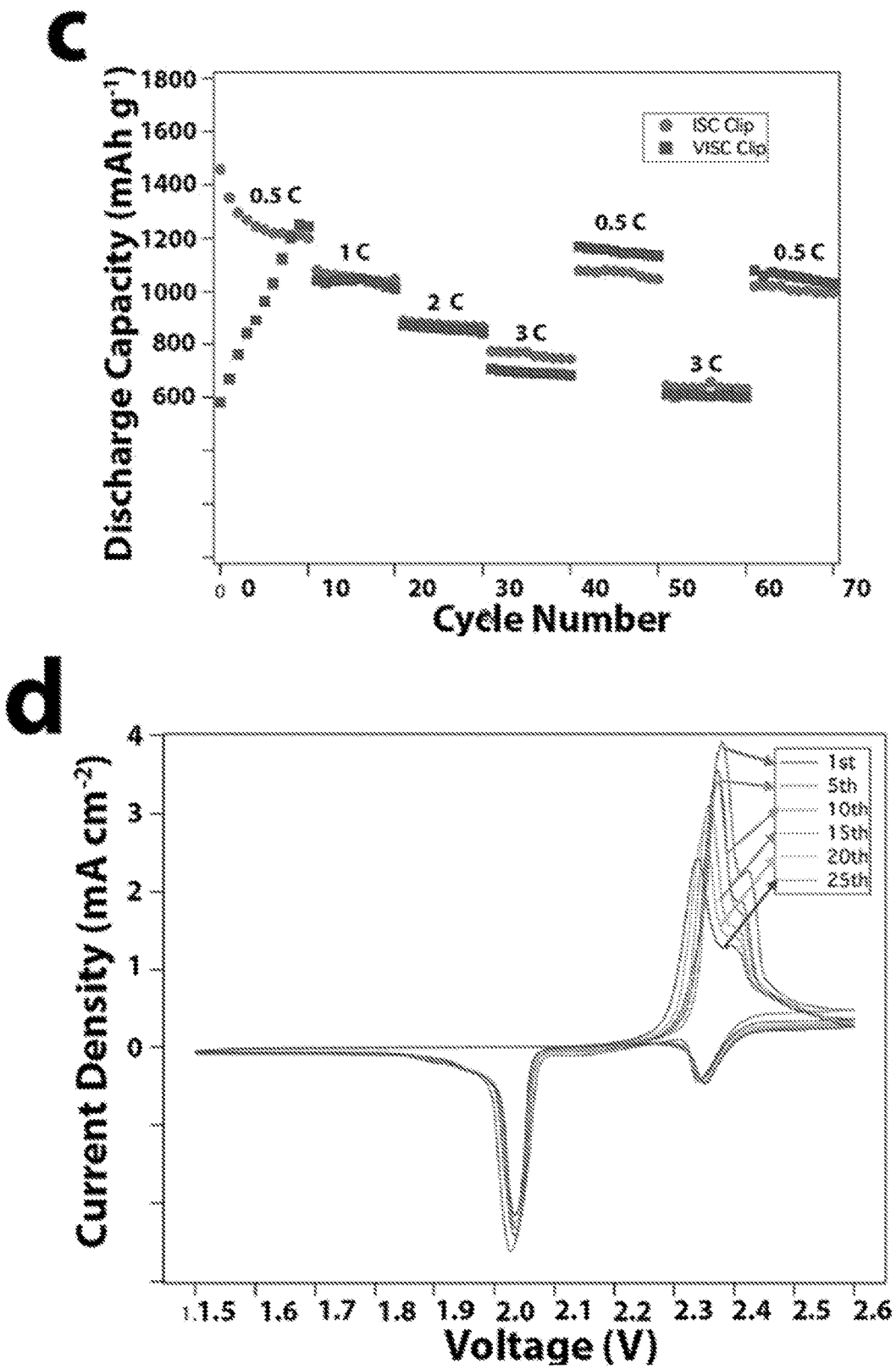
Figure 4:
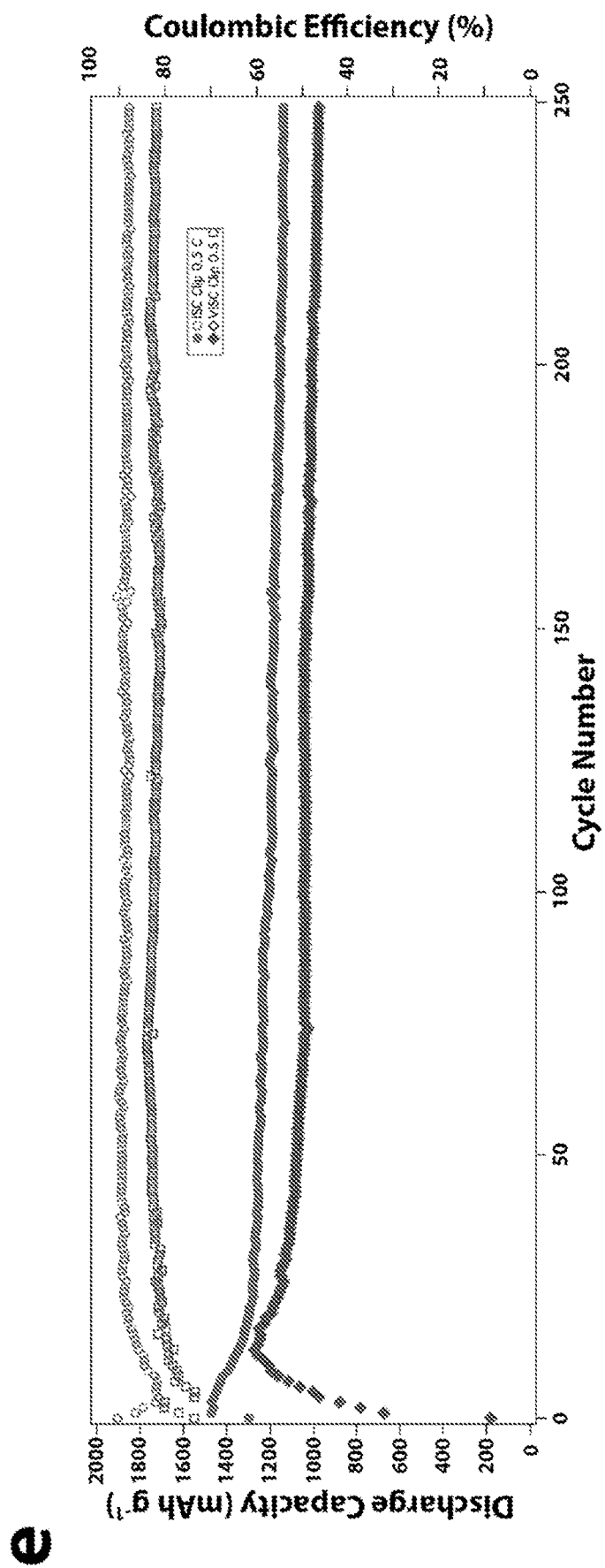

For embodiments involving lithium sulfur cells, a combination of CNT and silica nanospheres is used to create a "clip" configuration (See, e.g., FIG. 2) that helps to effectively absorb and reutilize the dissolved LPS, and to bolster the cycling performance. For the lithium metal batteries, a thin layer of CNT is coated to prevent the lithium metal dendrite from forming and growing over cycles. This is achieved by increasing the electrochemically active surface area on the lithium. Also, the CNT coating helps to protect the lithium metal surface by covering the contact interface with CNT and to hinder the direct deposition of the Li ion onto the anode. As speculated, the clip configuration separator coating sample exhibited an outstanding cycling performance (See, e.g., FIG. 3) compared to that of the pristine separator case for the LS cell. Also, a more stable coulombic efficiency retention was observed for the thin layer of CNT coating on the separator compared to that of the pristine case (See, e.g., FIG. 4).

Coating separators with conductive carbon and metal oxide in a layer-by-layer fashion yields a superb electrochemical performance of the LS and LB batteries. By implementing a well-known LB film technique, facile methods were discovered to successfully coat the conventional separator with various nanomaterials in a layer-by-layer form without utilizing chemical binders.

Additional embodiments contemplated involves selected other materials that can be coated, according to the disclosure, on a nonreactive substrate. For example, without limitation, silicon nanoparticles, tin nanoparticles, and polyacrylonitriles can also be coated using aforementioned coating methods.

A monolayer of organized nanoparticles and/or microparticles is formed on a surface of the liquid material of the coating composition. This monolayer is transferred to the substrate. Formation of a monolayer of organized nanoparticles and/or microparticles a surface of the liquid material of the coating composition and transfer of the monolayer to the substrate can be repeated a desired number of times. In various examples, the formation and transfer of a monolayer of organized materials is repeated 1 to 30 times, including all integer number of formation and repetition therebetween. For example, the monolayer is transferred by dipcoating.

A monolayer or monolayers can have various thicknesses. In various examples, monolayer or monolayers has/have a thickness of 10 nanometers to 50 microns, including all integer nm values and ranges therebetween.

The organized layer of nanoparticles and/or microparticles can be formed on a surface of the liquid material of the coating composition without mechanical constriction of the nanoparticles and/or microparticles. For example, the organized layer of nanoparticles and/or microparticles is formed without mechanical constriction such as, for example, barriers (e.g., floats) and/or a Langmuir-Blodgett trough.

The transfer of a monolayer formed on a surface of the coating composition can be carried out in batch mode or continuous mode. For example, the monolayer of organized nanoparticles is transferred continuously to a substrate that is translated through the monolayer. In the case of continuous transfer, the monolayer of organized material can be formed by mixing (e.g., continuously adding by injection) a suspension of the nanoparticles and/or microparticles in the additional (e.g., non-water) liquid component(s) of the coating composition. For example, additional nanoparticles and/or microparticles are added (e.g., by injection) to the coating composition (e.g., as a suspension in the nanoparticles and/or microparticles in the additional (e.g., non-water) liquid component(s) of the coating composition) as the monolayer of organized nanoparticles is transferred to the substrate. In an example, the substrate is contacted with a solvent such as, for example, isopropanol prior to transferring the monolayer to the substrate to enhance wetting of the substrate with water.

The monolayer(s) disposed on a substrate can be transferred to another substrate (e.g., a second substrate). The other substrate can be the same as or different than the original substrate. For example, the monolayer is transferred to a second substrate by physically contacting the organized material on the substrate with the second substrate and application of pressure.

The monolayer(s) adheres directly to adjacent monolayer or directly to the substrate. In various examples, there is no adhesive or binder or intermediate layer of adhesive or binder present in the films that adhere the nanoparticle to each other and/or to a substrate.

The steps of the method described in the various embodiments and examples disclosed herein are sufficient to carry out the methods of the present disclosure. Thus, in an embodiment, the method consists essentially of a combination of the steps of the methods disclosed herein. In another embodiment, the method consists of such steps.

In an aspect, the present disclosure provides devices. The devices comprise at least one organized material on a substrate, where the organized material comprises one or more monolayers of nanoparticles disposed on at least a surface of a substrate and each monolayer of the layer is a close-packed arrangement of the nanoparticles (e.g., an organized material of the present disclosure).

Examples of devices include, but are not limited to, batteries (e.g., thin film batteries, micro batteries, and flexible batteries), supercapacitors (e.g., electrodes for supercapacitors such as, for example, on-chip microsupercapacitor electrodes), flexible supercapacitors such as, for example, microsupercapacitors, and wearable electronics.

The device can be a battery. For example, the organized material on a substrate is a separator that is disposed between the anode and cathode of a battery (e.g., an ion-conducting battery such as, for example, lithium ion batteries). In another example, the organized material on a substrate is part of the electrode of a battery (e.g., an ion-conducting battery such as, for example, lithium ion batteries) or is the electrode of a battery (e.g., an ion-conducting battery such as, for example, lithium ion batteries). In various examples, the device is a LiS battery and the organized material on a substrate is a separator and/or a cathode and/or an anode.

The device can be a water filtration apparatus. For example, the organized material on a substrate is a water filtering membrane.

A material that is to be subjected to chemical analysis can be formed as an organized material on a substrate. For example, an organized material on a substrate (a sample for chemical analysis) is subjected to chemical analysis (e.g., XPS, EDX, ATR-FTIR, Raman Microanalysis, or Optical reflectometry).

In the following Statements, various examples of the methods and structures of the present disclosure described:

Statement 1. An organized material on a substrate, wherein the organized material comprises one or more monolayers of nanoparticles and/or microparticles (e.g., 1 to 30 monolayers) disposed on all of a surface, at least a portion of a surface, or all of the surfaces of a substrate, and where each monolayer of the layer is a close-packed arrangement of the nanoparticles and/or microparticles. The organized material on a substrate can have a porous, three-dimensional morphology.

Statement 2. An organized material according to Statement 1, where the monolayers comprise inorganic nanoparticles and/or microparticles, organic nanoparticles and/or microparticles, or a combination thereof.

Statement 3. An organized material according to any one of Statements 1 or 2, where the inorganic nanoparticles and/or microparticles are metal and/or metalloid nanoparticles and/or microparticles, metal and/or metalloid oxide nanoparticles and/or microparticles, or a combination thereof.

Statement 4. An organized material according to any one of the preceding Statements, where the metal and/or metalloid nanoparticles and/or microparticles comprise aluminum, copper, gold, lithium, magnesium, manganese, molybdenum, nickel, tin, titanium, zinc, silver, silicon, boron, germanium, sulfur, or a combination thereof and/or the metal oxide and/or metalloid oxide nanoparticles and/or microparticles comprise alumina, cobalt oxides, cupric oxides, hafnium oxides, iron oxides, lithium oxide, nickel oxides, manganese oxides, molybdenum oxides, palladium oxides, silver oxides, sodium oxide, tin oxides, titanium oxides, zinc oxide, germanium oxide, boron oxides, silicon oxides, or a combination thereof.

Statement 5. An organized material according to any one of the preceding Statements, where the organic nanoparticles and/or microparticles are carbon-material nanoparticles and/or microparticles or polymer nanoparticles and/or microparticles.

Statement 6. An organized material according to any one of the preceding Statements, where the carbon-material nanoparticles and/or microparticles are selected from carbon nanotubes (CNTs) (e.g., single-wall CNTs and multiwall CNTs), functionalized CNTs (e.g., carboxylized CNT), graphene, graphene oxides, reduced graphene oxides, graphites, fullerenes, buckytubes, diamond, amorphous carbons (e.g., soot and charcoal), vapor-grown carbon nanofibers, Super P carbon, Ketjen Black carbon, carbon fibers, hard carbons, hollow carbon nanoparticles, microporous carbon nanoparticles, mesoporous carbon nanoparticles, carbon nanorattles, and combinations thereof.

Statement 7. An organized material according to any one of the preceding Statements, where the polymer nanoparticles and/or microparticles are selected from polyaniline nanoparticles, polyacrylic acid, polyacrylates, polyacrylonitriles, polycarbonates, polyethers, polyolefins, polyimides, polymethylmethacrylate, polystyrenes, halogenated analogs thereof, (i.e. where one or more hydrogen atoms in the polymer are replaced by a halogen (e.g., F, Cl, Br, I, and combinations thereof), and combinations thereof.

Statement 8. An organized material according to any one of the preceding Statements, where the nanoparticles and/or microparticles have a size (e.g., at least one dimension) of 10 nm to 5000 nm.

Statement 9. An organized material according to any one of the preceding Statements, where the nanoparticles and/or microparticles are spherical, fibers, nano rods, core-shell spheres, nanorattles, nanotubes, nanosheets, or functionalized analogs thereof (e.g., particles grafted with organic molecules, phosphates, polymers, or a combination thereof such as, for example, those described in Statement 7).

Statement 10. An organized material according to any one of the preceding Statements, where the substrate comprises a reactive metal and/or metalloid external surface (e.g., aluminum, calcium, copper, lithium, magnesium, potassium, sodium, titanium, zinc, germanium, boron, silicon, or a combination thereof), a carbon surface, silicon oxide surface, or a silicon carbide surface.

Statement 11. An organized material according to any one of the preceding Statements, where the substrate comprises a material selected from metal oxides, metal nitrides, metal carbonates, non-metals substrates (e.g., aluminates, silicates, glass fiber) or polymers (e.g., polyacrylates, polyacrylonitriles, polyamides, polyesters, polyethers, polyolefins, polycarbonates, polymethacrylates, polyimides, polysulfones, polysultones, polyethylenes, nylons, rubbers, and halogenated analogs of these polymers).

Statement 12. An organized material according to any one of the preceding Statements, where all of the monolayers comprise the same material.

Statement 13. An organized material according to any one of the preceding Statements, where at least two of the monolayers comprise different materials.

Statement 14. An organized material according to any one of the preceding Statements, where the monolayer or monolayers are disposed on a first surface of the substrate and a second surface of the substrate.

Statement 15. An organized material according to any one of the preceding Statements, wherein the first surface and second surface are opposite surfaces of the substrate.

Statement 16 An organized material according to any one of the preceding Statements, where at least one monolayer disposed on the first surface is a different material than at least one monolayer disposed on the second surface of the substrate.

Statement 17. An organized material according to any one of the preceding Statements, where the substrate is a current collector, electrode, or separator and the organized material on the substrate enables its use in an electrochemical cell (e.g. a lithium ion battery or a lithium-sulfur battery)).

Statement 18. A method of making an organized material on a substrate, where the organized material comprises one or more monolayers of nanoparticles disposed on at least a surface of a substrate and each monolayer of the layer is a close-packed arrangement of the nanoparticles, (e.g., an organized material of claim 1) comprising: a) providing a coating composition (e.g., in a container) comprising a monolayer of organized nanoparticles disposed on a liquid material (e.g. water, amides, aprotic carbonates, ethers, hydrocarbons, ionic liquids, dimethyl sulfoxide, siloxanes, sulfones) and b) transferring the monolayer of organized nanoparticles to the substrate, where the organized material on the substrate is formed. In an example, the substrate is contacted with a solvent such as, for example, isopropanol prior to transferring the monolayer to the substrate to enhance wetting of the substrate with water.

Statement 19. A method of making an organized material on a substrate according to Statement 18, where the coating composition further comprises a surfactant as described herein.

Statement 20. A method of making an organized material on a substrate according to Statement 18 or 19, where the monolayer of organized nanoparticles is transferred by dip coating.

Statement 21. A method of making an organized material on a substrate according to any one of Statements 18 to 20, where the monolayer of organized nanoparticles is transferred continuously to a substrate that is translated through the monolayer.

Statement 22. A method of making an organized material on a substrate according to any one of Statements 18 to 21, where additional nanoparticles are added to the coating composition as the monolayer of organized nanoparticles is transferred to the substrate.

Statement 23. A method of making an organized material on a substrate according to any one of Statements 18 to 22, where the method is a continuous process.

Statement 24. A method of making an organized material on a substrate according to any one of Statements 18 to 23, where the monolayer is transferred to a second substrate by physically contacting the organized material on the substrate with the second substrate and application of pressure.

Statement 25. A device comprising at least one organized material on a substrate, wherein the organized material comprises one or more monolayers of nanoparticles disposed on at least a surface of a substrate and each monolayer of the layer is a close-packed arrangement of the nanoparticles, (e.g., an organized material of claim 1).

Statement 26. A device according to Statement 25, where the organized material on a substrate is a separator that is disposed between the anode and cathode of a battery (e.g., an ion-conducting battery such as, for example, a lithium ion battery). For example, the battery is a LiS battery.

Statement 27. A device according to Statement 25 or 26, where the organized material on a substrate is part of the electrode of a battery (e.g., an ion-conducting battery such as, for example, a lithium ion battery) or is the electrode (e.g., cathode and/or anode) of a battery (e.g., an ion-conducting battery such as, for example, a lithium ion battery).

Statement 28. A device according to any one of Statements 25 to 27, where the device is selected from batteries (e.g., thin film batteries, micro batteries, and flexible batteries), supercapacitors (e.g., electrodes for supercapacitors such as, for example, on-chip microsupercapacitor electrodes), flexible supercapacitors such as, for example, microsupercapacitors, and wearable electronics.

Statement 29. A device according to any one of Statements 25 to 28, where the device is a water filtration apparatus (e.g., water filtering membrane).

Statement 20. A method of analyzing an organized material of the present disclosure (e.g., an organized material of any one of Statements 1 to 17, comprising subjecting the organized material to chemical analysis and determining one or more feature, property, or both of the organized material.

The following examples are presented to illustrate the present disclosure. They are not intended to limiting in any matter.

Example 1

This example provides a description of fabrication of organized materials on substrates of the present disclosure and characterization of same.

This example provides a description of two new and versatile Langmuir-Blodgett coating approaches—Langmuir-Blodgett sequential dip coating (LBSDC) and the Langmuir-Blodgett scooping (LBS), which facilitate efficient creation of multifunctional, layer-by-layer coatings of carbon, metal-oxides, polymers, and combinations of these materials on any non-reactive substrate. Unlike the conventional LB method, which uses a mechanical force applied to a disordered material at the air/water interface to create well-ordered assemblies of molecules or particles, LBSDC and LBS utilize surfactant and self-assembly, respectively, to create ordered coatings that can be transferred to a solid or porous support. This difference allows highly organized coatings to be created in a fraction of the time and using any containment vessel (i.e. a LB mechanical barrier is not required). The speed with which ordered monolayer coatings are created, the high quality and low thickness of the transferred coatings, and versatility of the process by which the coatings are formed mean that LBSDC and LBS can be applied in a repetitive fashion to create multi-functional coatings in a layer-by-layer format that enable design of new materials with surface features able to regulate mass and charge transport. Because the assembly occurs at a sharp gas/liquid interface, the methods nonetheless benefit from the inherent attributes of the LB technique—precise control over film thickness and structure, as well as the versatility of substrate choices. Moreover, numbers and positions of suspension injection nozzle and water surface area can be altered and customized to scale up the coating process.

The utility of the LBSDC and LBS approaches is illustrated in the present disclosure using the polyolefin separator membrane of a standard Lithium-Sulfur (LiS) electrochemical cell as a substrate. This choice is motivated by the promise such cells offer for cost-effective storage of large quantities of electrical energy and by the stubborn challenges associated with solubility and diffusion of long-chain ($Li_2S_x$; x≥4), lithium polysulfide (LiPS) species, to the electrolyte that limit performance of LiS batteries. We describe that using LBSDC and LBS it is possible to create multifunctional coatings in multiple designs that enable conventional membranes to overcome the most difficult challenges. We further describe a novel "clip" separator membrane configuration in which a well-formed, but incomplete layer of structures of one chemistry is sandwiched between complete layers of another chemistry. This coating morphology allows one to engineer the surface of a membrane to simultaneously trap an undesired material (e.g. LiPS) and to maintain electrochemical access to it. In so doing, we show that it is possible to preserve the favorable attributes of the Li—S cell and address some of its most serious weaknesses.

Synthesis—Silica nanospheres were synthesized by the Stober synthesis technique. In this method, 10 ml of ammonium hydroxide, 10 ml of water and 75 ml of ethanol are taken in a round bottom flask and stirred using a stir bar to ensure proper mixing. Under smooth stirring conditions, 5.6 ml of tetraethyl orthosilicate (TEOS) is added drop-wise. After 12 hours of stirring, the prepared monodispersed silica nanospheres are purified by alternate centrifuging and sonication in an ethanol-water mixture until the colloidal solution reaches a stable pH of 7. The size of the prepared silica is characterized using the scanning electron microscopy (SEM) technique. The resulting silica nanospheres are determined by means of dynamic light scattering (DLS) and SEM analysis to be approximately 350 nm in diameter.

Suspensions: ALB film forming suspension is comprised of 1-3 wt % of a nanomaterial in pure ethanol (Decon, 200 Proof). Each suspension containing the desired concentration of silica nanospheres, titania nanopowder (Rutile, 99% purity, Advanced Materials™), multi-walled carbon nanotube (L 6-9 nm×5 μm, >95% carbon, Sigma Aldrich), Ketjen-Black carbon (Akzo Nobel), and Super-P carbon (TIMCAL) is dispersed in pure ethanol. Then each of the suspension is sonicated for 30 minutes to enhance the dispersion of the particles. Note that the film quality is not sensitive to the weight composition of the nanomaterials in ethanol solvent; 0.5 to 3 wt % of the nanomaterial suspensions yielded the same quality films. However, the film quality heavily depends on the distribution of the dispersed particle sizes; big aggregates or clusters will form defects during the self-assembly of LB films.

The sodium dodecyl sulfate (SDS) surfactant is made by dissolving 3 wt % of SDS in DI water.

Coating Process—The separator: the commercial polypropylene separator (Celgard™ 2500) was cut into a 1.6 cm diameter circular disk. The cut separator is placed onto a 1.8×1.8 cm microscope cover glass, and the ends of the separator are taped with Kapton tape for the coating process.

Figure 12:
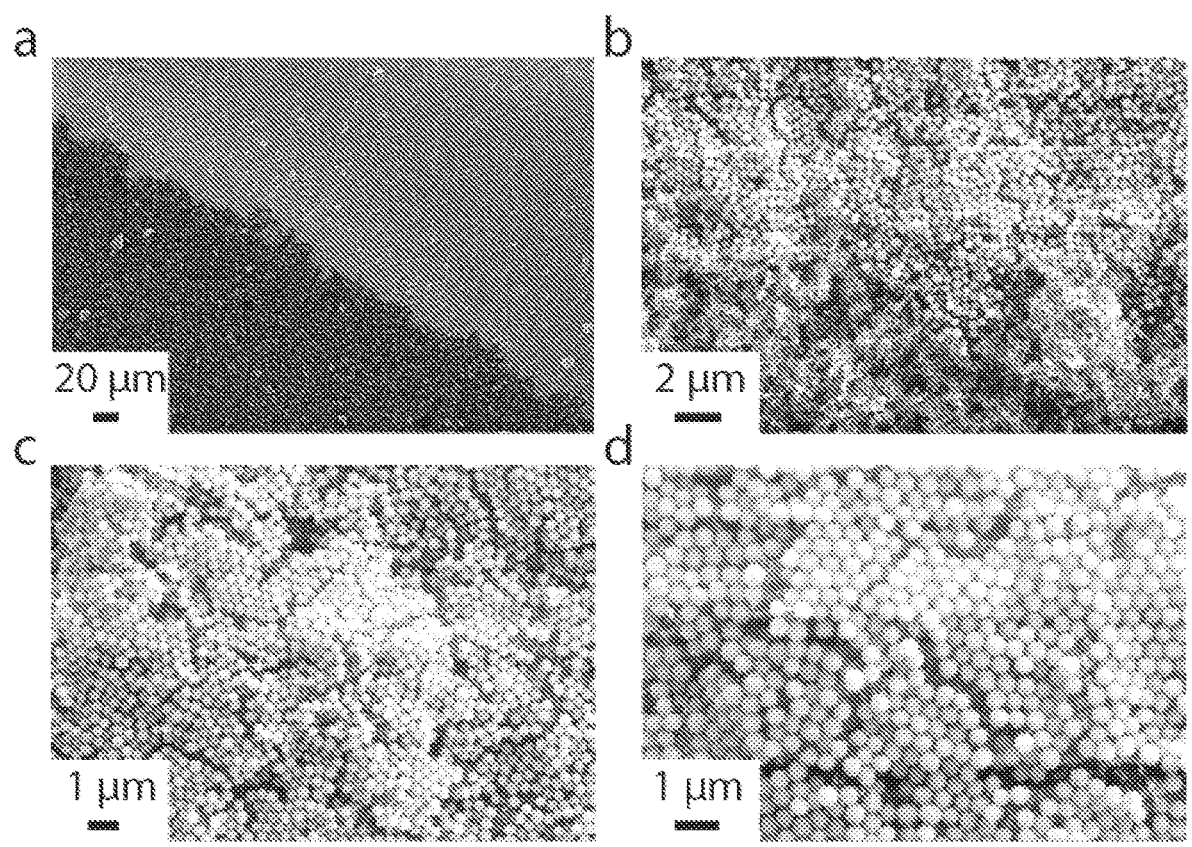
FIG. 12 shows SEM images of a monolayer of silica nanospheres coated on MWCNT-SP layer. (a) Silica-SP layer boundary region, (b) wide-view, and (c) close-view. A monolayer of silica coating on top of the SP-MWCNT layer (c, d).
Figure 13:
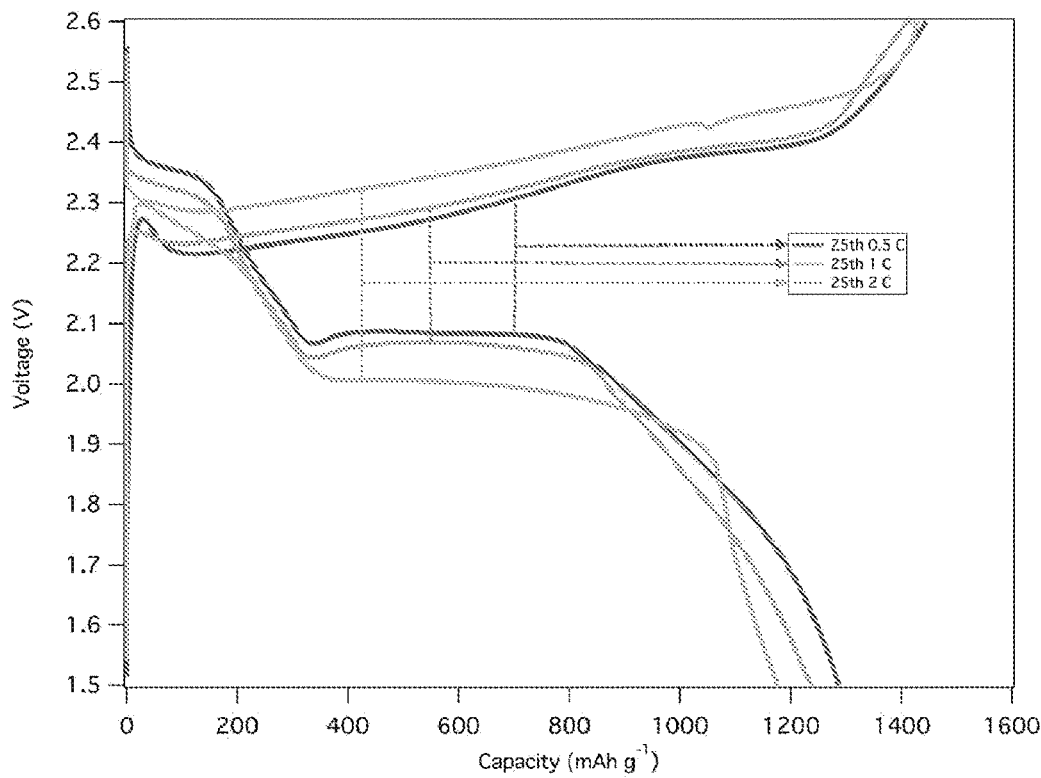
FIG. 13 shows voltage profiles of Li—S cells with/without clip coated separator and ISC. (a) Discharge-charge voltage profiles of pristine Li anode Li—S cell with the clip coated separator and ISC at $25^{th}$ cycle for various C rates. (b) Discharge-charge voltage profiles of pristine Li anode Li—S cell with the pristine separator and ISC at 0.5 C for various cycles.
Figure 13:
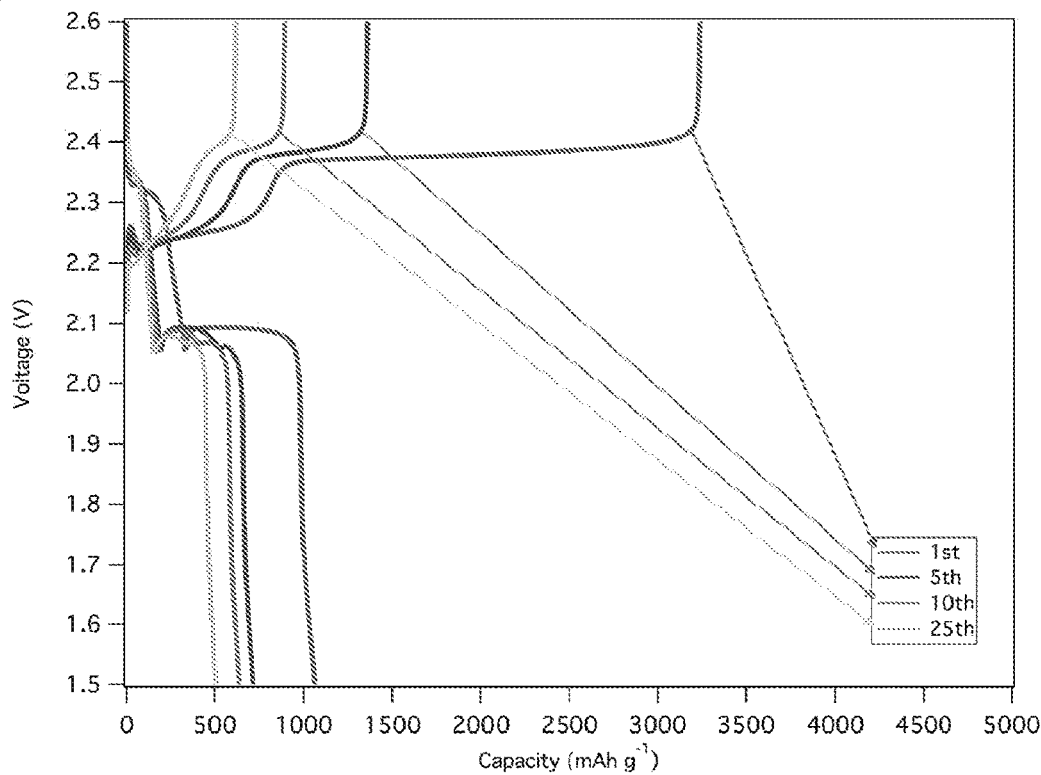

Single component separator coating: Mono/multi layers of Silica nanospheres, multi-walled carbon nanotubes (MWCNT), Ketjen Black (KB) carbon, and Super P (SP) carbon are coated on the separator using LBS method. Prepared separators are washed with water to flush out any impurities stuck onto the surface. One drop of isopropanol (IPA) is applied onto the separator or coated separator to enhance wetting of the separator with water, and the excess IPA on the separator is diluted with water. Then, the fully wetted separator is immersed in water for the coating process. One of the suspensions is then injected at the surface of the water until more than half of the water surface is saturated with the desired nanomaterial; the separator is subsequently raised up to transfer the film followed by a constant injection of the suspension. After that, the coated separator is dried on a hot plate at 110° C. for 30 seconds. Note that IPA wetting step is not required for the silica nanospheres or hydrophilic surface coatings. The single layer coating process is repeated until the desired number of layers is achieved. After the final layer coating, fully coated separator is dried on the hot plate at 110° C. for 1 minute. Different types and forms substrate coating were demonstrated (FIGS. 12 & 13). For example, 1 μm fluorescent silica nanospheres and SP carbon suspensions were used to provide clear visibility of the coating layers.

Clip coating: The clip configuration coating is comprised of five coating layers of MWCNT, one coating layer of SP, three monolayers of silica nanospheres, and one final coating layer of MWCNT. The first five coating layers of MWCNT are coated in the same manner as the single component separator coating. Then, one layer of SP, which acts as an adhesion layer for the silica nanospheres, is coated on top of MWCNT using the LBS method. ~70%-90% (e.g., 80%) of the MWCNT and SP carbon coated separator is covered with three monolayers of silica nanospheres using the LBSDC method. During the silica coating, IPA wetting is only applied for the first coating layer of the silica nanospheres; no IPA is used after the first coating of the silica. For the final layer of MWCNT, the remaining ~10%-30% (e.g., 20%) of the separator is wetted with IPA. And after the dilution of IPA, the whole surface of the separator is coated with one layer of MWCNT using LBS. The clip coated separator is then dried on the hot plate at 110° C. for 1 minute.

Battery preparation—LiS Cathodes: ISC (Infused Sulfur Cathode)—Sulfur infused in KB carbon composite was prepared by an infusion method. First, sulfur powder (Sigma Aldrich) and Ketjen Black carbon (2.2:1 by weight) were placed in a hollow glass vial in Ar atmosphere. Then, the end of the glass vial was sealed to avoid water moisture during the infusion process. The composite contained glass vial was heated to 155° C. for 12 hours to infuse active sulfur into the pores of KB carbon and subsequently cooled to room temperature. The resulting composite had a sulfur content of 66 wt %. The sulfur infused KB composite (77 wt %) was mixed with SP (8 wt %) and 10 wt % polyvinylidene fluoride (Sigma Aldrich) dissolved in N-methyl-2-prolidone (15 wt %) in N-methyl-2-prolidone (Sigma Aldrich), and the mixture is ball-milled at 50 rev s$^{-1}$ for 30 minutes. The resulting viscous slurry was casted onto a carbon sprayed aluminum foil as a current collector using a doctor-blade. The coated slurry is then dried in a convection oven at 60° C. for 5 hours. The prepared electrode is cut into a circular disk, and the electrode has sulfur loading of 1.1 mg cm$^{-2}$ with 50 wt % of active sulfur per cathode. After including conductive carbon components in the clip coated separator (excluding the mass of silica nanospheres), the active sulfur content remains at 47.5%.

BMSC (Ball Milled Sulfur Cathode)—The 70 wt % sulfur powder (Sigma Aldrich) was mixed with SP (20 wt %) and 10 wt % polyvinylidene fluoride (Sigma Aldrich) dissolved in N-methyl-2-prolidone (15 wt %) in N-methyl-2-prolidone (Sigma Aldrich), and the mixture is ball-milled at 50 rev s$^{-1}$ for 30 minutes. The resulting viscous slurry was coated onto a carbon sprayed aluminum foil as a current collector using the doctor-blade. The coated slurry is then dried in a convection oven at 60° C. for 5 hours. The prepared electrode is cut into a circular disk, and the electrode has the loading of 5 mg cm$^{-2}$ with 70 wt % of active sulfur per cathode.

VISC (Vapor Infused Sulfur Cathode)—this is a carbon-sulfur cathode created by infusion of sulfur in the vapor phase into a carbon fiber matrix. Sulfur cathodes are prepared by coating the composite material onto a carbon coated Al foil. The cathode has the sulfur content of 68 wt % and loading of 5.15 mg cm$^{-2}$. After including conductive carbon components in the clip-coated separator (excluding the mass of silica nanospheres), the sulfur contents for BMSC and VISC are 69.31% and 67.35%, respectively. All measurements described utilize a cathode size of 1.26 cm$^2$.

Li metal foil was cut into a 1.27 cm diameter circular disk, and the Li metal disks are completely soaked in 0.5M LiNO$_3$ (Sigma-Aldrich) 1,2-dimethoxyethane (DME, Sigma Aldrich) and 1,3-dioxolane (DOL, Sigma Aldrich) (1:1 v/v) electrolyte solutions for 24 hours for the pretreatment. Then, the pretreated Li metals were rigorously dried in air/oxygen-free Ar environment. Same size of Li metal disks is used for the pristine Li anode.

Three different electrolytes were prepared: i) 1M Bis (trifluoromethane)sulfonamide lithium salt (LiTFSI, Sigma Aldrich) in DME:DOL (1:1 v/v) electrolyte, ii) 1M LiTFSI with 0.05M LiNO$_3$ in DME:DOL (1:1 v/v), and iii) 1M LiTFSI with 0.3M LiNO$_3$ in DME:DOL (1:1 v/v).

CR2032-type Li—S coin cells are assembled with the pristine/coated separators, Li metal disks, Li—S cathodes, stainless-steel springs and spacers, and the electrolytes. 40 μL of the electrolyte is used per cell. The first 20 μL of the electrolyte is added to the coating layers of the separator. Then, the cathode is placed onto the electrolyte-wetted separator facing the coating layers. Another 20 μL of the electrolyte is applied to the other side of the separator and pretreated or pristine Li metal disk is placed. Then the spacer and spring are used to sandwich the anode/separator/cathode, and pressure of 15 MPa is applied to punch the cell. The assembled cell is rested for about 15 minutes before testing. Cell assembly was carried out in an Ar filled glove-box (MBraun Labmaster). The room-temperature cycling characteristics of the cells were evaluated under galvanostatic conditions using Neware CT—3008 battery testers and the electrochemical process in the cells were studied by cyclic voltammetry using a CHI600D potentiostat.

Figure 8:
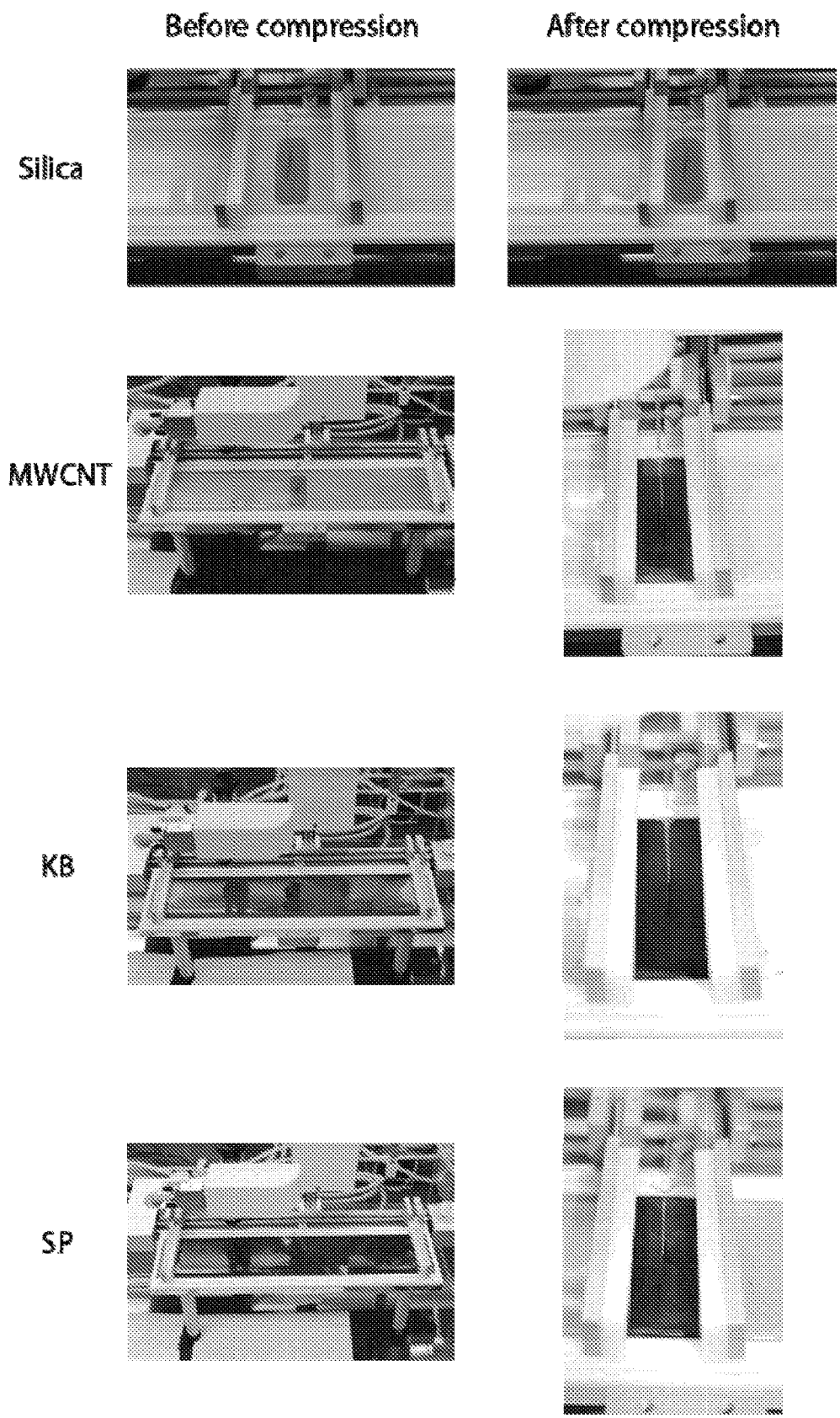
FIG. 8 shows Langmuir-Blodgett trough experiment for surface pressure measurements. Images of compressing silica nanospheres, MWCNT, KB, and SP are shown. Note that no materials are lost during the compression of the LB films, and folding of the films is observed instead of particles sinking.

Langmuir-Blodgett trough: surface pressures of 350 nm Silica colloids, MWCNT, KB, SP, and SDS surfactant are measured using conventional LB trough (KSV NIMA L & LB Troughs). The trough has dimension of 7.5×32.4 cm (FIG. 8). The trough was cleaned using pure ethanol and DI water and fully dried with nitrogen gas. The trough was filled with DI water and a 0.5 mL of suspension is injected at the ends of the trough to float particles. After the injection of the suspension, rest time of ~7 minutes was needed to evaporate excess ethanol from the suspension. Then the resulting film is compressed at the rate of 3 mm min$^{-1}$ to collect the surface pressure profiles. For obtaining the pressure profile of LBDSC and LBS, ~35 cm$^2$ and ~25 cm$^2$ areas are set to mimic actual coating process occurs at the surface from the 50 mL glass beaker. To collect LBDSC surface profile, ~35 cm$^2$ of the surface is saturated with the silica colloids and rested about 5 minutes to evaporate remaining ethanol. Then, 5 μL of the surfactant is added and the pressure profile is collected at the compression rate of 3 mm min$^{-1}$. For the LBS surface profiles, ~25 cm$^2$ area is fully covered by MWCNT, KB, and SP, and without the rest time, the surface pressure profiles are collected at the compression rate of 3 mm min$^{-1}$. The surfactant surface pressure profile is measured at four different areas (7 cm$^2$, 11 cm$^2$, 19 cm$^2$, 38 cm$^2$) without compressing the barriers, and the 5 μL of the surfactant surface pressures are measured over time.

Galvanostatic charge/discharge: Neware battery testing system was used to perform cycling testing of the Li—S cells. 1.5 V to 2.6 V and 1.7 V to 2.6 V voltage windows are used for without/with LiNO$_3$ electrolyte systems, respectively.

CV: CHI600D potentiostat is used to perform cyclic voltammetry analysis of the cell. 0.1 mV s$^{-1}$ scan rate with the voltage window of 1.5 V to 2.6 V are chosen as the parameters.

SEM: The morphology of the coating layers on the separator was analysed using a Keck scanning electron microscope (LEO 1550 FESEM) at 3 kV acceleration voltage.

EDXS: Energy dispersive X-ray spectroscopy (EDXS) was performed on a Keck scanning electron microscope to investigate the chemistry of the coatings on the separator.

TGA: Thermogravimetric analysis (TGA) was used to determine the content of sulfur in the composite. Morphologies of the electrodes were studied using a Keck SEM.

ACI: Alternating current impedance (ACI) was measured versus frequency using a Novocontrol N40 for broadband dielectric spectroscopy.

Figure 7:
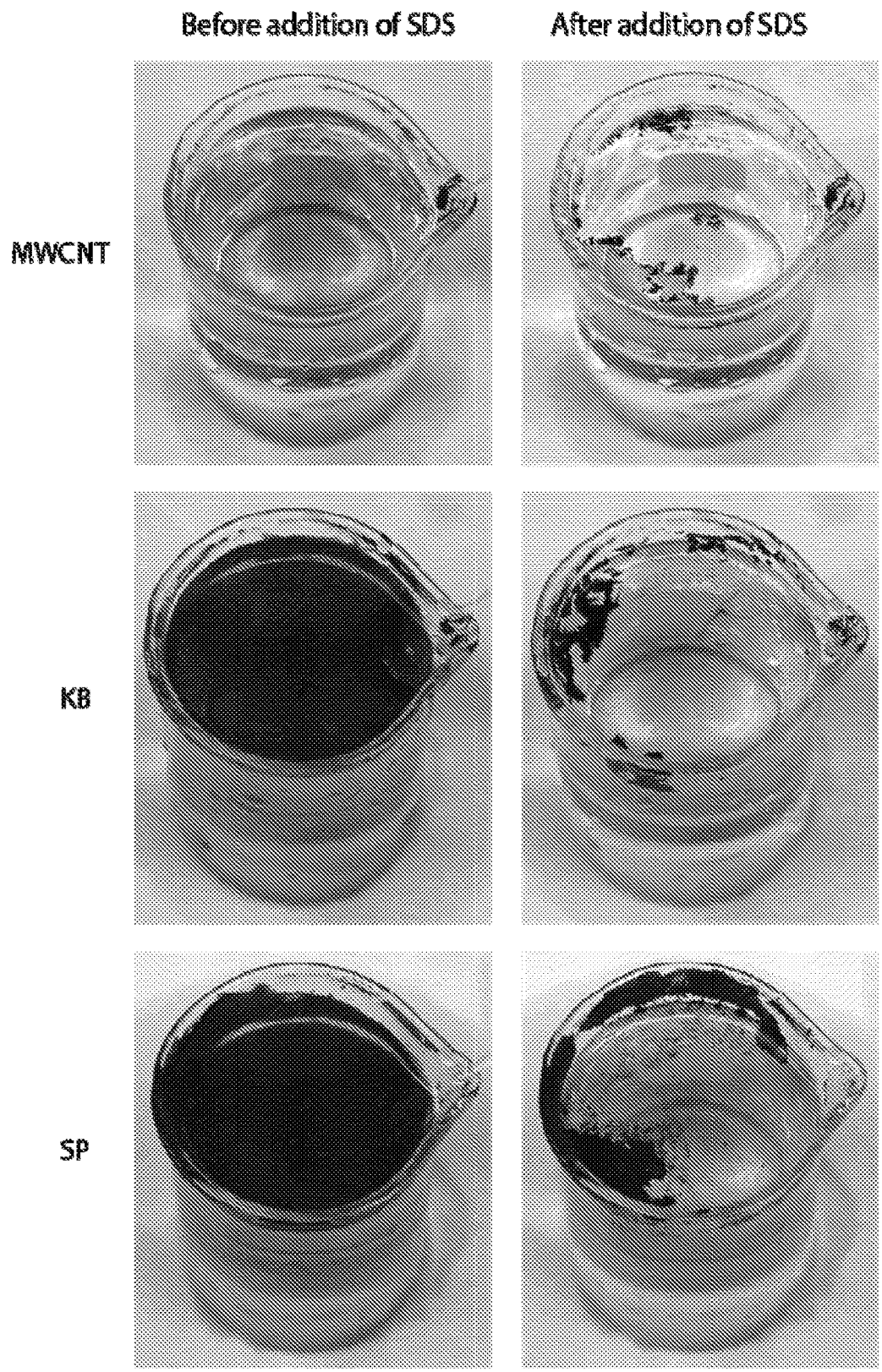
FIG. 7 shows a collapsing self-assembled LB film in the presence of SDS surfactant. The self-assembled MWCNT, KB, and SP films are formed at the surface of water using LBS coating method, and images of the films before and after adding a one-drop of SDS surfactant at the neck of the beaker are shown.

The LBSDC and LBS coating methods enable creation of well-defined layers of materials in various physical forms and chemistries on a conventional polypropylene separator, without the need for chemical binders. LBSDC is a discontinuous process that utilizes SDS surfactant, inducing Marangoni effect, to lower the surface tension of water and to provide a unidirectional force on floating particles or to a particulate LB film at the air/particle/water interface to form a dense, close-packed structure. Care is needed in this step, for on the small length scales of these monolayer films the pressure provided by the surfactant can easily exceed the stability of the self-assembled LB film, causing it to rupture due to too strong surface tension gradient (FIG. 7). Grains that exceed 200 nm in size exhibit the greatest film stability and are able to form the most densely packed coatings through the LBSDC technique. The LBS method, on the other hand, is a continuous process that uses constant injection of a particle suspension during the coating process to maintain a closely-packed LB film by a self-assembly mechanism, which is induced by the simple spreading and mixing of the water miscible fluid. This approach enables particles smaller than 200 nm in size to be coated on a mobile substrate due to the absence of the extra surface tension gradient provided by the surfactant. The LBS method is therefore more flexible than the LBSDC method, but requires constant injection of the suspension during the coating process. Hence, LBS method is simpler and more versatile than LBSDC; however, LBSDC has more precision in terms of quantifying and sizing the LB film as the desired amount of the nanoparticle suspension can be injected/compressed whereas the LBS method requires continuous injection of the suspension to maintain the self-assembly process. Either or combination of the two methods can be used for the coating on any desired solid substrates as they both have different compatibility on coating materials and compaction mechanism. It is important to note that no film quality difference is observed for LBSDC or LBS methods.

Figure 9:
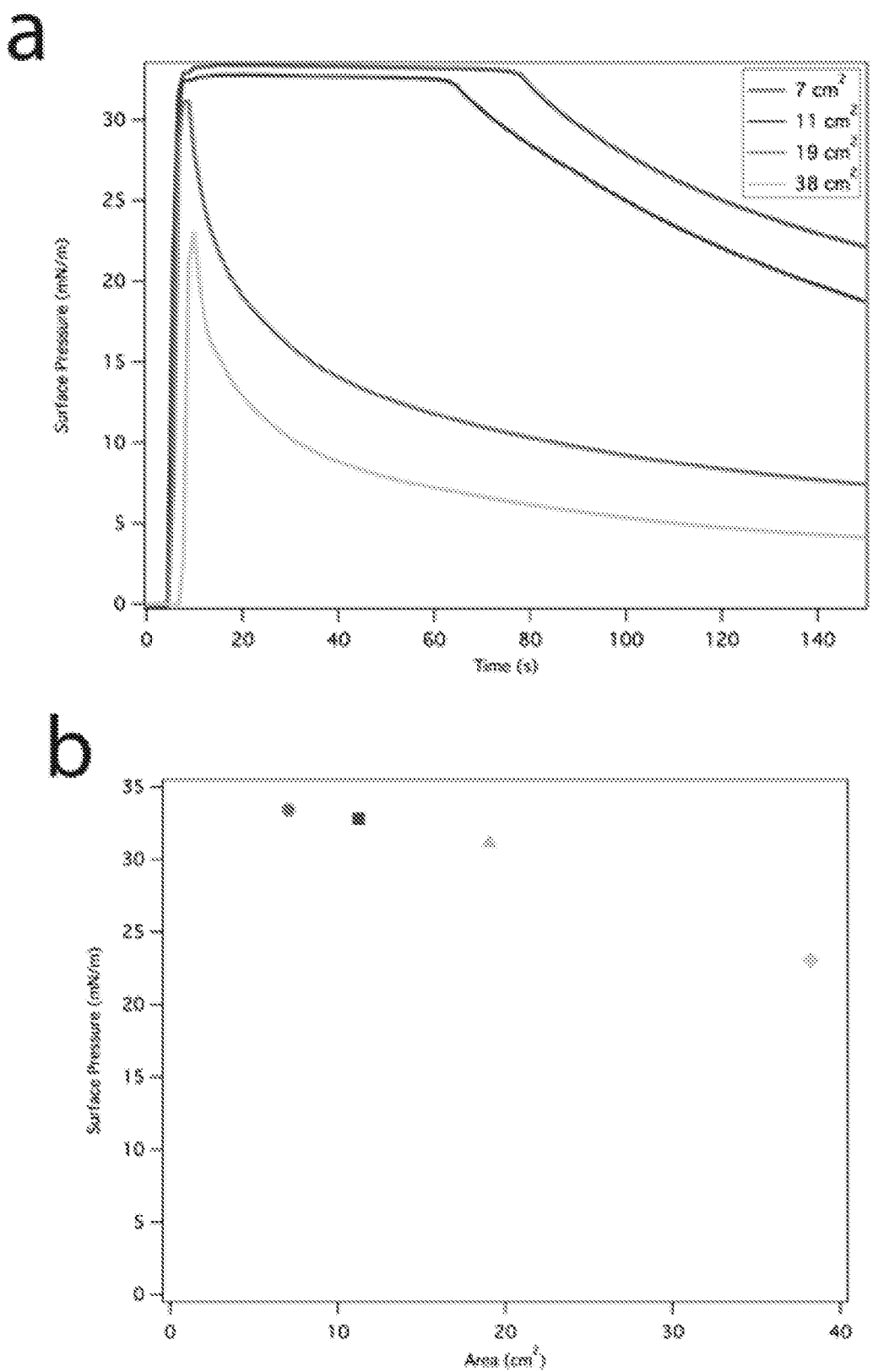
FIG. 9 shows SDS surfactant and carbon particles surface pressure profiles. (a) Surface pressures of SDS surfactant versus time for the surface area of 7 $cm^2$, 11 $cm^2$, 19 $cm^2$, and 38 $cm^2$. (b) Maximum surface pressures exerted by the surfactant for the surface area of 7 $cm^2$, 11 $cm^2$, 19 $cm^2$, and 38 $cm^2$. (c) MWCNT, KB, and SP surface pressure profiles obtained from conventional LB trough and LBS methods.
Figure 9:
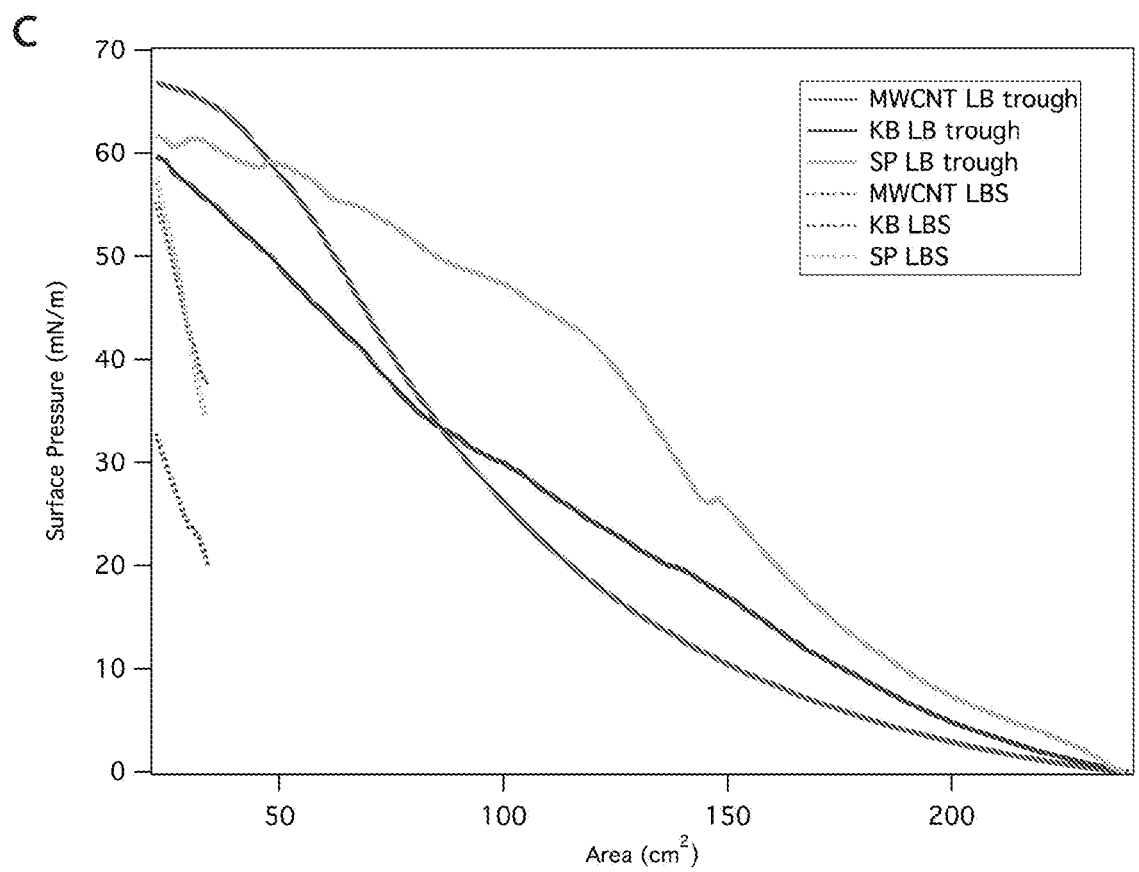

Surface pressure profiles obtained using the LBSDC and LBS approaches to assemble monoparticle layers of ~350 nm diameter sized nanospheres and MWCNT at the air/water interface are described in FIG. 8. FIG. 1 compares the pressure profiles to those obtained using a conventional LB trough. Three different surface pressure points are chosen in FIG. 1a to investigate the packing densities of the colloidal film onto a separator achieved with each of the approaches. The points A, B, and C correspond to the surface pressure of 60 mN m$^{-1}$, 33 mN m$^{-1}$, and 2 mN m$^{-1}$, respectively. Points A and C represent the surface pressure where the colloids are overly packed and inadequately packed, and point B represents the starting surface pressure from the LBSDC method. The inflection point of the surface pressure profile represents a transition point where the folding of the film starts, which is consistent with what is observed in the SEM images at point A. Point B shows the most uniform coating, which indicates that the surface pressure between 33 mN m$^{-1}$ and 38 mN m$^{-1}$ will yield the highest quality LB film. The surface pressure profile of the colloids from the LBSDC method starts at 33 mN m$^{-1}$, which represents the amount of pressure exerted by one 5 µL drop of the 3 wt % SDS surfactant on the film. This pressure from the surface tension gradient allows the colloids to be packed closely and remain stationary, and therefore, no inflection point is observed from the LBSDC profile. To confirm the packing density of the colloids using the LBSDC method, the colloids are coated onto the separator using the LB trough at 33 mN m$^{-1}$ and using the LBSDC method. A coating quality of good agreement is observed from SEM images at point B and from LBSDC, which confirms that LBSDC starts from a highly packed colloidal LB film. To understand the role of the surfactant in the LBSDC method, the maximum amount of the pressure acting on the film is measured and its stability is observed (See FIGS. 9a & 9b). The maximum pressure that the surfactant can provide is ~34 mN m$^{-1}$ and tends to slowly fade over time. The maximum pressure exerted by the surfactant matches the starting surface pressure of the colloids using the LBSDC method, where the increased pressure is the same as obtained from one drop of the surfactant.

In FIG. 1b, the surface pressure profiles of the MWCNT is compared from conventional LB trough and LBS methods, and three different surface pressure points, A', B', and C', are chosen at 61 mN m$^{-1}$, 37 mN m$^{-1}$, and 1 mN m$^{-1}$, respectively, to observe the coating quality. The MWCNT film tends to fold as shown in the SEM at point A', and poor coverage of the film is seen at point C'. A long compression region of the film is observed from the profile by comparing the area before and after the inflection point. This is because of the elastic behavior of the self-assembled MWCNT film as the film is comprised of nanotubes. Based on the geometry of the particle, different trends of the surface pressure profiles can be obtained (See FIG. 9c).

To investigate where the coating quality of the LBS lies, the surface pressure profile of the LBS method is measured and compared to the profile obtained from the LB trough. The LBS method requires a constant injection of the suspension to maintain high packing density by self-assembly mechanism induced by spreading and mixing of the suspension solvent (ethanol) with water. To observe how much pressure is exerted during the self-assembly, the surface pressure was measured by saturating the surface of the trough with MWCNT. The measured pressure is 37 mN m$^{-1}$, which is the pressure exerted from the self-assembly. Since the spreading velocity depends on the distance travelled by the particle, the area on the trough is set to around 25 cm$^2$, which is a similar surface area for our experimental coating process. No inflection point is shown from the profile, which confirms that the fibers are closely packed and compressed from the starting point. Furthermore, congruent coating qualities are observed at point B' and from the LBS in FIG. 1b, confirming that the LBS method yields a closely packed, high quality LB film. Moreover, surface pressure profiles of KB and SP carbons using the LB trough and LBS methods are measured to understand the stability of the film in the presence of the surfactant (See FIG. 9c). The starting surface pressure of MWCNT, KB, and SP from the LBS method is 37 mN m$^{-1}$, 20 mN m$^{-1}$, and 35 mN m$^{-1}$, respectively. One drop of the surfactant provides an instant pressure of 34 mN m$^{-1}$, similar to that of MWCNT and SP, while exceeding that of KB. As a result, the film starts to collapse in the presence of the extra surface tension gradient. As expected, the instant destruction of the KB film, ~1 second, is observed, while a longer destruction time, ~7 seconds, is observed for MWCNT and SP in the presence of the surfactant (FIG. 7). The above results support that the LBSDC and LBS coating methods start in an optimized packing condition and yield high-quality LB films. FIG. 2a illustrates the simplicity and effectiveness of the LBSDC and LBS methods. The coatings and their processes are important not only because they exhibit an excellent close-packed morphology, but also because they are the thinnest and highest fidelity coating on a battery separator. For example, thickness variations for silica nanospheres and MWCNT within a single monolayer of the silica particle size and ~80 nm of MWCNT (FIG. 2b) are achieved. This means that these coatings will add very little mass to a battery separator or electrode, yet significantly optimize the electrochemical performance in the batteries due to the uniform and densely-packed coating layers.

The polypropylene Celgard™ membrane used as a separator in the Li—S battery was chosen as a substrate to illustrate the utility of the LBSDC and LBS approach for at least three reasons. First, the rechargeable Li—S battery is arguably one of the most important platforms for storing large amounts of electrical energy at a moderate cost. The redox reaction between lithium and sulfur, $16Li+S_8 \Leftrightarrow 8Li_2S$, occurs spontaneously, is reversible, and produces up to two electrons per formula unit of sulfur, without intervention with catalysts or other means. These features endow the Li—S battery with high theoretical specific energy, 2600 Wh $kg^{-1}$, and low material and operating costs.

Second, in practice Li—S cells fail to deliver on these high expectations for two stubborn, fundamental reasons: (i) sulfur and its reduction compounds with lithium are such poor conductors that unless the electrochemical reactions between $Li^+$ and sulfur occur in solution near a conductive substrate or in subnanometer-sized pores of a conductive host material such as microporous carbon, only a small fraction of the active sulfur material in the cathode is electrochemically accessible; and (ii) the reaction between $Li^+$ and $S_8$ is a multi-step reaction, in which the higher molecular weight intermediate species $Li_2S_x$ ($x \geq 4$), collectively termed lithium polysulfides (LiPS), are soluble whereas the lower molecular weight ones ($x<3$) are not. Dissolution of LiPS in an electrolyte means that a substantial fraction of the active material can be lost before it is fully reduced to $Li_2S$, if the LiPS diffuses too far from the conductive substrate in the cathode. An even greater concern is that once in the electrolyte, LiPS can diffuse to the lithium metal anode and undergo chemical reduction to form polysulfides of lower order, some of which are insoluble and deposit on the anode, causing time-dependent loss of both lithium and sulfur in a parasitic process termed shuttling.

Finally, a variety of approaches have been investigated for controlling LiPS dissolution, diffusion, and shuttling in Li—S cells. Methods ranging from sequestering the sulfur in porous carbon structures in nanospheres, nanotubes/nanofibers, graphene/graphene oxide sheets all utilize the strong affinity of sulfur for carbon-based materials to limit dissolution. Other workers have shown that strong specific interactions of LiPS with amine-containing molecular and inorganic chalcogenide, particulate additives can be used to reduce sulfur loss to the electrolyte. Even in the best cases, however, there is a finite, equilibrium concentration of LiPS dissolved in the electrolyte such that chemical potential of LiPS in the cathode is equal to that in the electrolyte. As a result, the dissolved LiPS are still able to diffuse to the Li anode, react with it, and increase the interfacial resistance of the anode. It was previously shown that a substantial amount of LiPS is also lost by adsorption in the pores of the separator and that this source of loss can be removed in model Li—S cells run in a separator-/membrane-free configuration, but at the price of very high interfacial impedances at the anode. Other works have shown that incorporation of carbon, metal-oxide, and polymer coatings on separators can reduce LiPS loss, but the electrolyte must still be reinforced with additives such as $LiNO_3$ thought to limit LiPS reaction with metallic lithium, for stable cell cycling over extended periods or in practical lithium- and electrolyte-lean Li—S cell designs.

Figure 10:
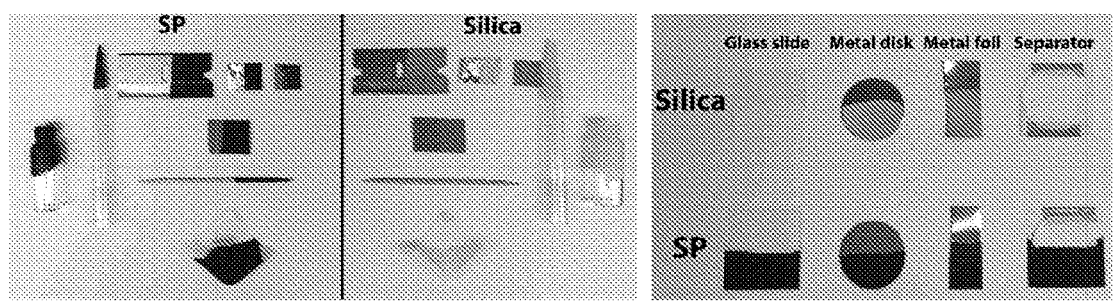
FIG. 10 shows demonstrating versatility of the LB coating methods. (a) Images of fluorescent 1 μm silica nanosphere and SP carbon coatings on various nonuniform (left) and uniform (right) substrates using LBS coating method. Note that fluorescent silicon and SP carbon are used to enhance the visibility of the coatings on the substrates. (b) Demonstration of single-sided and layer-by-layer separator coating (left) and mechanical strength of the single component coating (right). (c) Images of single coating layer of various materials on the separator—Multi-walled carbon nanotube (MWCNT), Ketjen Black carbon (KB), Super P carbon (SP), Microporous carbon (MC), Graphite, Hard carbon (HC), 350 nm silica nanospheres, 1 μm polystyrene spheres (PS), titania nanopowder, and polyaniline (PANI).
Figure 10:
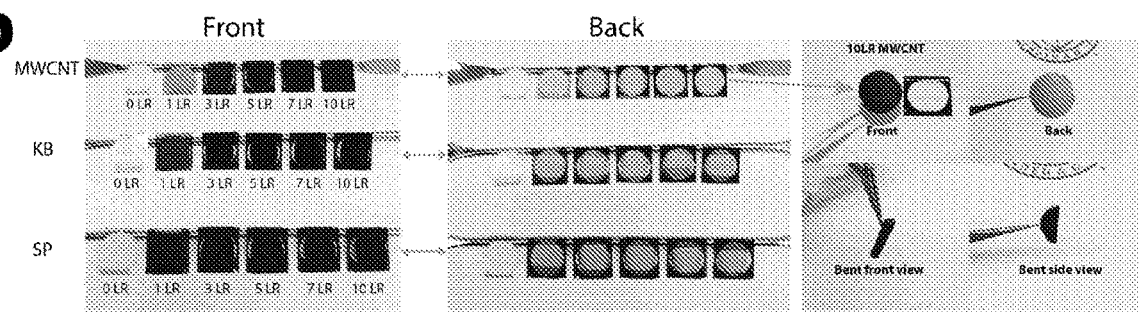
Figure 10:
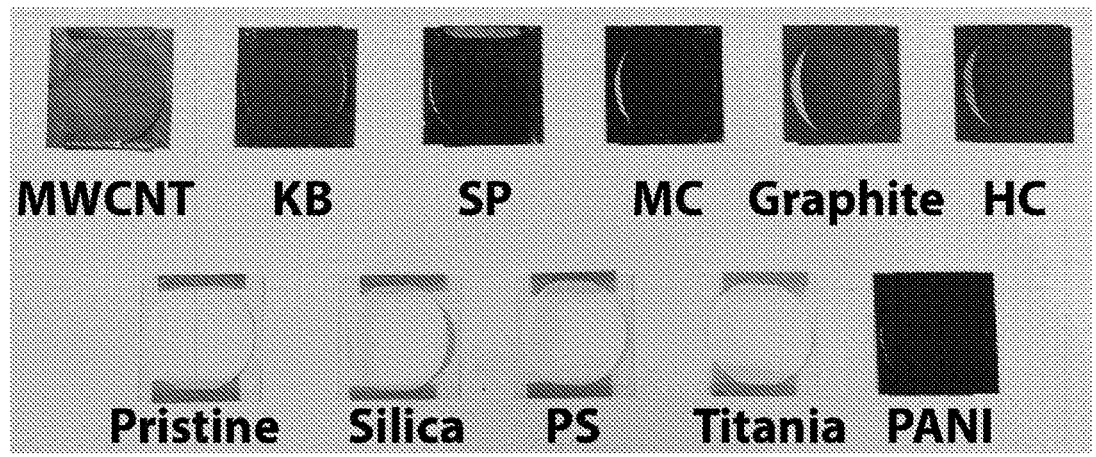

A broad range of materials such as SP carbon, KB carbon, carbon nanofibers/tubes, mesoporous carbon, alumina and graphene were coated on Celgard™, and the electrochemical performances of Li—S cells based on these separators are investigated in literatures. To note the versatility and adaptability of the developed coating methods, large selections of a material with one or more different coating materials are coated on the separator and are suitable for different substrates (FIG. 10). The thickness of a single layer coating of MWCNT, KB, and SP is ~80 nm, ~350 nm, and ~850 nm, respectively (FIG. 2b). The corresponding gravimetric coverage of a single layer of MWCNT, KB, SP, and ~350 nm silica nanospheres is ~5 μg $cm^{-2}$, ~17 μg $cm^{-2}$, ~20 μg $cm^{-2}$, and ~25 μg $cm^{-2}$, respectively (FIG. 2b).

Figure 11:
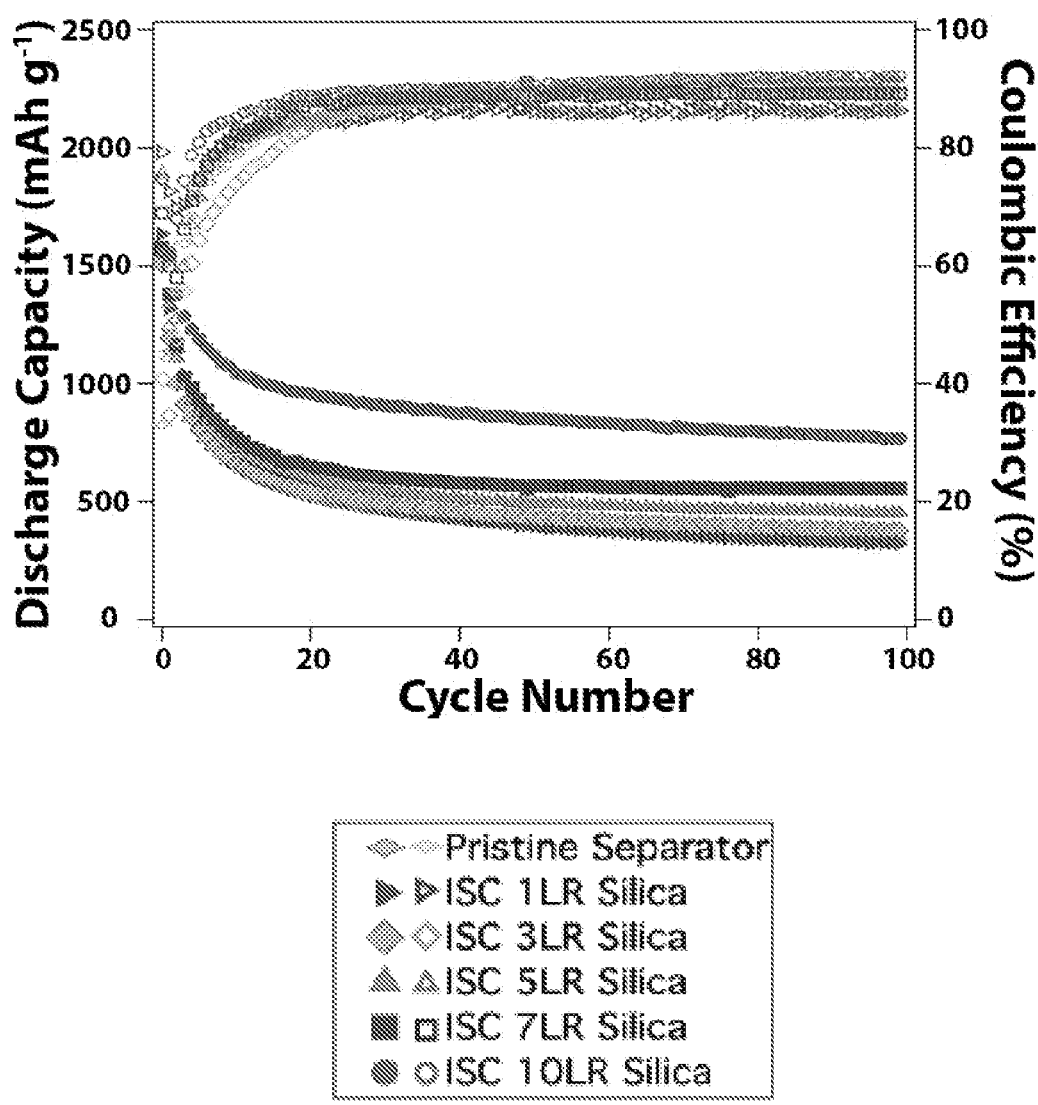
FIG. 11 shows electrochemical performances of KB and SP carbon coated separators with ISC. Electrochemical performance of zero to ten coating layers of (a) Silica nanospheres, (b) MWCNT, (c) KB and (d) SP coated separators Li—S cells at 0.2 C for the silica and 0.5 C for the carbon coatings.
Figure 11:
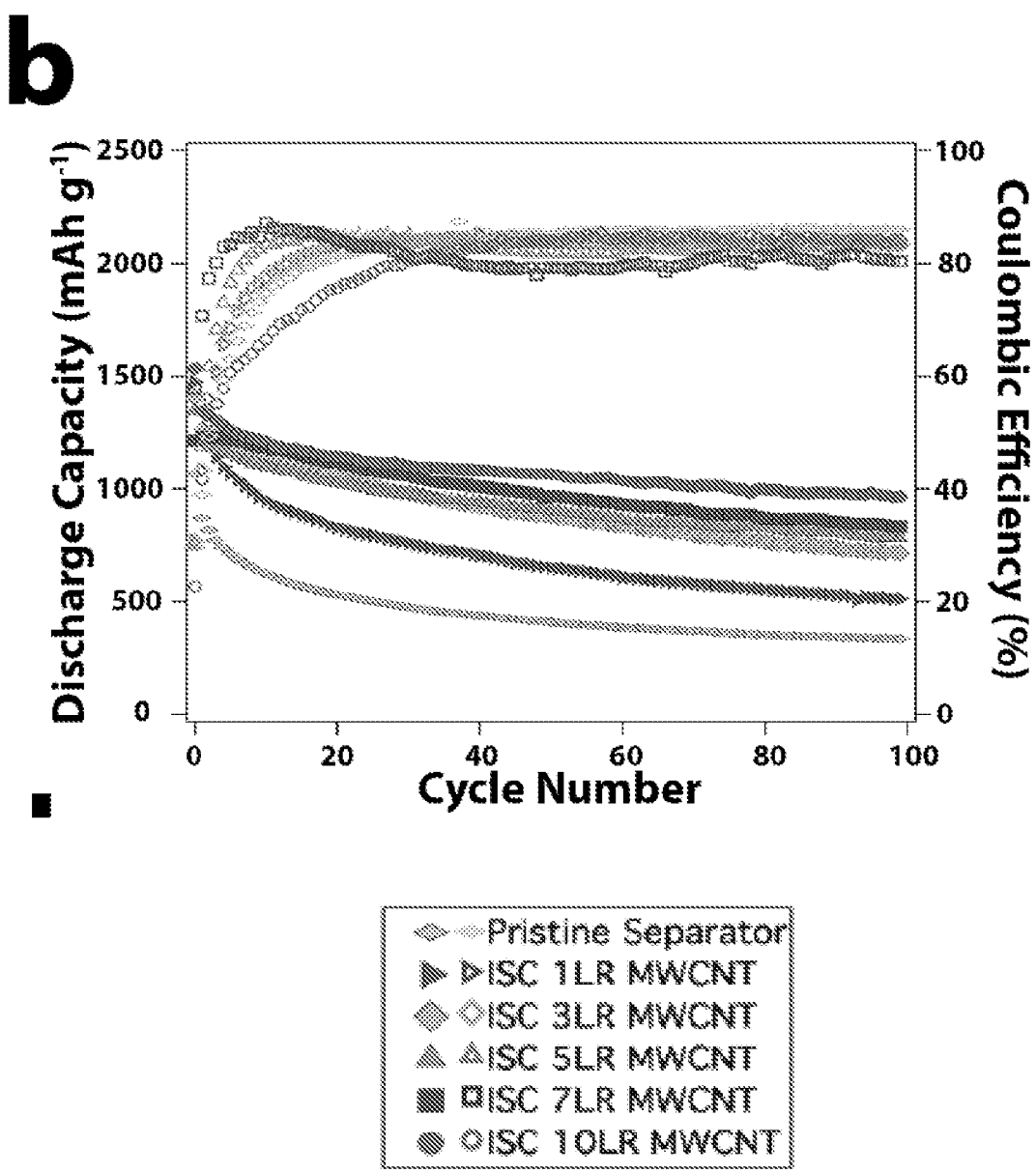
Figure 11:
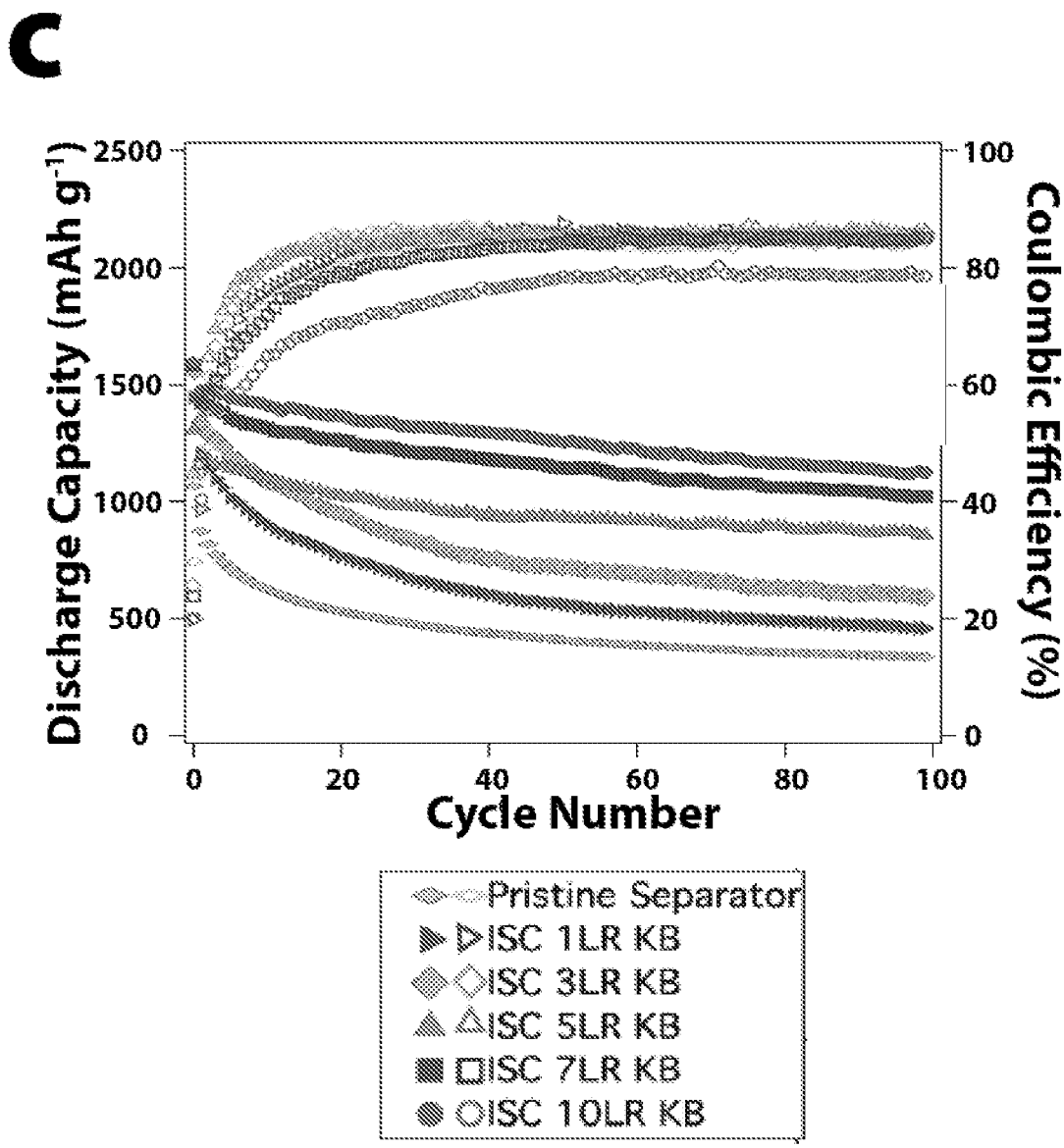
Figure 11:
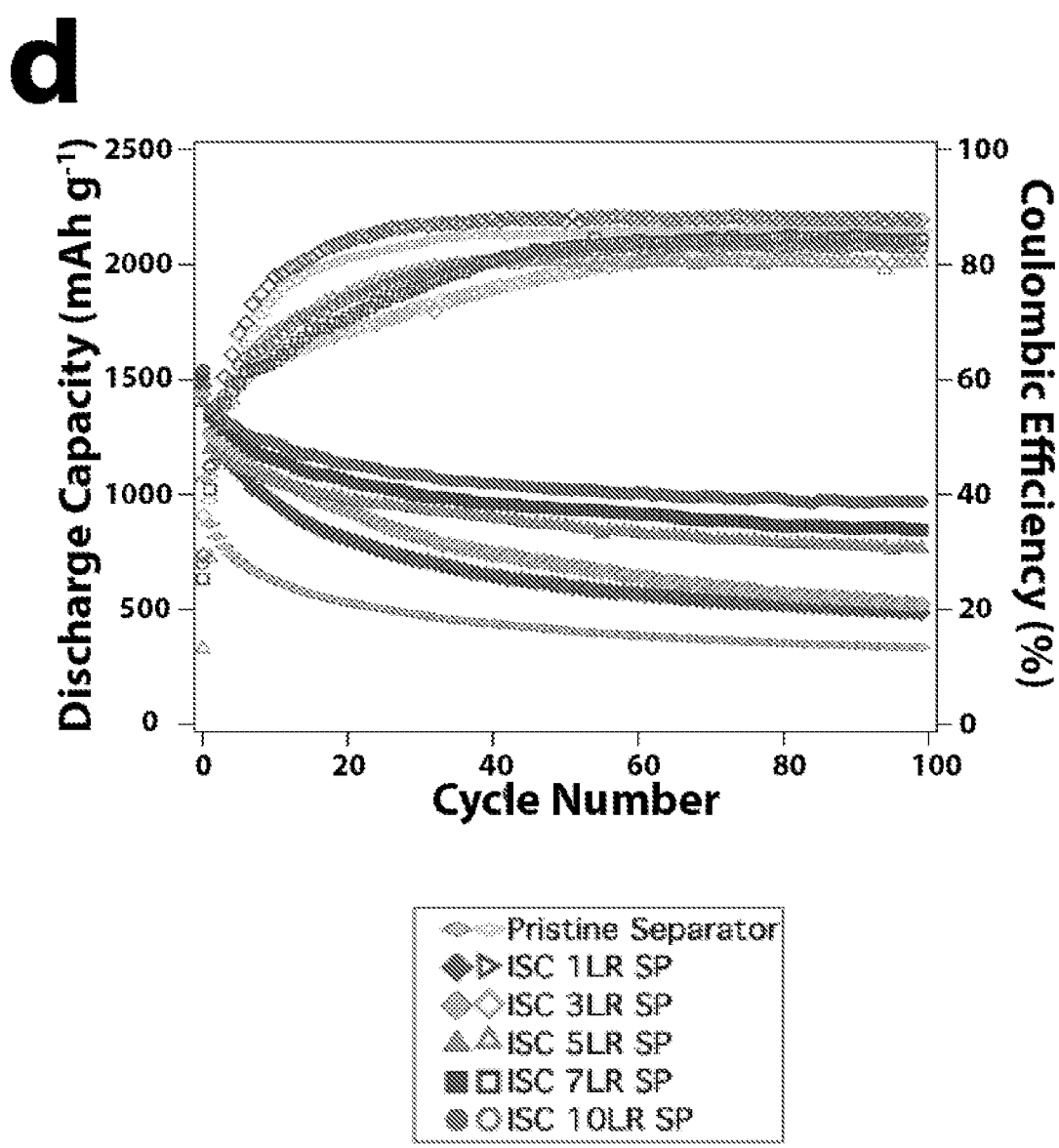

The negligible weight gained per coating layer with high uniformity is best appreciated by comparison to literature results, where carbon materials are coated using the vacuum filtration (Loading: 0.17 to 0.35 mg $cm^{-2}$, Thickness: 20 to 25 μm) or doctor-blade (Loading: 0.26 to 0.53 mg $cm^{-2}$, Thickness: 6.7 to 27 μm) methods. As illustrated in FIG. 10b, LBS coatings on Celgard™ are single-sided and exhibit high mechanical strength absence of chemical binders. The effectiveness of LBS-coated Celgard™ comprised of 1-10 coating layers of silica nanospheres, MWCNT, KB, and SP were systematically studied for their ability to improve cycling behavior in Li—S cells. As shown in FIG. 11, Li—S cells based on the carbon coated separator yield superior capacity and retention rates, compared with pristine Celgard™ separator. Specifically, the capacity retention after 100 cycles is improved from 31% for the pristine separator to 63%, 71%, 63%, and 49% for ten coating layers of MWCNT, KB, SP, and silica nanospheres, respectively. The initial capacity for the pristine separator, 10LR MWCNT, 10LR KB, 10LR SP, and 10LR are 1067 mAh 1535 mAh $g^{-1}$, 1594 mAh $g^{-1}$, 1541 mAh $g^{-1}$, and 1588 mAh $g^{-1}$, respectively at 0.5 C for the first four and 0.2 C for the last.

Our results show that carbon-coated Celgard™ is more effective than the silica-coated material in stabilizing capacity retention of Li—S cells. We attribute this behavior to the stronger adsorption of LiPS on the $SiO_2$ coating layer by physical and covalent bonds and the inability to utilize the trapped LiPS. As we observe in FIG. 11a, ten layers silica-coated separator LiS cells show increase in coulombic efficiency approximately 90% after $100^{th}$ cycles whereas the all carbon coated separators exhibit lower efficiency values. This verifies that silica coatings are effective in terms of suppressing LiPS shuttling; however, severe capacity fading at initial cycles is observed due to silica's inability to reutilize the adsorbed LiPS at the surface. Moreover, our results also confirm previous observations, that MWCNT and KB are particularly effective as separator coatings because the interconnected porous structure of coatings based on these carbon materials allow for both trapping of LiPS and utilization of the trapped materials in electrochemical cycling. It is important to note, however, that the weight of MWCNT per coating layer is only 25% that of KB, implying that the MWCNT coating is by far the most efficient of the carbon materials studied.

A separator coating design that offers a combination of the strong LiPS binding attributes of a close-packed array of $SiO_2$ particles and high utilization of trapped LiPS evident for MWCNT would seem ideal for Li—S cells. This perspective is at odds with the work of Yao et al, which previously demonstrated that a LiS battery separator coated with a mixture of ceramic nanoparticles and SP carbon, using the doctor-blade coating method, yields cells with poorer electrochemical performance than those in which a simple SP coating layer was used.

It this example, we took advantage of the spatial control afforded by the LBS and LBSDC coating strategy to create a multifunctional separator coating with the configuration shown in FIG. 3a. In this so-called clip configuration multiple layers of closely packed silica particles are surrounded by a conductive fibrous network based on MWCNT. The location of the silica layer is designed such that under compression in a battery, the two MWCNT coatings contact each other (like the clasps of a clip) and also make contact with the cathode so as to ensure maximum electrochemical access to LiPS trapped in any of the coating layers that comprise the clip. As a proof of concept, we created and studied clip coating designs comprised of five coating layers of MWCNT and three monolayers of silica. The quality and mechanical strength of these coatings are illustrated in FIGS. 3b-e. FIG. 3b shows the cross section of the clip configuration, where it is seen that the material has a consistent structure and a thickness of ~3 μm. The clip configuration of the coating has also been confirmed by SEM image at the silica-carbon layer boundary (FIG. 3d). FIG. 3c then shows a uniform thin fibrous morphology of the coating surface after the final layer of MWCNT coverage is established over the three layers of silica nanosphere film. We observed the immersion of close-packed silica layers at the third layer on top of the SP layer of the clip coating (FIG. 3d). For reference, one monolayer of silica nanospheres is also shown in FIG. 12.

In order to investigate the electrochemical performance of the clip-coated separator, three different cathodes, infused sulfur cathode (ISC), vapor infused sulfur cathode (VISC), and ball-milled sulfur cathode (BMSC), were used. FIG. 4a describes results from galvanostatic cycling studies of the clip separator in a 1M LiTFSI DOL/DME electrolyte and with ISC. As we observe in FIG. 4a, in the control case with the pristine (uncoated) separator, the capacity dropped to 360 mAh g$^{-1}$ after 100 cycles at a current rate of 0.5 C (838 mA g$^{-1}$). However, when the separator was coated using the aforementioned clip configuration, the clip coated separator Li—S cells without any additives exhibits initial discharge capacity of 1470 mAh g$^{-1}$ with the reversible capacity of 1210 mAh g$^{-1}$ and the capacity retention rate of 82% at 100$^{th}$ cycle with 0.5 C rate. The cells with the clip coated separators also exhibit superior performance at high current rates. Initial capacities of ~1400 mAh g$^{-1}$ were obtained at 1 C and 2 C. FIG. 4b describes the corresponding voltage profiles at different cycle numbers for the clip configuration at 0.5 C. Two discharge plateaus can be seen over many cycles: The first plateau at 2.37 V corresponds to the reduction of the elemental sulfur to high order LiPS, whereas the second plateau at 2.08 V indicates the high order LiPS reduction into low order LiPS. The voltage profiles for the clip coated (various C rates) and uncoated separator (various cycles) control are provided in FIG. 13. It is clear that the voltage plateaus for the discharge and charge processes does not change when the current is increased by 2 or 4 times for the clip coated separators.

Figure 14:
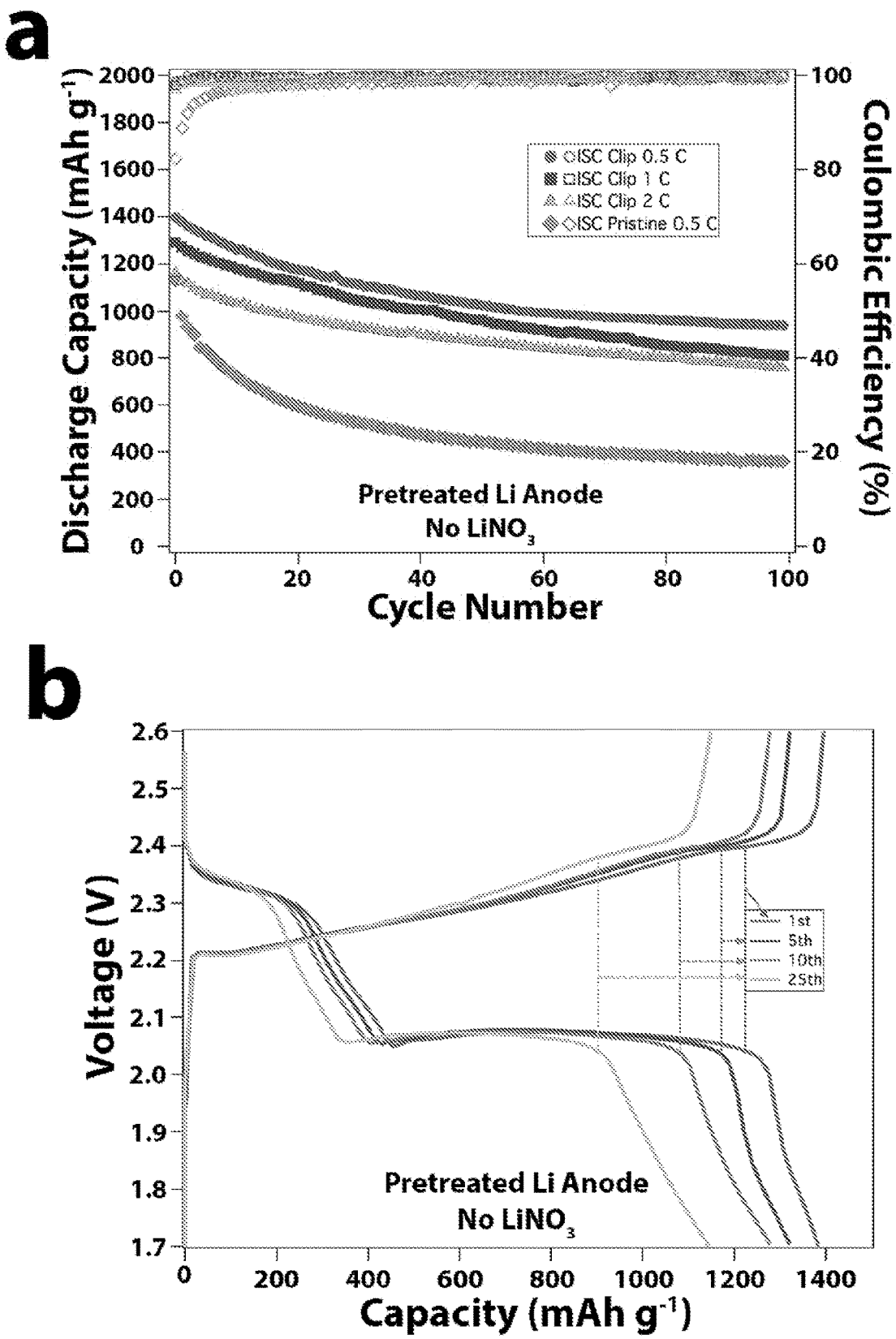
FIG. 14 shows electrochemical performances of clip coated separators with pretreated Li anode and ISC. (a) Cycling performance of the pretreated Li anode Li—S cell with/without the clip coated separator and with ISC at three different C rates. (b) Discharge-charge voltage profiles of the pretreated Li anode Li—S cell with the clip coated separator and with ISC at 0.5 C. Note that $LiNO_3$ is not present in the electrolyte.
Figure 15:
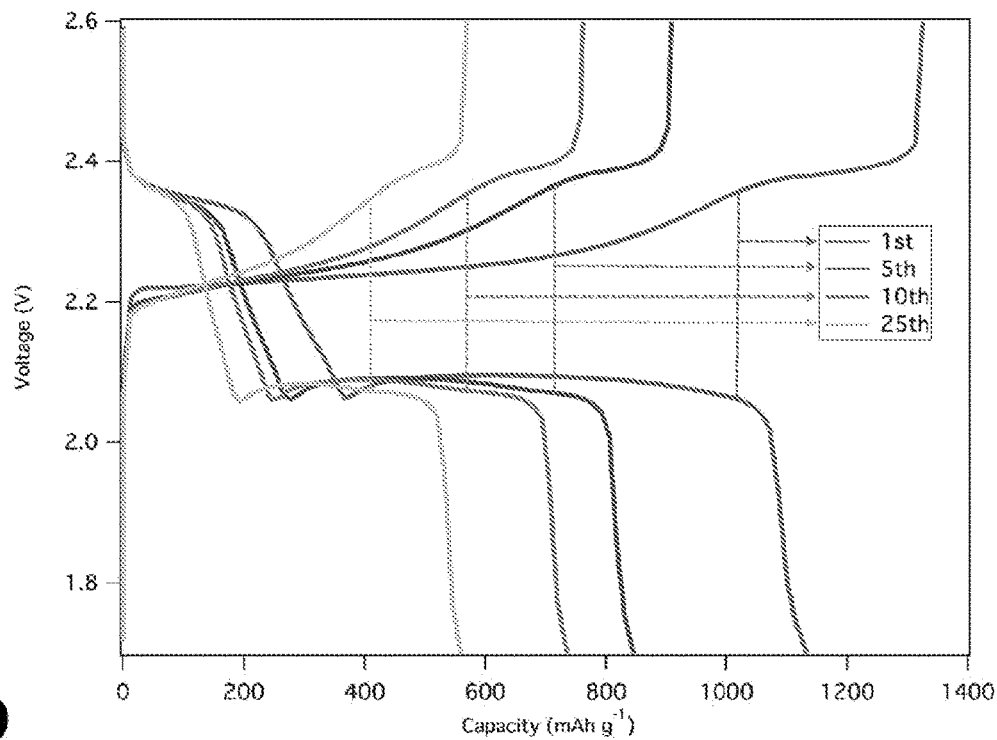
FIG. 15 shows discharge-charge voltage profiles of clip coated separator Li—S cell with the pretreated Li anode and with ISC for (a) various cycles at 0.5 C and (b) various C rates at $25^{th}$ cycle.
Figure 15:
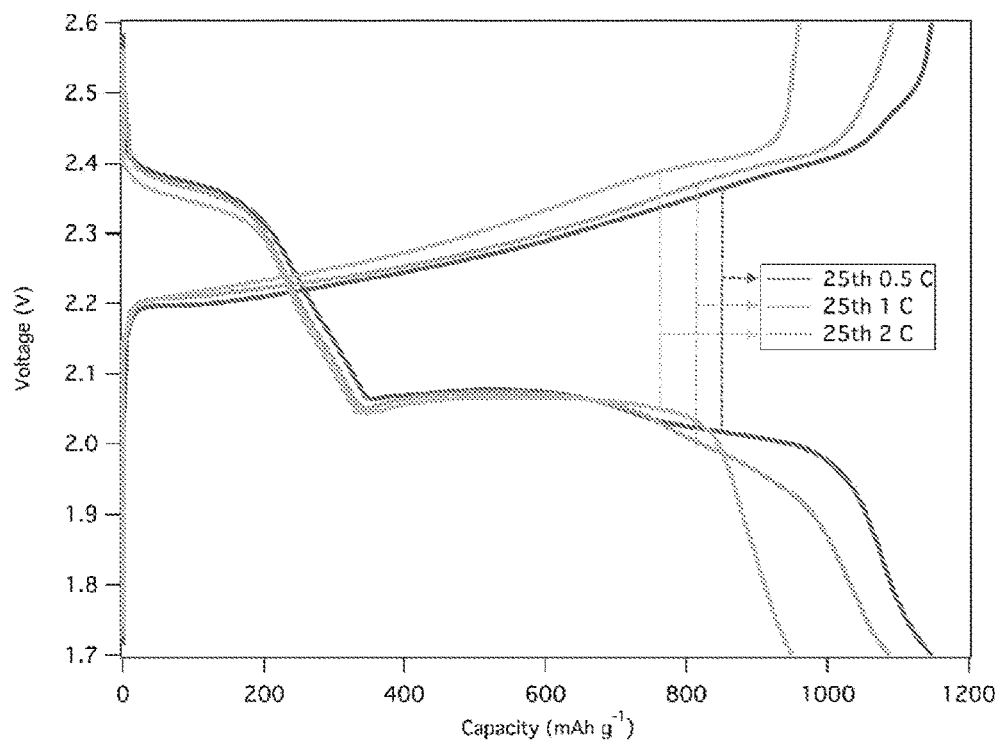
Figure 16:
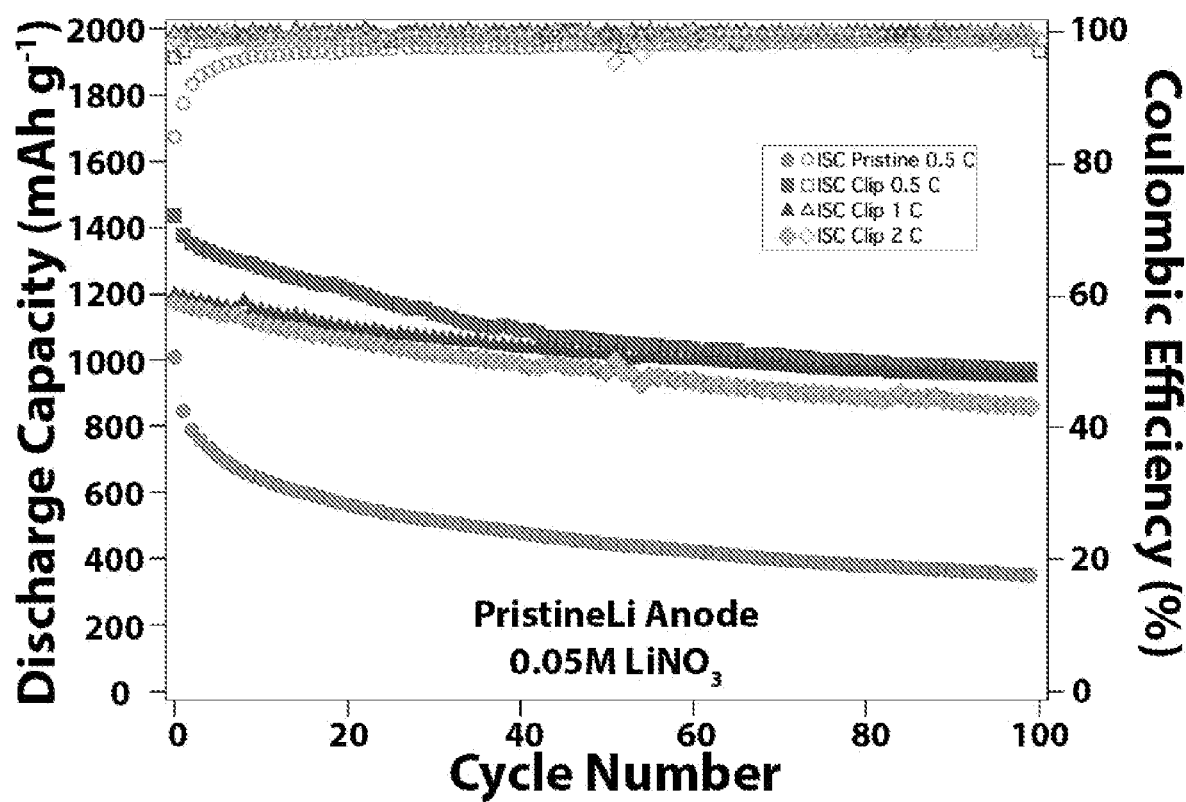
FIG. 16 shows electrochemical performances of clip coated separators with pristine Li anode, ISC, and $LiNO_3$ in the electrolyte. Cycling performance of pristine Li anode of the Li—S cell with/without the clip coated separator and with ISC at three different C rates with 0.05M $LiNO_3$ in the electrolyte.
Figure 17:
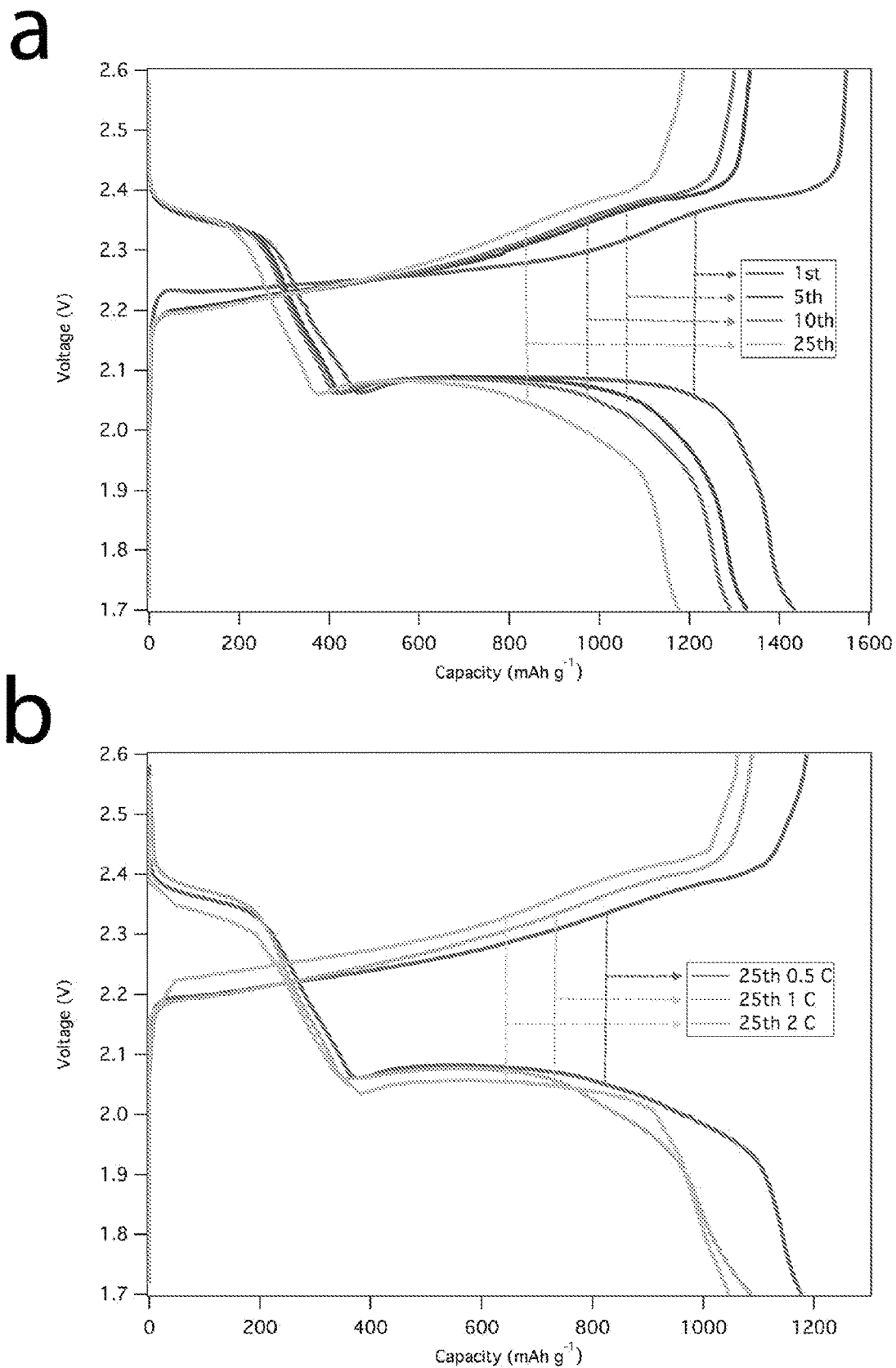
FIG. 17 shows cycling performance and voltage profiles of Li—S cells with clip coated separator, ISC, and 0.05M $LiNO_3$ in the electrolyte. (a) Discharge-charge voltage profiles of clip coated separator Li—S cell with 0.05M $LiNO_3$ added in the electrolyte and with ISC for various cycles at 0.5 C. (b) Discharge-charge voltage profiles of the clip coated separator Li—S cell with 0.05M $LiNO_3$ in the electrolyte and with ISC at $25^{th}$ cycle at various C rates.

To enhance the coulombic efficiency (CE) of the LiS cells, we used pretreated lithium metal anode (See FIG. 14) as previously described, by soaking it in an electrolyte containing LiNO$_3$ for 24 hours followed by rigorous drying in an Ar environment. By using the pretreated Li metal anode, ~99.9% CE are achieved (See FIG. 14). The corresponding voltage profiles are shown in FIG. 15. To facilitate comparisons with literature results, we also performed studies using a conventional Li—S electrolyte containing 0.05M LiNO$_3$ as the additive, and the results are shown in FIG. 16 and corresponding voltage profiles are shown in FIG. 17.

Figure 18:
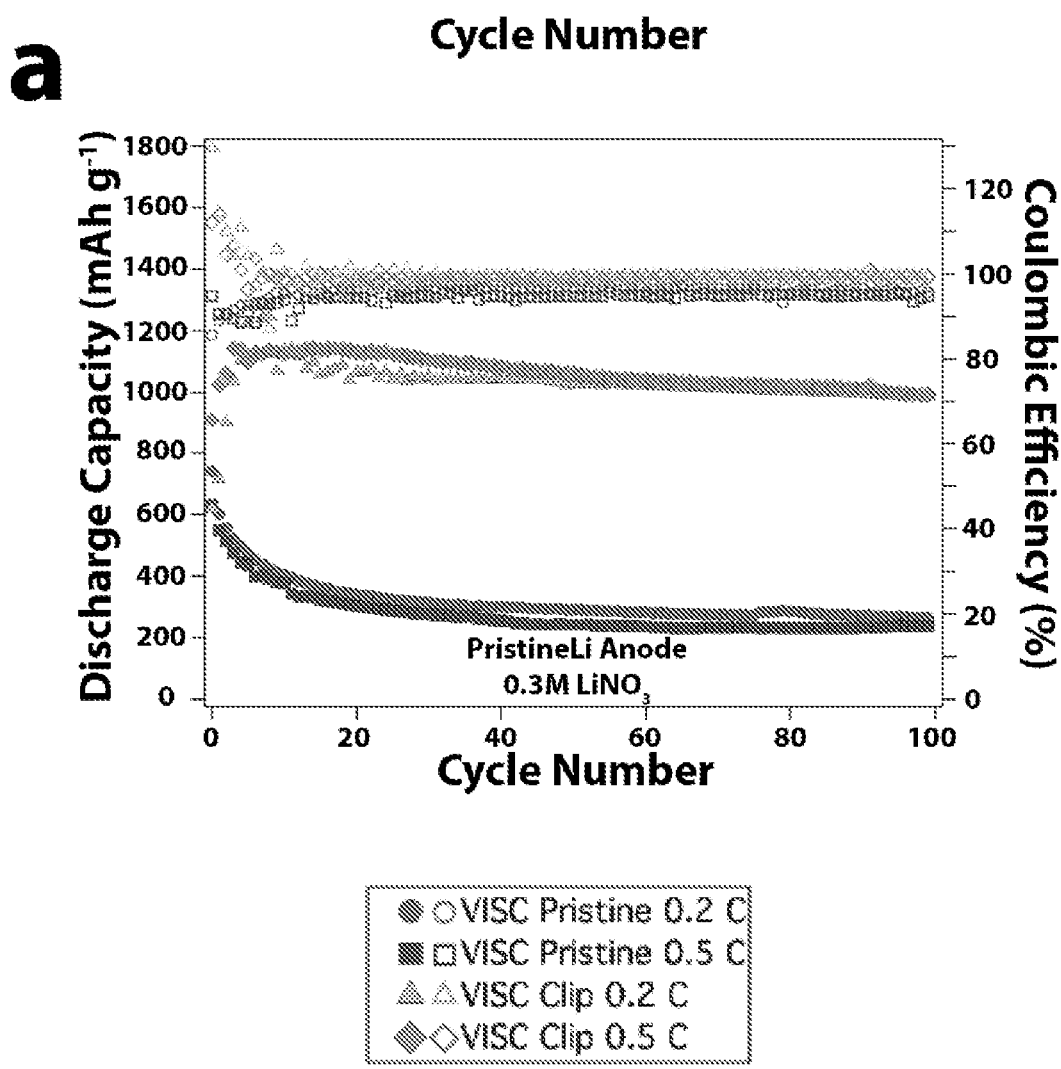
FIG. 18 shows electrochemical performances of clip coated separators with pristine Li anode, VISC, and with/without $LiNO_3$ in the electrolyte. (a) Cycling performance of the pristine Li anode Li—S cells with/without the clip coated separator, with VISC, and 0.3M $LiNO_3$ in the electrolyte at two different C rates. (b) Cycling performance of the pristine Li anode Li—S cells with/without the clip coated separator and with VISC at two different C rates without $LiNO_3$ in the electrolyte.
Figure 18:
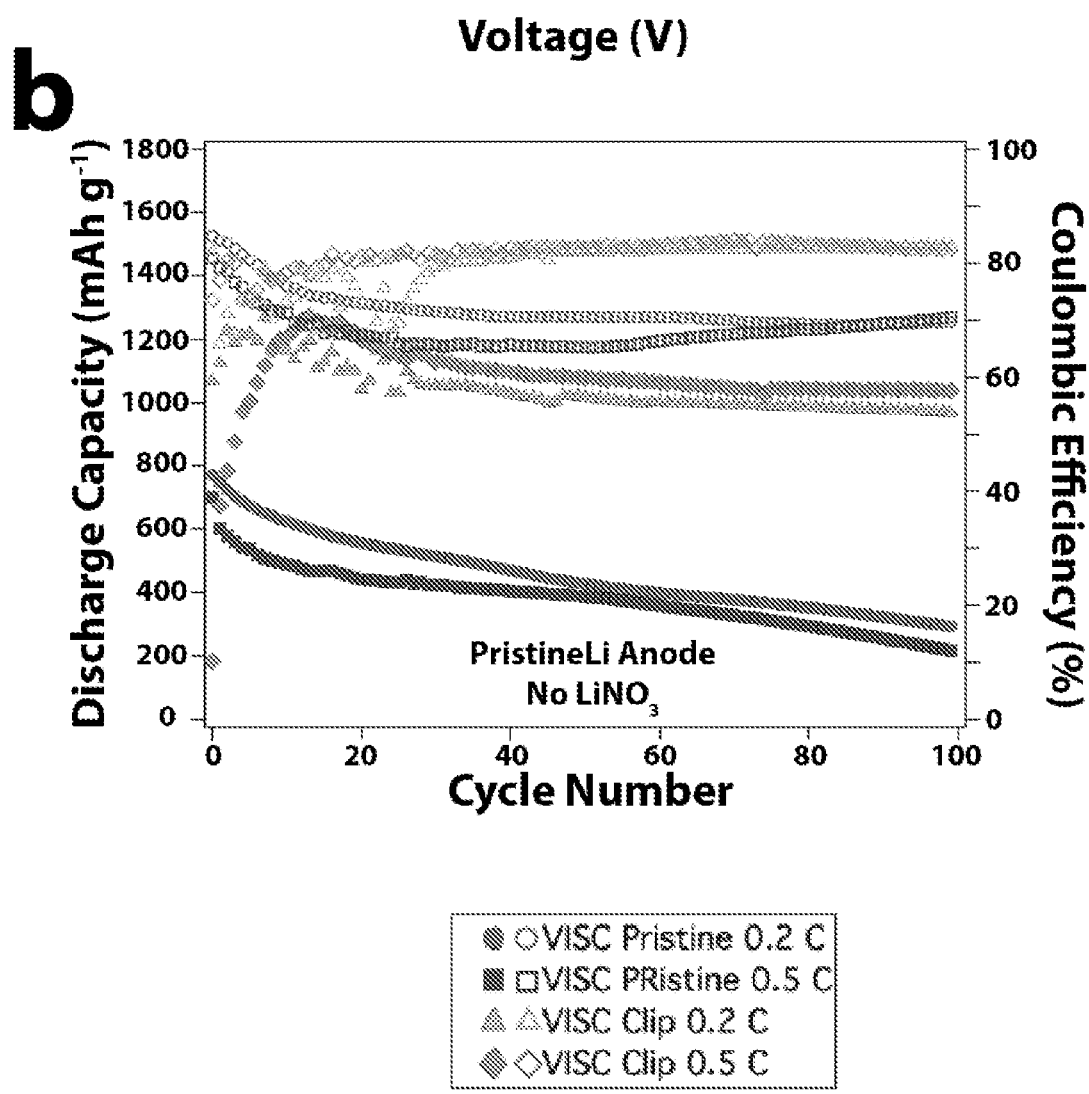
Figure 19:
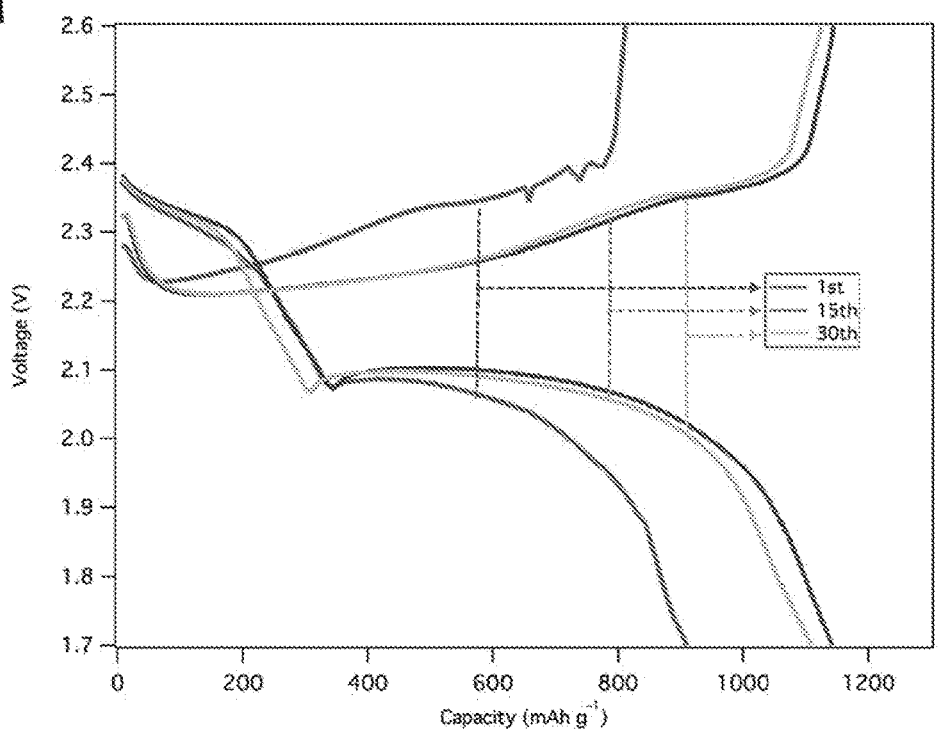
FIG. 19 shows voltage profiles of Li—S cells with clip coated separator and VISC. (a) Discharge-charge voltage profiles of clip coated separator Li—S cell with VISC and 0.3M $LiNO_3$ added in the electrolyte for various cycles at 0.5 C. (b) Discharge-charge voltage profiles of clip coated separator Li—S cell with VISC and 0.3M $LiNO_3$ added in the electrolyte for various cycles at 0.2 C. (c) Discharge-charge voltage profiles of clip coated separator Li—S cell with VISC for various cycles at 0.5 C. (d) Discharge-charge voltage profiles of clip coated separator Li—S cell with VISC for various cycles at 0.2 C. (e) Discharge-charge voltage profiles of pristine separator Li—S cell with VISC and 0.3M $LiNO_3$ added in the electrolyte for various cycles at 0.5 C. (f) Discharge-charge voltage profiles of pristine separator Li—S cell with VISC and 0.3M $LiNO_3$ added in the electrolyte for various cycles at 0.2 C. (g) Discharge-charge voltage profiles of pristine separator Li—S cell with VISC for various cycles at 0.5 C. (h) Discharge-charge voltage profiles of pristine separator Li—S cell with VISC for various cycles at 0.2 C.
Figure 19:
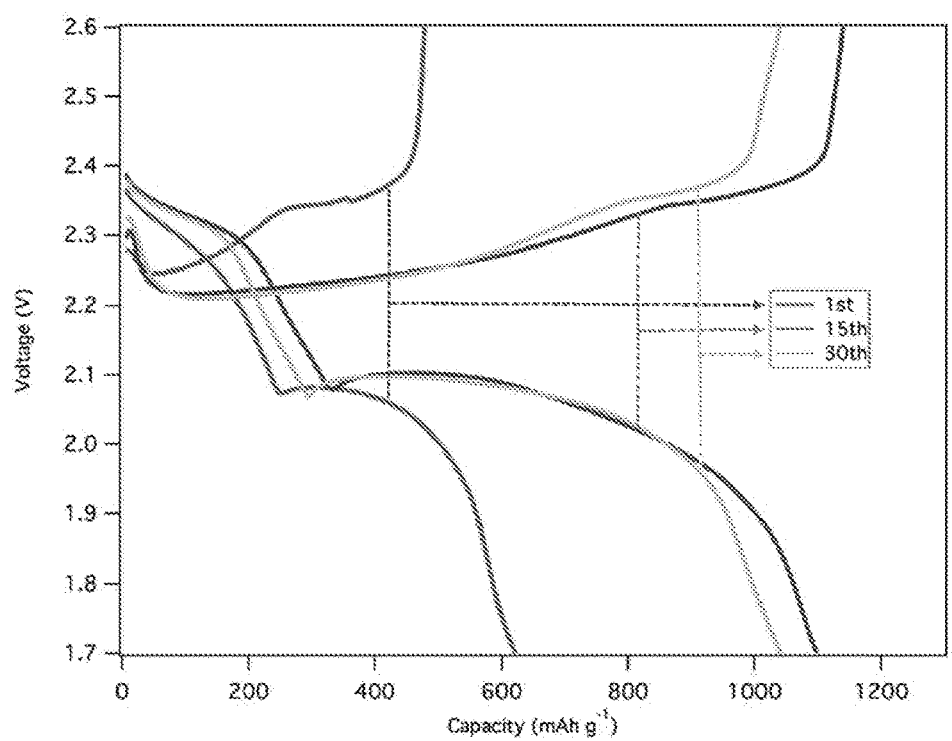
Figure 19:
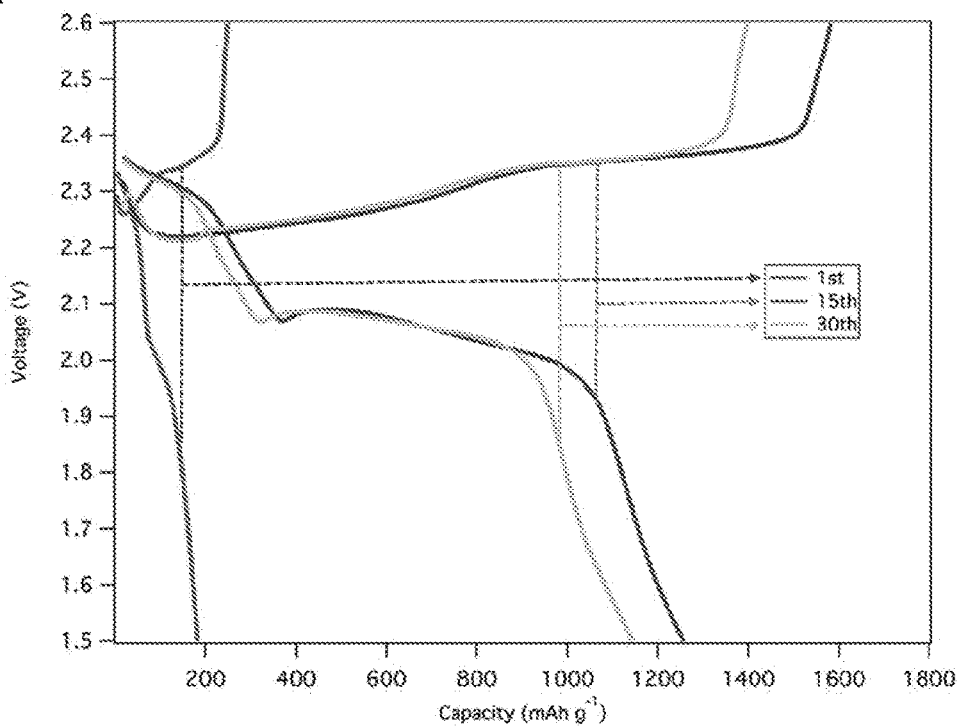
Figure 19:
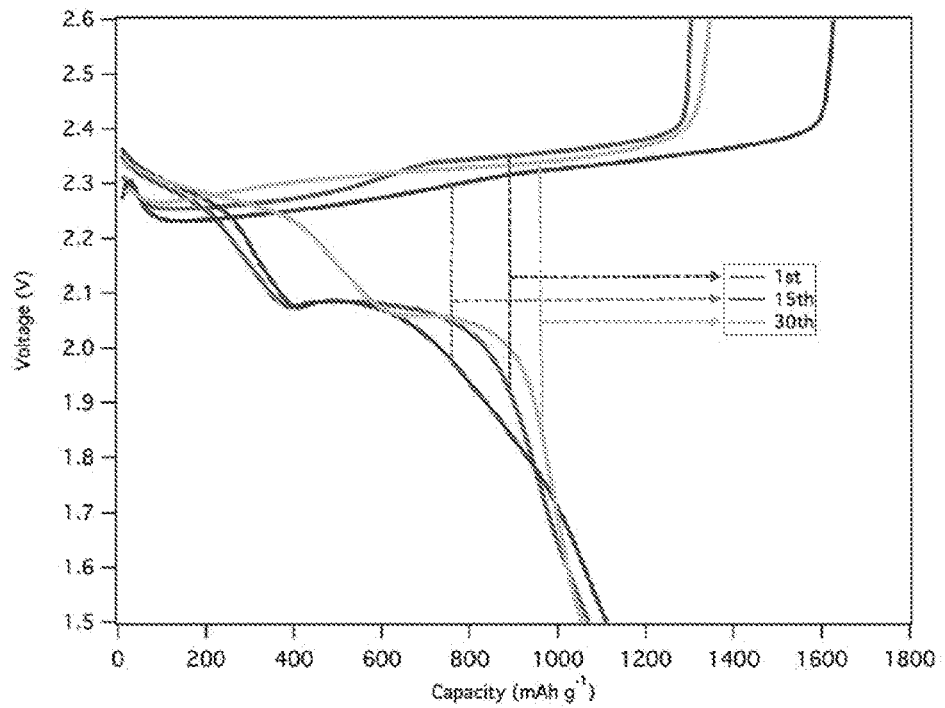
Figure 19:
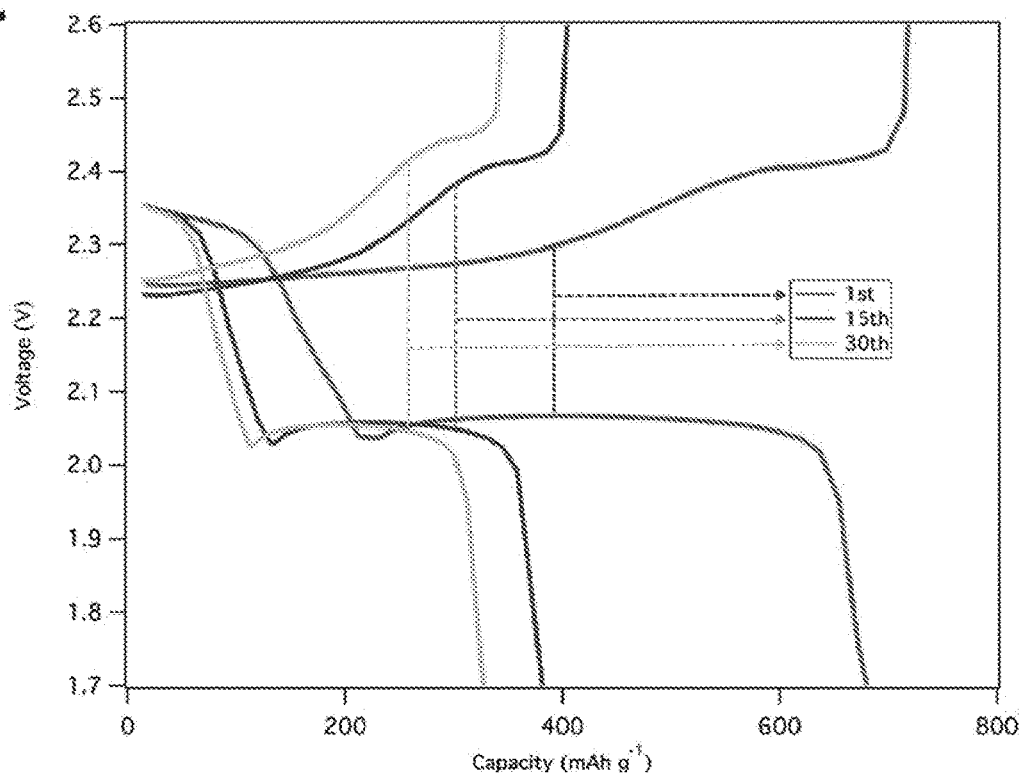
Figure 19:
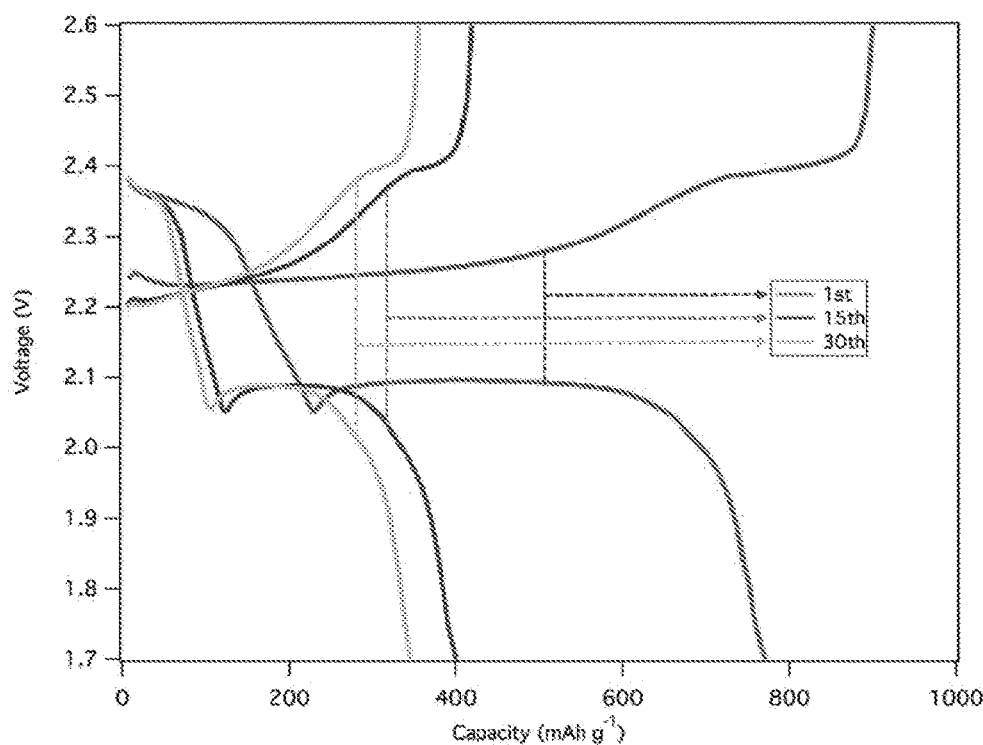
Figure 19:
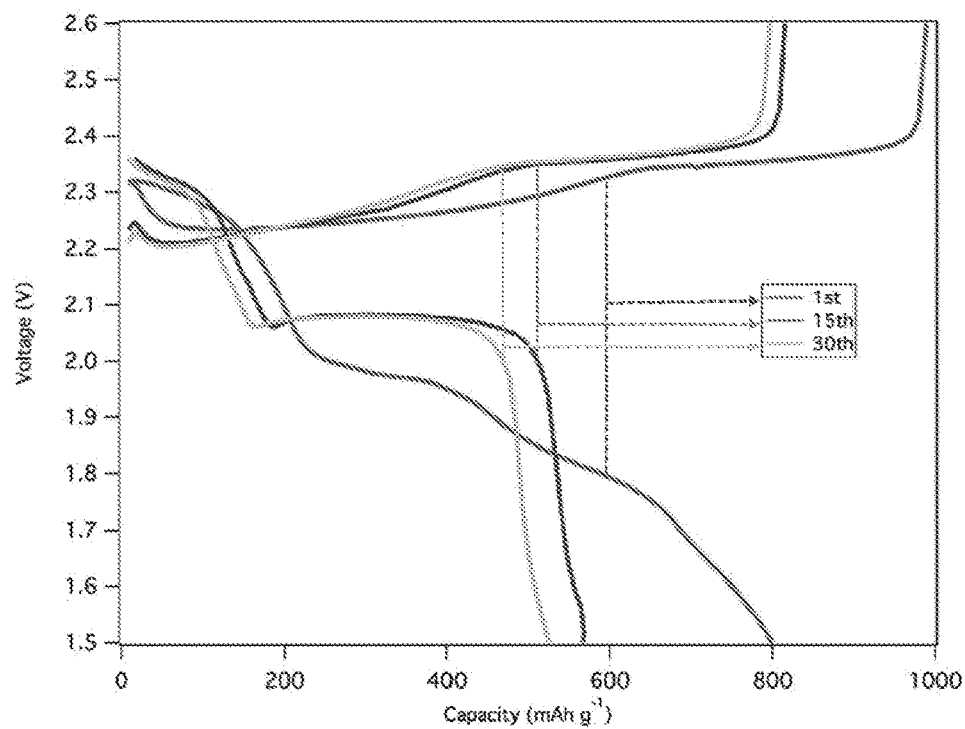
Figure 19:
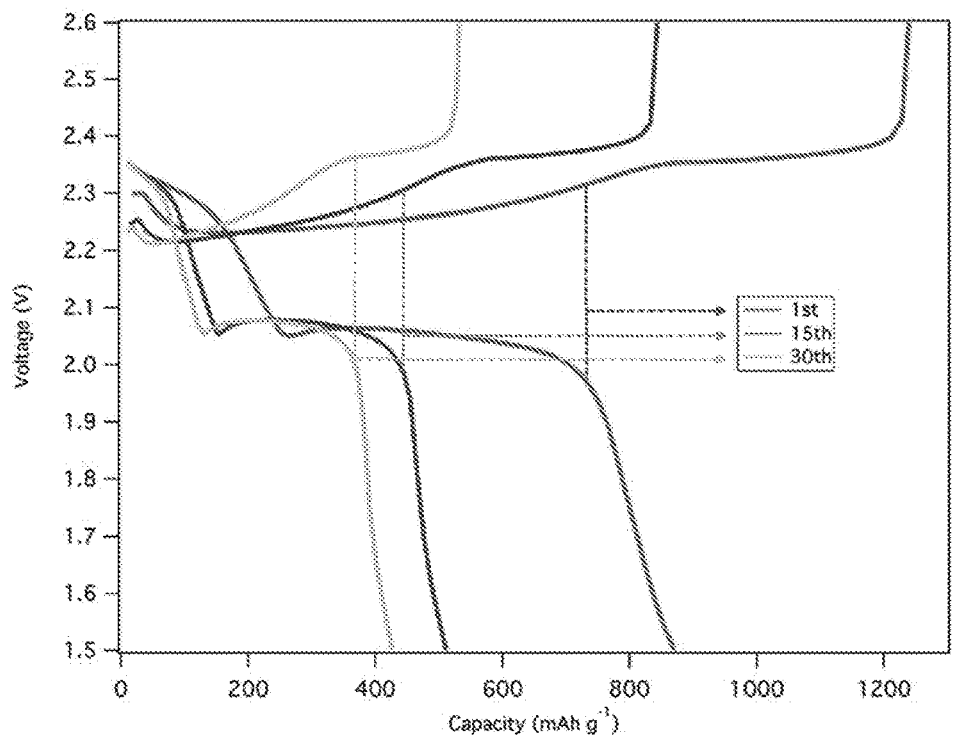
Figure 20:
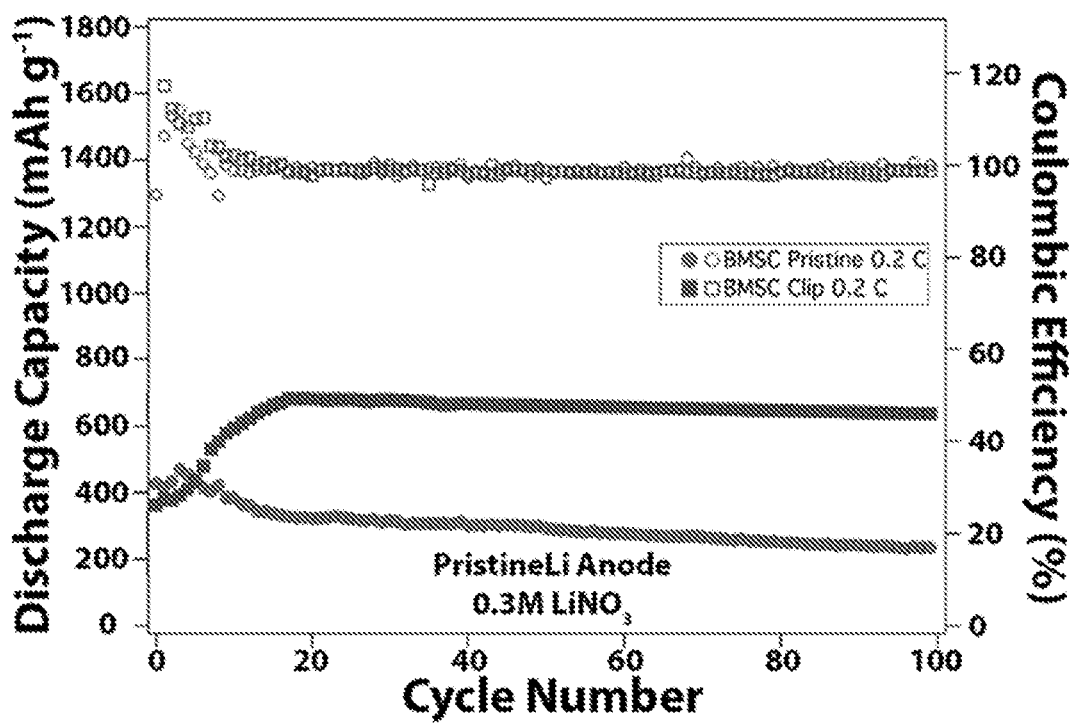
FIG. 20 shows electrochemical performances of clip coated separators with pristine Li anode, BMSC, and with/without LiNO$_3$ in the electrolyte. (a) Cycling performance of the pristine Li anode Li—S cells with/without the clip coated separator, with BMSC, and 0.3M LiNO3 in the electrolyte at 0.2 C. (b) Cycling performance of the pristine Li anode Li—S cells with/without the clip coated separator and with BMSC at 0.2 C without LiNO$_3$ in the electrolyte.
Figure 20:
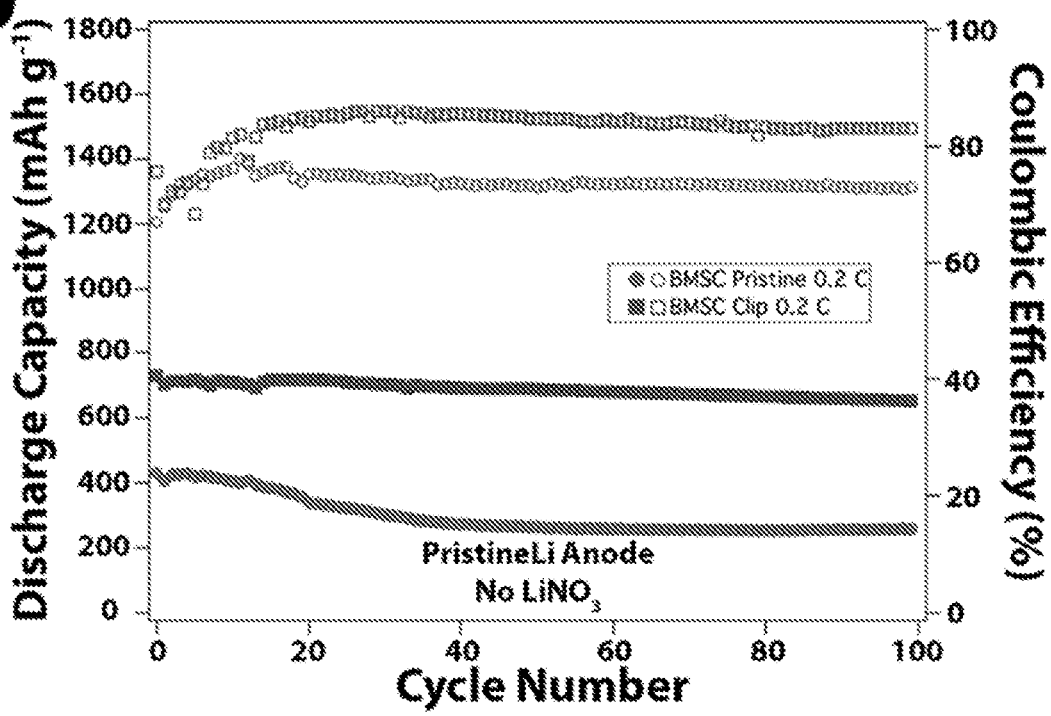
Figure 21:
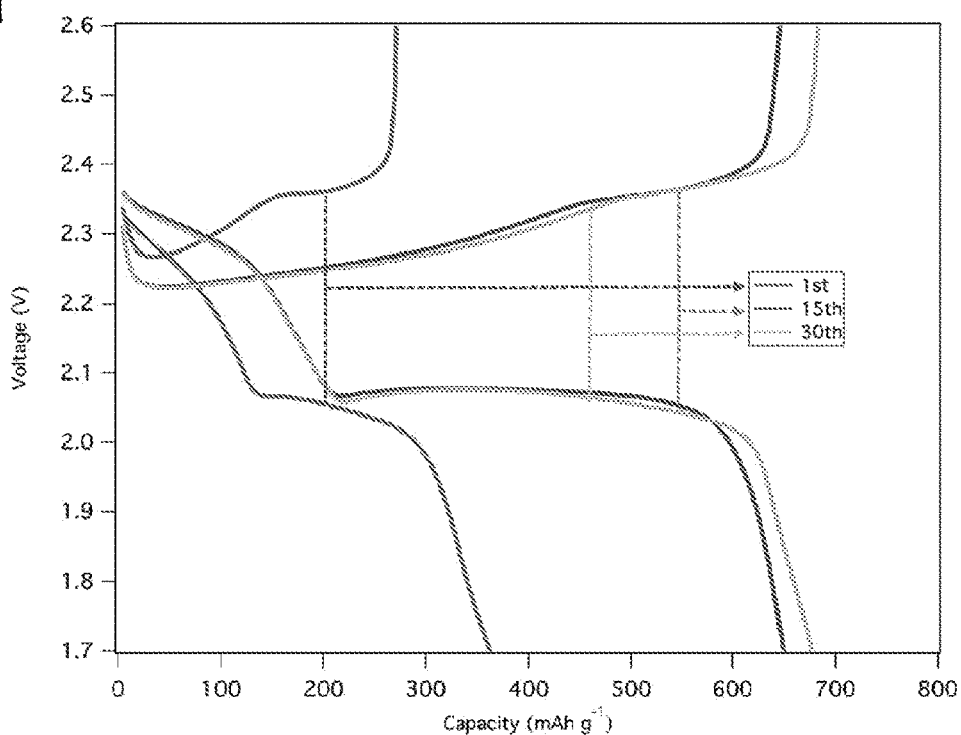
FIG. 21 shows voltage profiles of Li—S cells with clip coated separator and BMSC. (a) Discharge-charge voltage profiles of clip coated separator Li—S cell with BMSC and 0.3M LiNO$_3$ added in the electrolyte for various cycles at 0.2 C. (b) Discharge-charge voltage profiles of clip coated separator Li—S cell with BMSC for various cycles at 0.2 C. (c) Discharge-charge voltage profiles of pristine separator Li—S cell with BMSC and 0.3M LiNO$_3$ added in the electrolyte for various cycles at 0.2 C. (d) Discharge-charge voltage profiles of pristine separator Li—S cell with BMSC for various cycles at 0.2 C.
Figure 21:
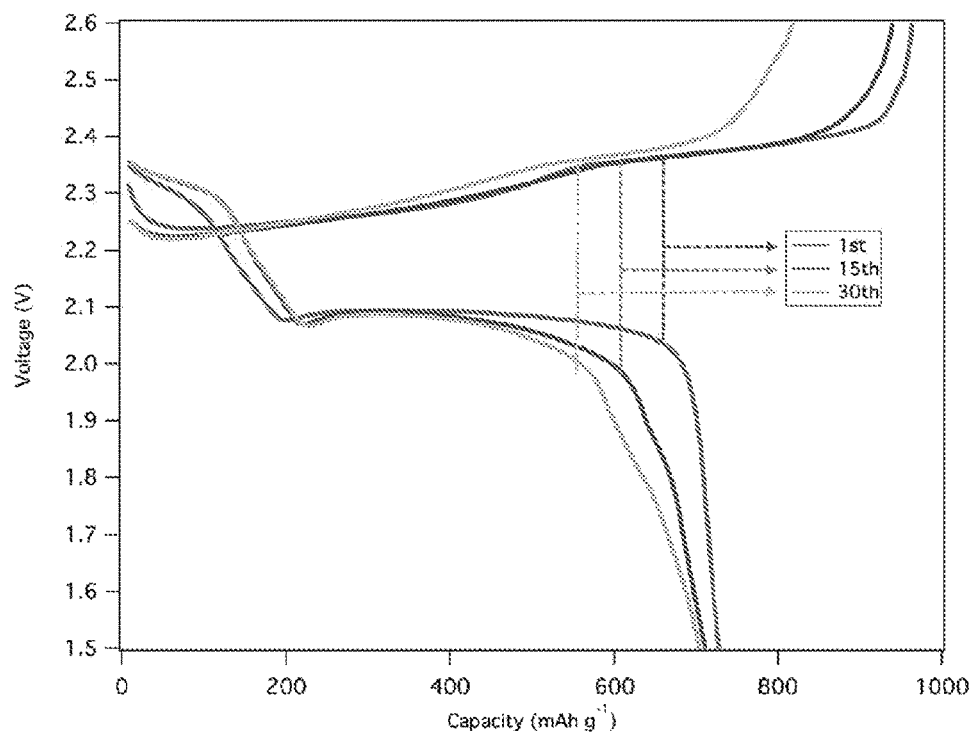
Figure 21:
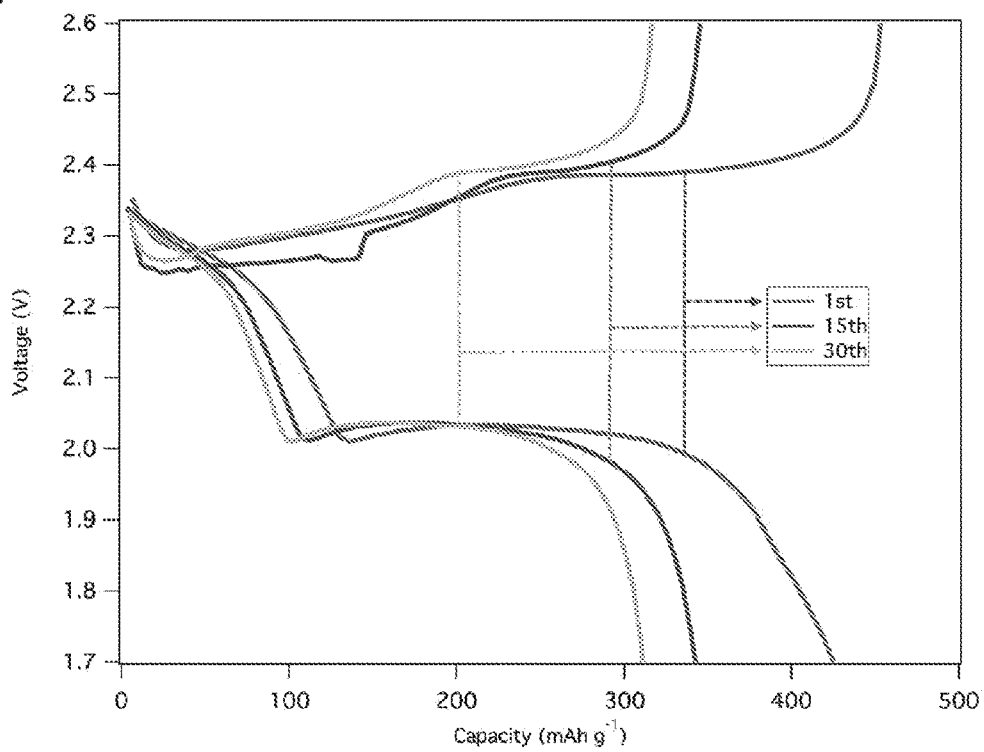
Figure 21:
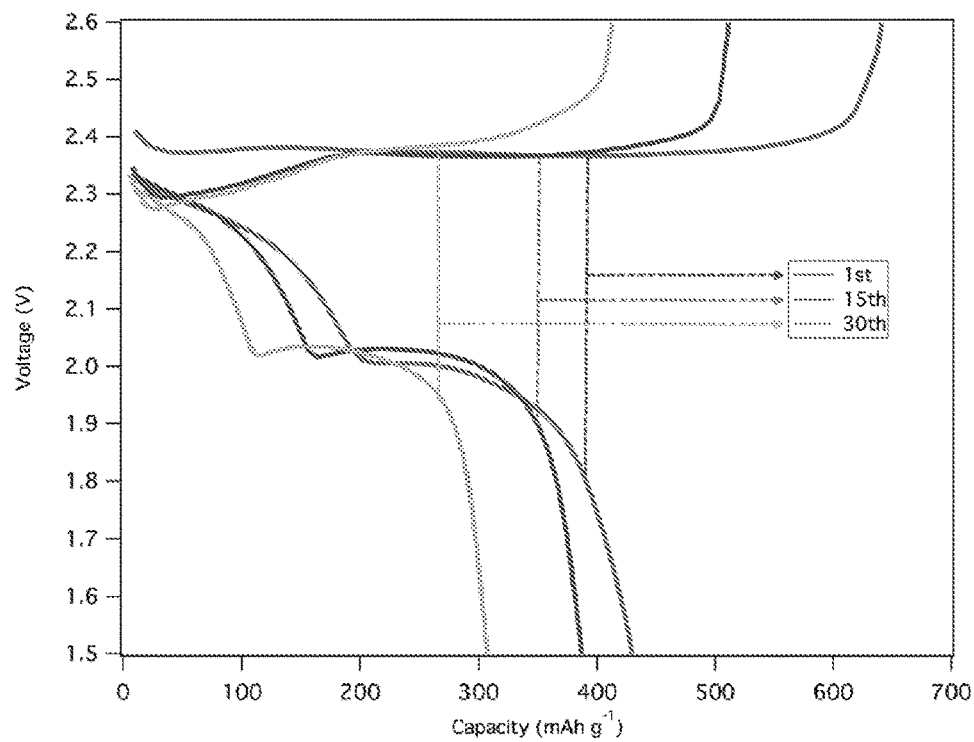

FIG. 4c describes the rate capability of the cells with the clip coated separator are also significantly improved (for both low, ISC, and high, VISC, sulfur loading cathodes), illustrating that the capacity of the cells can recover after high rate cycles of 1 C, 2 C, and 3 C for 10 cycles respectively. Cyclic voltammograms shown in FIG. 3d further confirms the stability of the cells in the additive-free electrolyte with pristine Li anode. The discharge and charge peaks are observed to remain at the same position over many cycles, indicative of the stable and reversible electrochemical reaction of sulfur. Furthermore, FIG. 18 show electrochemical performance of the clip coated/pristine separators with VISC in 0.3M LiNO$_3$ and no LiNO$_3$ additive in the electrolyte. VISC has areal sulfur loading of 5.15 mg cm$^{-2}$ and a content of 68 wt %. FIGS. 18a and 18b show effectiveness of the clip coated separator with VISC, and increasing capacity at first several cycles can be observed as previously described for high loadings of sulfur with an upper current collector. The clip coated separators with VISC shows reversible capacity of 1050 mAh g$^{-1}$ and capacity retention rate of 83% for 100 cycles without any additives in the system. Also, FIG. 19 shows the series of the voltage profiles of Li—S cells with the clip coated/pristine separators and VISC in the electrolyte with/without LiNO$_3$. More, the clip coated separators are also tested in a harsh environment—BMSC which is made via simple ball-milling sulfur powder with a carbon matrix and has a high sulfur loading of 5 mg cm$^{-2}$ and 70% (FIG. 20). The clear improvements of the electrochemical performance of Li—S with the clip coated separators, the reversible capacity of ~700 mAh g$^{-1}$ with 90% capacity retention for 100 cycles, are shown considering the mass loading of the clip coated separator, ~130 μg cm$^{-2}$, and the conditions of the cathode. FIG. 21 shows the series of the voltage profiles of Li—S cells with the clip coated/pristine separators and BMSC in the electrolyte with/without LiNO$_3$. Overall, the electrochemical performance of the clip coated separators are thoroughly examined using pretreated/pristine Li anode, various cathodes, and the electrolyte with/without LiNO$_3$, and good electrochemical performance of the Li—S cells with the clip coated separators are achieved. Overall, the electrochemical performance of the clip coated separators are thoroughly examined using pretreated/pristine Li anode, various cathodes, and the electrolyte with/without LiNO$_3$, and good electrochemical performance of the Li—S cells with the clip coated separators are achieved. Longer cycling performance of clip coated separators with ISC and VISC without LiNO$_3$ in the electrolyte is shown in FIG. 4e, and stable performance, >1000 mAh g$^{-1}$ and ~80% capacity retention rate, is observed over 250 cycles at 0.5 C, which is remarkable with such high sulfur loading and LiNO$_3$ free electrolyte.

Figure 5:
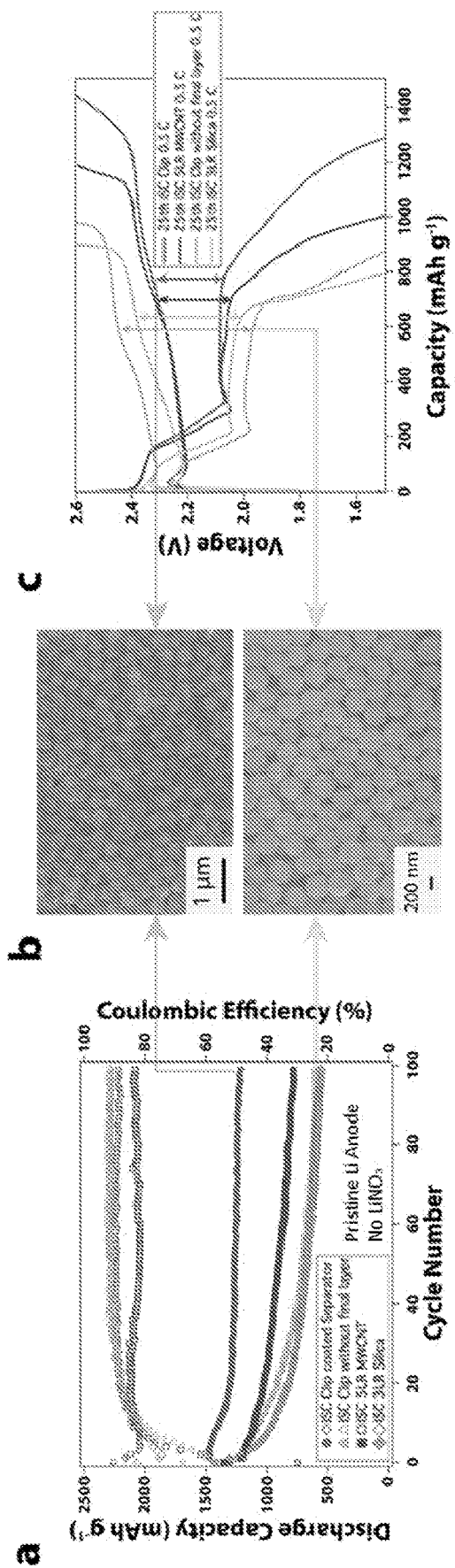
FIG. 5 shows electrochemical analysis of the clip layer parts. (a) Cycling performance of the pristine Li anode with the clip coated separator, clip coated separator without final MWCNT layer (Same structure as shown in FIG. 4d), five layers of MWCNT coated separator, and three monolayers of silica nanospheres coated separator Li—S cell with ISC at 0.5 C. (b) SEM images of the clip coated separator (top) and without final layer of MWCNT (bottom). (c) Discharge-charge voltage profiles of pristine Li anode with clip coated separator, clip coated separator without final MWCNT layer, five layers of MWCNT coated separator, and three monolayers of silica nanospheres coated separator Li—S cell with ISC for $25^{th}$ cycle at 0.5 C.

In order to investigate the effect of each compartment in the clip configuration, we compared the electrochemical performance of the clip with five layers of MWCNT coating, three layers of silica, and a clip configuration without the final electrical path MWCNT layer (See FIG. 5a), which is the equivalent structure shown in FIG. 5b. Significantly, it is noted that without the final MWCNT coating to complete the clip, similar electrochemical performances are observed in Li—S cells using the multifunctional MWCNT-SiO$_2$ coatings, compared to those based on separators coated with three monolayers of silica. These results underscore the importance of the clip configuration in complementing LiPS adsorption achieved with SiO$_2$ coatings, with utilization of the trapped LiPS made possible by the MWCNT coating layers. They also validate our hypothesis that a good electrical conductive path is required to efficiently entrap and utilize dissolved LiPS. FIG. 5c compares the voltage profiles of the cell with the clip configuration done in different steps. Consistent with the previous observation, the capacity is seen to increase progressively as the clip components are sequentially added to complete the structure: 561 mAh g$^{-1}$ at 100$^{th}$ cycle, 596 mAh g$^{-1}$ at 100$^{th}$ cycle, 785 mAh g$^{-1}$ at 100$^{th}$ cycle, and 1214 mAh g$^{-1}$ at 100$^{th}$ cycle when 3LR silica, the multifunctional MWCNT-SiO$_2$, 5LR MWCNT, and clip are coated on the separator, respectively. Another important observation is that the overpotential of the cell substantially declines when the final layer is involved, which confirms our hypothesis that the silica surface traps LiPS in the separator, which overtime reduces the electrolyte conductivity. Reutilization of the LiPS in the clip configuration eliminates this problem and reduces the overpotential correspondingly.

Figure 6:
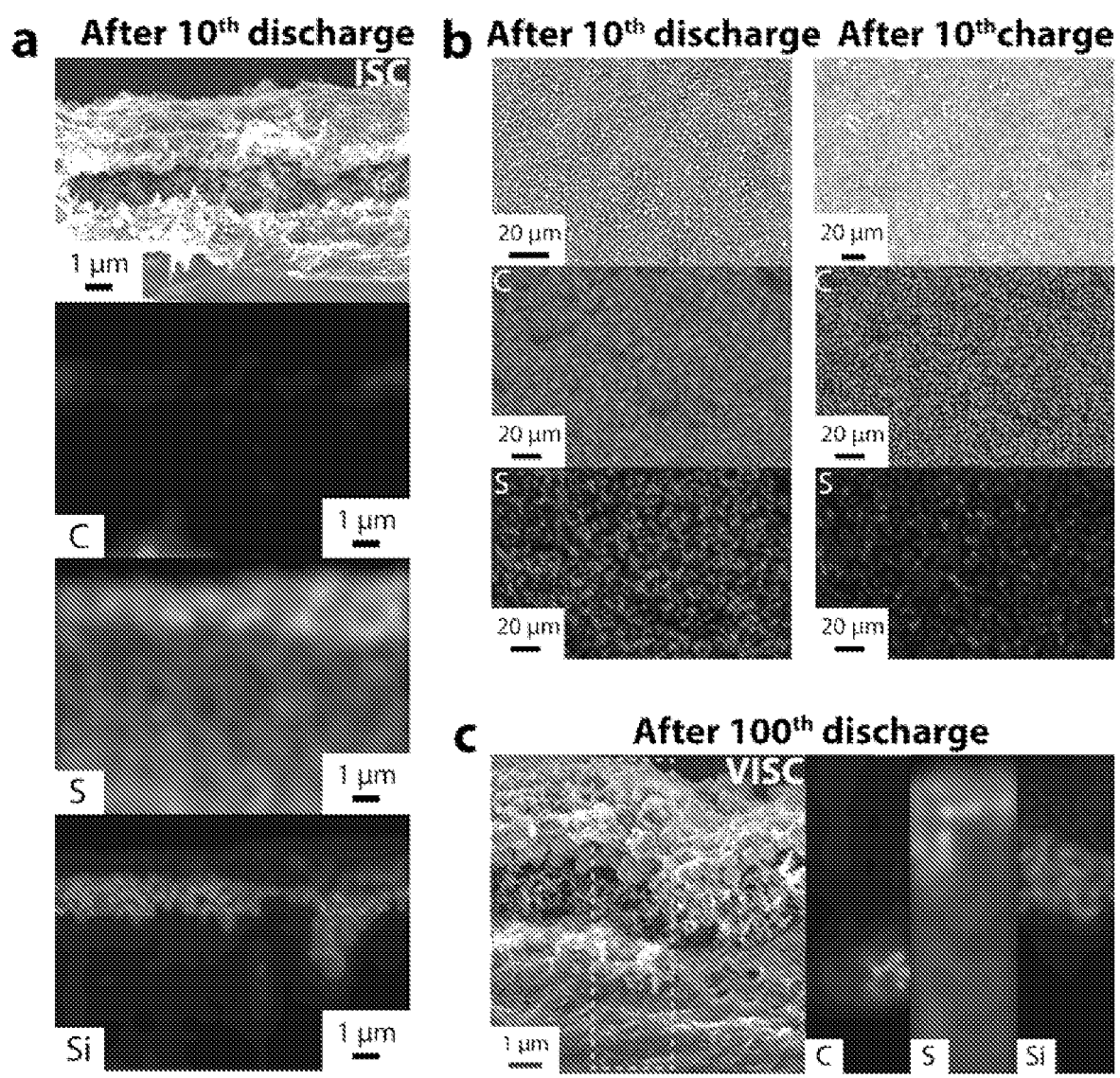
FIG. 6 shows clip coated separator morphology and elemental mappings after several cycles. (a) Cross sectional SEM image of the clip coated separator with ISC after $10^{th}$ discharge with carbon, sulfur, and silicon maps. (b) Top view SEM image of the clip coated separator with ISC after $10^{th}$ discharge/charge with carbon and sulfur maps. (c) Cross sectional SEM image of the clip coated separator with VISC after $100^{th}$ discharge with carbon, sulfur, and silicon maps.
Figure 22:
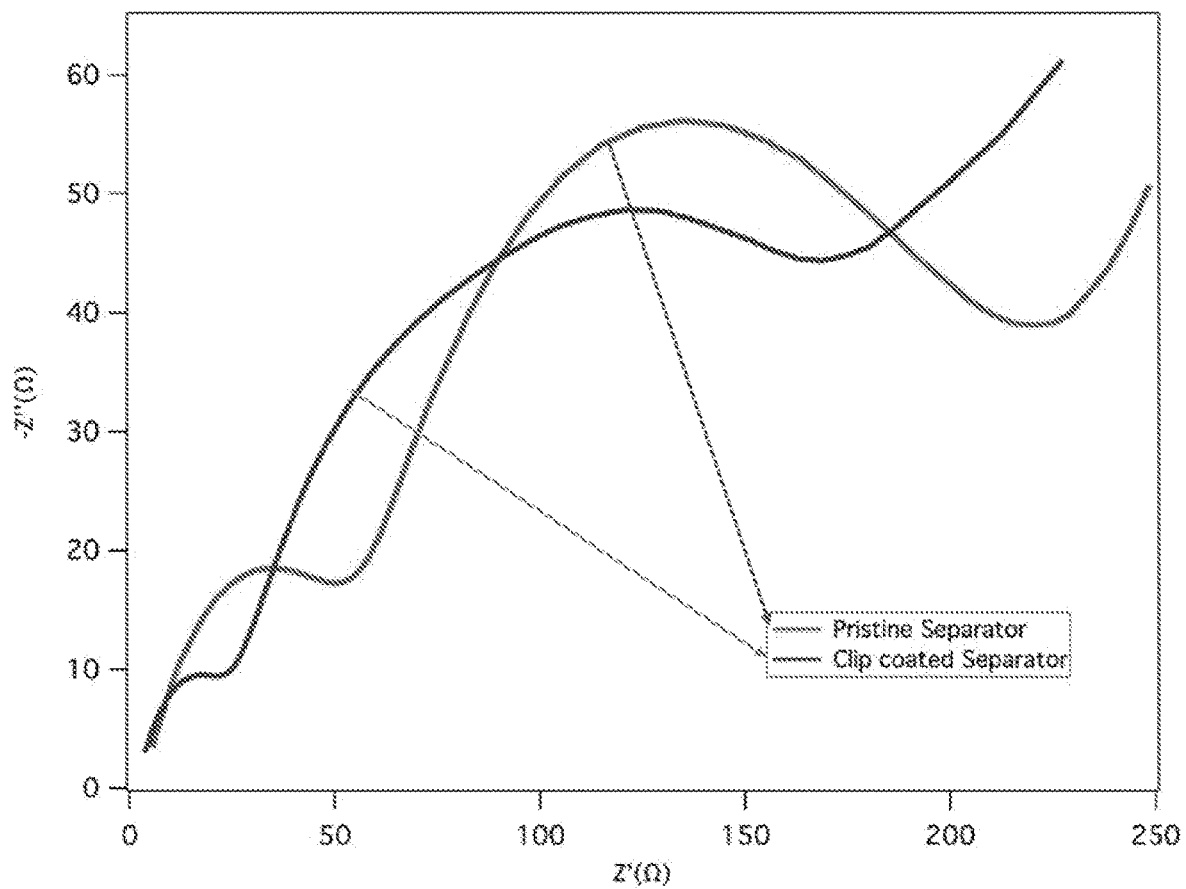
FIG. 22 shows AC impedance spectroscopy analysis of a clip coated separator and pristine separator Li—S cells with ISC.
Figure 23:
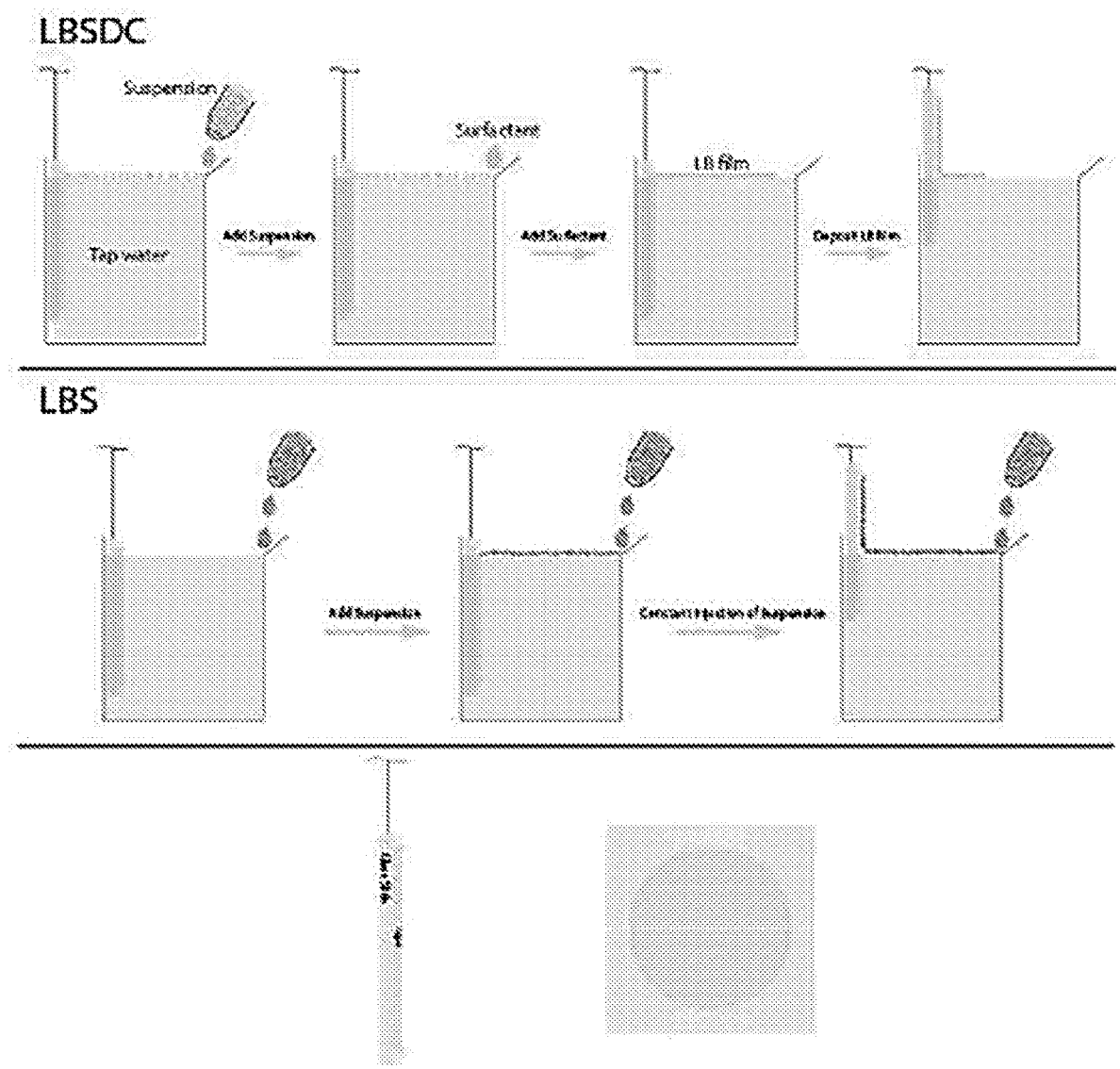
FIG. 23 shows a schematic illustration of separator coating methods (LBSDC and LBS).
Figure 24:
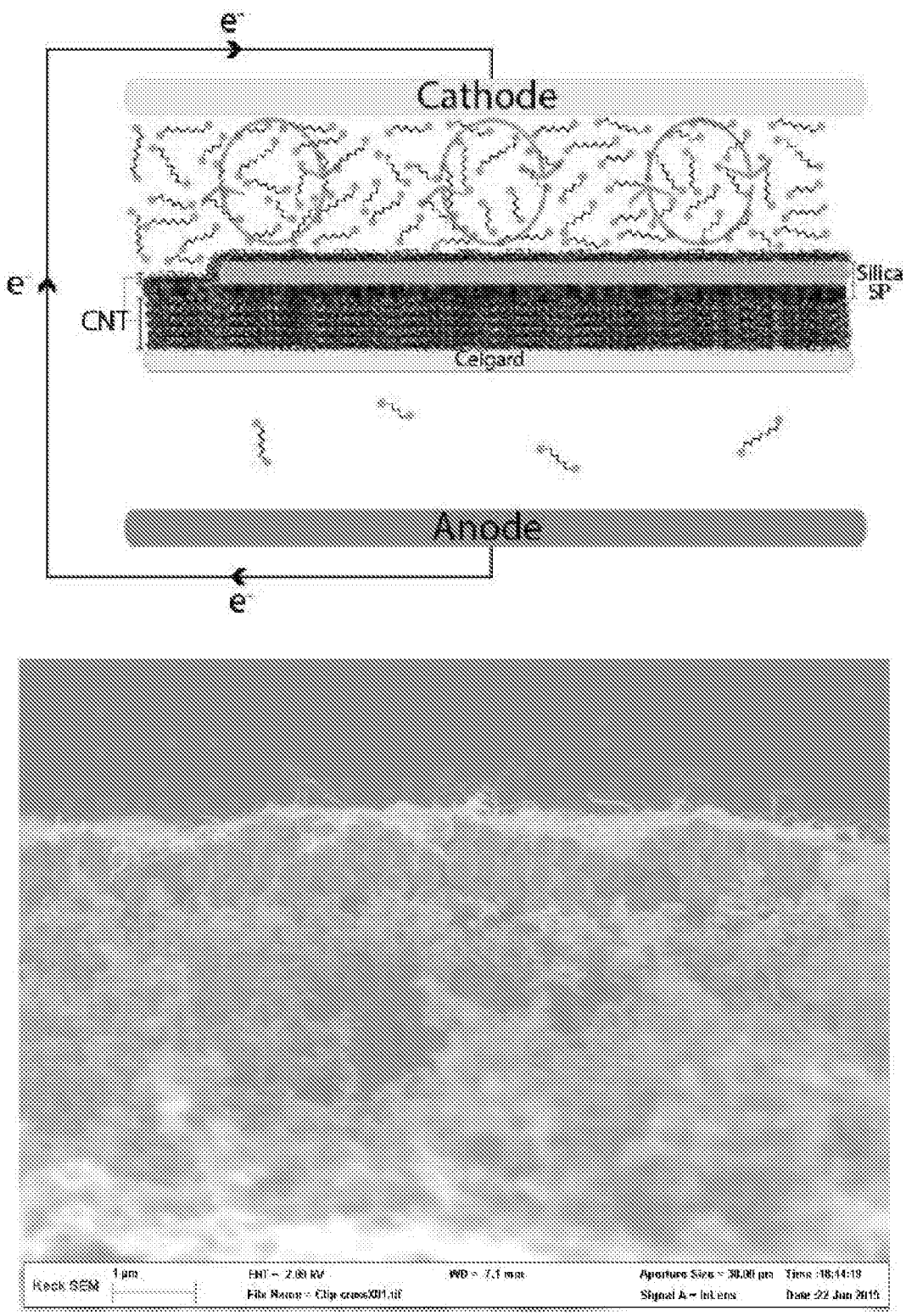
FIG. 24 shows an illustration of a clip configuration coating and SEM image of cross sectional of the coated separator.
Figure 25:
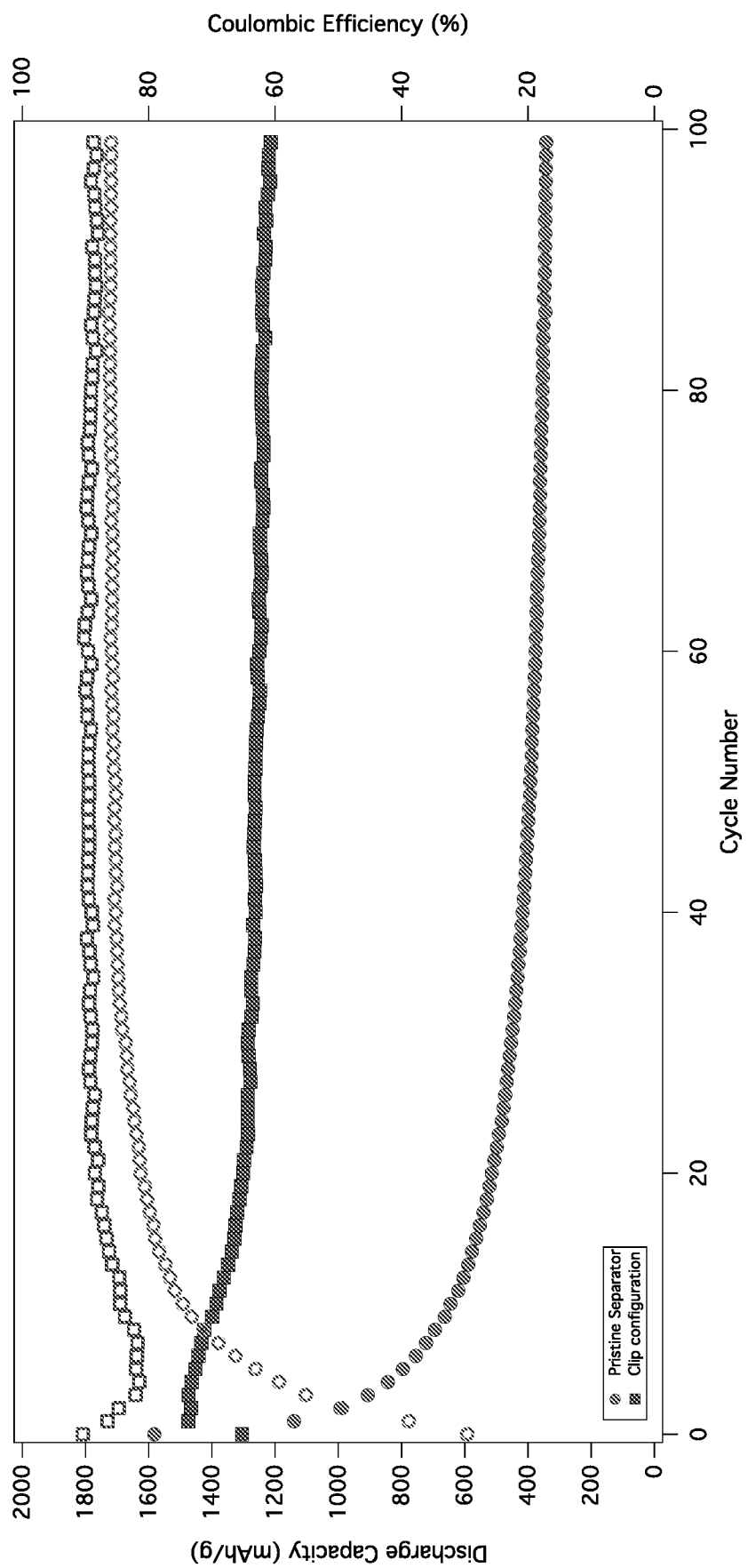
FIG. 25 shows cycling performance of clip configuration separator in LS cell
Figure 26:
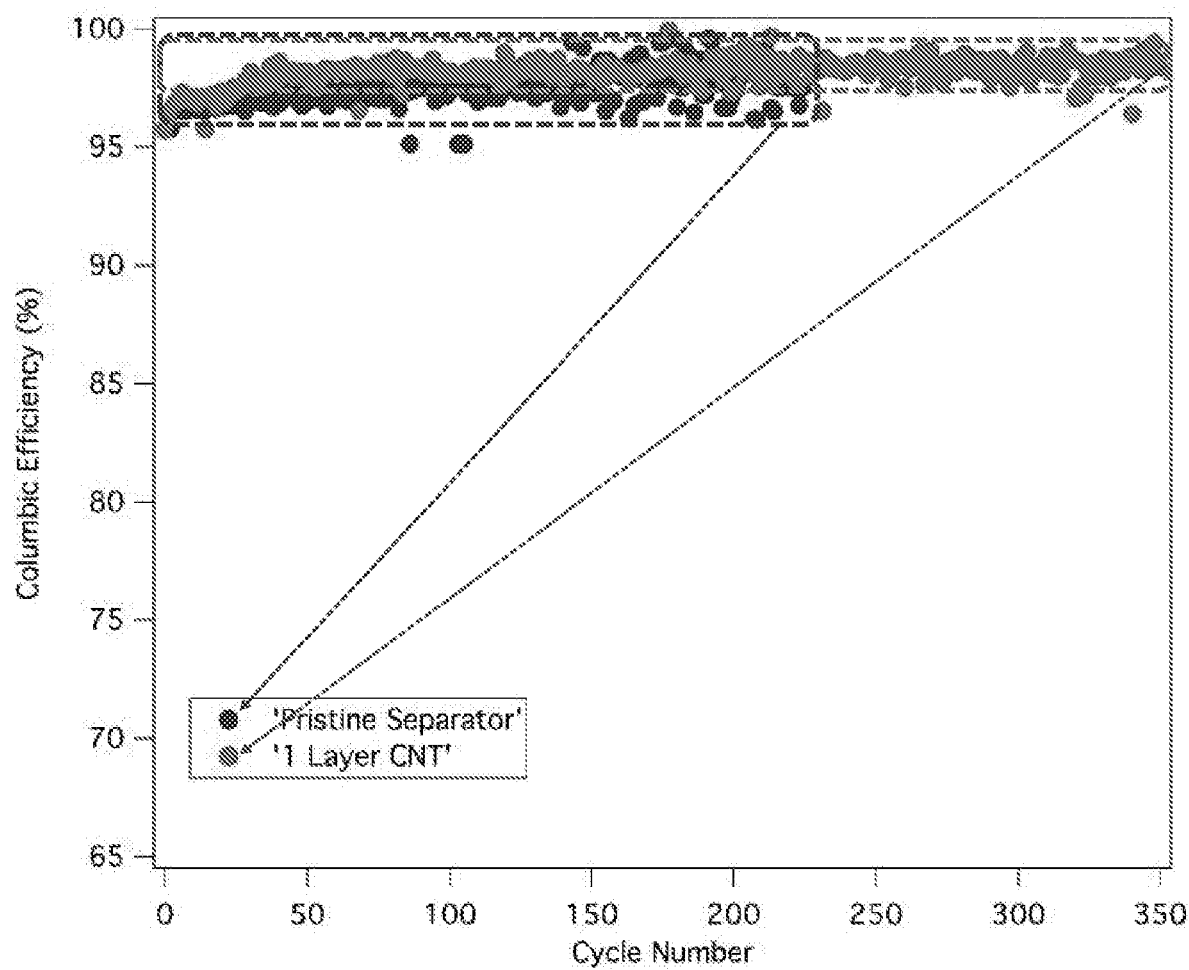
FIG. 26 shows a coulombic efficiency test of one layer CNT coating on the separator in LM cell.

Finally, we investigated the morphology of the coating surface on the clip-coated separator after cycling using SEM. FIG. 6a shows the morphology of the cross sectional separator after 10$^{th}$ discharge and corresponding energy-dispersed X-ray spectroscopy (EDXS) measurements of elemental mapping of carbon, sulfur, and silicon, in which silicon layer and sulfur distribution in the clip structure is clearly seen. The low x-ray intensity for carbon is due to high coverage of sulfur after the discharge, indicating carbon layers are efficiently trapping dissolved LiPS. The structure of the clip coating is preserved upon discharge and charge, indicating the robust properties of the coating in both mechanical and chemical aspects. Also EDXS measurements of top view of the clip coated separator show a uniform distribution of carbon and sulfur elements (FIG. 6b). The fact that the amount of sulfur decreased during the charge process further substantiates the ability of the coating to reutilize the adsorbed species. In addition, the morphology of the clip coated separator with VISC after 100$^{th}$ cycles is shown in FIG. 6c. This double confirms that the multifunctional coatings remain robust after large number of cycles with the presence of high loading and content of sulfur in the Li—S cells. We also observed decrease in internal resistance of the Li—S cell for clip coated separator compared to pristine separator (See FIG. 22). The decreased impedance indicated that the clip design is able to facilitate the electron transfer even the insulating silica particles are involved. The summary of electrochemical performance of LiS cell configurations are mentioned in Table 1.

TABLE 1

LiS electrochemical performance summary table.

| Separator | Anode | Cathode | Electrolyte | Cycle Number | C rate | Capacity (mAh g$^{-1}$) | CE (%) |
|---|---|---|---|---|---|---|---|
| Clip | Li | ISC | 1M LiTFSI DME:DOL | 100 | 0.5 | 1250 | 90 |
| Clip | Li | ISC | 1M LiTFSI DME:DOL | 250 | 0.5 | 1180 | 89 |
| Clip | Li | ISC | 1M LiTFSI DME:DOL | 100 | 1 | 1080 | 91 |
| Clip | Li | ISC | 1M LiTFSI DME:DOL | 100 | 2 | 960 | 91 |
| Pristine | Li | ISC | 1M LiTFSI DME:DOL | 100 | 0.5 | 340 | 85 |
| Clip | Pretreated Li | ISC | 1M LiTFSI DME:DOL | 100 | 0.5 | 1000 | 99.9 |
| Clip | Pretreated Li | ISC | 1M LiTFSI DME:DOL | 100 | 1 | 830 | 99.9 |
| Clip | Pretreated Li | ISC | 1M LiTFSI DME:DOL | 100 | 2 | 770 | 99.8 |
| Pristine | Pretreated Li | ISC | 1M LiTFSI DME:DOL | 100 | 0.5 | 350 | 99.1 |
| Clip | Li | ISC | 1M LiTFSI DME:DOL 0.05M LiNO$_3$ | 100 | 0.5 | 1000 | 98.5 |
| Clip | Li | ISC | 1M LiTFSI DME:DOL 0.05M LiNO$_3$ | 100 | 1 | 980 | 99.1 |
| Clip | Li | ISC | 1M LiTFSI DME:DOL 0.05M LiNO$_3$ | 100 | 2 | 870 | 99.3 |
| Pristine | Li | ISC | 1M LiTFSI DME:DOL 0.05M LiNO$_3$ | 100 | 0.5 | 348 | 98.3 |
| Clip | Li | VISC | 1M LiTFSI DME:DOL | 100 | 0.2 | 1000 | 82 |
| Pristine | Li | VISC | 1M LiTFSI DME:DOL | 100 | 0.2 | 290 | 69 |
| Clip | Li | VISC | 1M LiTFSI DME:DOL | 100 | 0.5 | 1060 | 83 |
| Pristine | Li | VISC | 1M LiTFSI DME:DOL | 100 | 0.5 | 220 | 70 |
| Clip | Li | VISC | 1M LiTFSI DME:DOL | 250 | 0.5 | 1010 | 82 |

TABLE 1-continued

LiS electrochemical performance summary table.

| Separator | Anode | Cathode | Electrolyte | Cycle Number | C rate | Capacity (mAh g$^{-1}$) | CE (%) |
|---|---|---|---|---|---|---|---|
| Clip | Li | VISC | 1M LiTFSI DME:DOL 0.3M LiNO$_3$ | 100 | 0.2 | 1105 | 99.5 |
| Pristine | Li | VISC | 1M LiTFSI DME:DOL 0.3M LiNO$_3$ | 100 | 0.2 | 300 | 95.6 |
| Clip | Li | VISC | 1M LiTFSI DME:DOL 0.3M LiNO$_3$ | 100 | 0.5 | 1100 | 99.6 |
| Pristine | Li | VISC | 1M LiTFSI DME:DOL 0.3M LiNO$_3$ | 100 | 0.5 | 270 | 94.9 |
| Clip | Li | BMSC | 1M LiTFSI DME:DOL | 100 | 0.2 | 660 | 85 |
| Pristine | Li | BMSC | 1M LiTFSI DME:DOL | 100 | 0.2 | 260 | 73 |
| Clip | Li | BMSC | 1M LiTFSI DME:DOL 0.3M LiNO$_3$ | 100 | 0.2 | 640 | 98.4 |
| Pristine | Li | BMSC | 1M LiTFSI DME:DOL 0.3M LiNO$_3$ | 100 | 0.2 | 230 | 99.3 |
| MWCNT (10LR) | Li | ISC | 1M LiTFSI DME:DOL | 100 | 0.5 | 960 | 84 |
| MWCNT (7LR) | Li | ISC | 1M LiTFSI DME:DOL | 100 | 0.5 | 830 | 81 |
| MWCNT (5LR) | Li | ISC | 1M LiTFSI DME:DOL | 100 | 0.5 | 790 | 83.2 |
| MWCNT (3LR) | Li | ISC | 1M LiTFSI DME:DOL | 100 | 0.5 | 710 | 83 |
| MWCNT (1LR) | Li | ISC | 1M LiTFSI DME:DOL | 100 | 0.5 | 330 | 83 |
| KB (10LR) | Li | ISC | 1M LiTFSI DME:DOL | 100 | 0.5 | 1130 | 80 |
| KB (7LR) | Li | ISC | 1M LiTFSI DME:DOL | 100 | 0.5 | 1030 | 85 |
| KB (5LR) | Li | ISC | 1M LiTFSI DME:DOL | 100 | 0.5 | 850 | 87 |
| KB (3LR) | Li | ISC | 1M LiTFSI DME:DOL | 100 | 0.5 | 590 | 85 |
| KB (1LR) | Li | ISC | 1M LiTFSI DME:DOL | 100 | 0.5 | 460 | 86 |
| SP (10LR) | Li | ISC | 1M LiTFSI DME:DOL | 100 | 0.5 | 960 | 83 |
| SP (7LR) | Li | ISC | 1M LiTFSI DME:DOL | 100 | 0.5 | 830 | 85 |
| SP (5LR) | Li | ISC | 1M LiTFSI DME:DOL | 100 | 0.5 | 760 | 81 |
| SP (3LR) | Li | ISC | 1M LiTFSI DME:DOL | 100 | 0.5 | 510 | 85 |
| SP (1LR) | Li | ISC | 1M LiTFSI DME:DOL | 100 | 0.5 | 480 | 88 |
| Silica (10LR) | Li | ISC | 1M LiTFSI DME:DOL | 100 | 0.2 | 780 | 93 |
| Silica (7LR) | Li | ISC | 1M LiTFSI DME:DOL | 100 | 0.2 | 550 | 91 |
| Silica (5LR) | Li | ISC | 1M LiTFSI DME:DOL | 100 | 0.2 | 480 | 89 |
| Silica (3LR) | Li | ISC | 1M LiTFSI DME:DOL | 100 | 0.2 | 380 | 89 |
| Silica (1LR) | Li | ISC | 1M LiTFSI DME:DOL | 100 | 0.2 | 330 | 88 |

In summary, we demonstrated two new versatile coating methods, LBSDC and LBS, for creating surface films that utilize the surface tension gradient to create well-ordered monolayer films at an air/water interface. The methods allow multifunctional coatings to be created in a range of designs using a wide selection of individual materials, as well as material combinations, on a variety of substrates, without the need for chemical binders. The utility of the approach is illustrated using the polypropylene membrane separator, Celgard™, commonly employed in Li—S batteries as a substrate. Through systematic studies, it is shown how mono-functional coatings based on different metal oxides and carbon influence reutilization of dissolved lithium polysulfide species. An unusual coating configuration termed the "clip", created by stacking an incomplete, but well-formed layer of SiO$_2$ particles between two complete layers of carbon is used to illustrate both the versatility of the method to create multifunctional coatings with good spatial control and the effectiveness of such coatings in battery separators. In particular, the clip coated separator is observed to exhibit largely improved active material utilization, enhanced capacity retention over extended charge/discharge cycling, and attractive high rate capability. These observations are explained in terms of the ability of the multifunctional coatings to simultaneously adsorb and trap LiPS created at the cathode, without losing electrochemical access to the materials. The new coating approach and configurational design of coating materials synergistically work together to advance Li—S cells and allow us to investigate and optimize the different coating structures.

Example 2

This example provides a description of fabrication of organized materials on substrates of the present disclosure and characterization of same.

This example describes the fabrication of membranes by coating inorganic particles, polymers, and carbon on polyolefin separators. We developed a new coating technique, a binder-free coating method, termed Langmuir-Blodgett-Scooping (LBS), to rapidly create multifunctional coatings, faster than conventional LB trough, doctor-blade coating, tape casting, and vacuum filtration methods, of polyaniline (PANI), titania nanoparticles (titania NP), and multi-walled carbon nanotube (MWCNT) and combinations of these materials on commercial Celgard™ polypropylene separators with single-particle thickness resolution. PANI is an electron conducting polymer that contains amine/imine groups able to interact strongly and specifically with LiPS via electrostatic interactions. Membranes based on this material are therefore able to bind to and thereby hinder transport of LiPS between the cathode and anode of Li—S cells, and at the same time allow the adsorbed LiPS to remain electrochemically accessible during cycling. PANI was previously used in Li—S cathodes to encapsulate sulfur in yolk-shell, nanotubes, nanorods structures, and coat thin layer of PANI on S/C composites. In this work, PANI is applied directly to the separator without any additional treatment and under ambient conditions. There are a variety of coating methods suitable for materials of specific geometries with most methods requiring use of a binder material for cohesion. The coating method developed in the present work takes advantage of Marangoni stresses and self-assembly at the air/water interface to create highly organized monoparticle layers on non-reactive substrates. Application of these approaches for fabricating titania NPs, PANI, and MWCNT in a layer-by-layer, laminated format provides strategies for creating membranes with low material content and in a porous 3D network morphology able to suppress loss of LiPS, while simultaneously maintaining electrochemical access to the material. The laminated PANI structure used is comprised of 80 nm thick MWCNT adhesion layer for PANI, followed by ~6 μm thick PANI, ~1 μm thick titania NP, and ~3 μm thick PANI (overall thickness of ~10 μm) with total material loading of ~400 μg cm$^{-2}$. When used in Li—S batteries with low and high material loadings, we show that the prepared membranes lead to high reversible capacities (1220 mAh g$^{-1}$, 1150 mAh g$^{-1}$, and 1000 mAh g$^{-1}$ at 0.5 C, 1 C, and 2 C, respectively), with stable and high Coulombic efficiencies (~97% at the 100$^{th}$ cycle), without the need for common LiNO$_3$ additives in the electrolyte.

Figure 27:
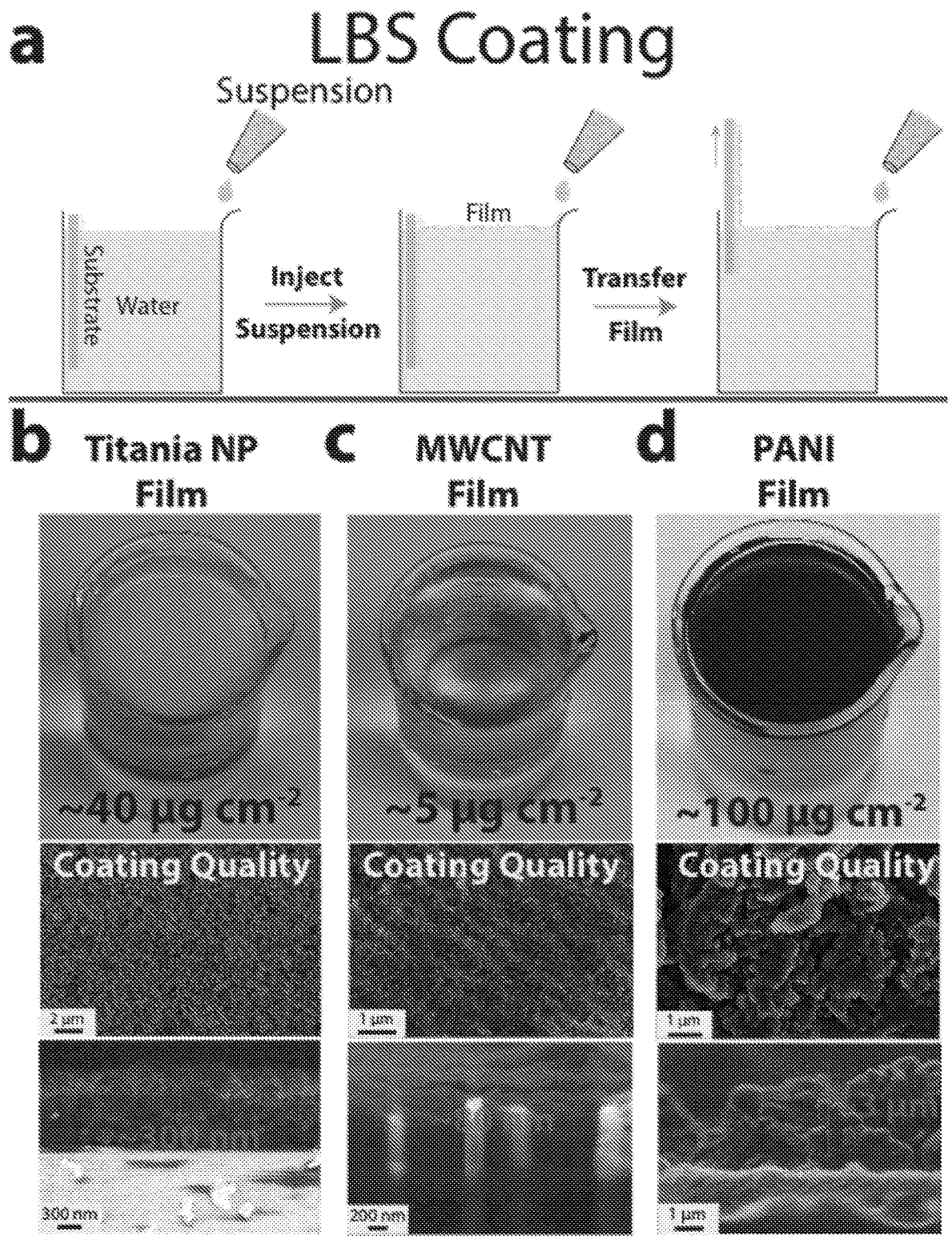
FIG. 27 shows (a) schematic illustration of LBS coating process. Physical images of self-assembled films at the surface of water with the gravimetrical density of (b) Titania NP, (c) MWCNT, (d) PANI, and their coating quality SEM images on Celgard™ separators as well as LBS coating film thicknesses per material coating layer are shown.

FIG. 27a illustrates the LBS method. The approach utilizes self-assembly of particles to form a well-packed film. The self-assembly is induced by spreading and mixing of water miscible solvent at the surface of water and surface tension gradients. Briefly, a volatile and water miscible solvent is injected at the air-water interface, induces strong flows at the surface that drive the spreading of the solvent by the combined effect of surface tension gradient from the two different fluids, known as Marangoni effect. The spreading pressure leads to rapid and highly ordered assembly of structures present at the air-water interface, which can be transferred to any non-reactive substrates by immersion and removal of the substrate from the liquid. Because of its speed (e.g., <10 sec), the method can be applied repeatedly to create multilayer ordered coatings of a variety of materials in layer-by-layer format. For the coating process, only ethanol with nanopowders and water are required. FIG. 27b shows a self-assembled film of titania nanoparticles (NPs) with gravimetrical density of 40 μg cm$^{-2}$ and thickness of approximately 300 nm created using the approach. FIGS. 27c and 1d illustrate analogous results for coating of MWCNT and PANI with gravimetrical density and thickness of ~5 μg cm$^{-2}$, ~100 μg cm$^{-2}$ and ~80 nm and ~3 μm, respectively. In all cases, it is apparent that the obtained coatings are of high quality, indicating that the particles are well packed/ordered and uniformly distributed.

Figure 28:
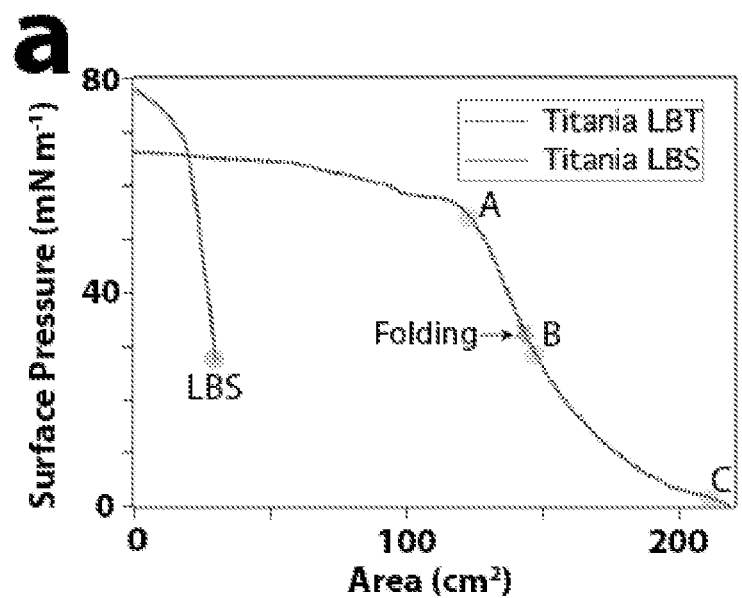
FIG. 28 shows (a) Titania NP, (b) MWCNT, (c) PANI surface pressure profiles of conventional LBT and LBS coating methods with the coating quality SEM at designated surface pressures. Titania NP: A=54 mN m$^{-1}$, B=28 mN m$^{-1}$, C=1 mN m$^{-1}$, LBS=28 mN m$^{-1}$, Folding=31 mN m$^{-1}$. MWCNT: A'=63 mN m$^{-1}$, B'=35 mN m$^{-1}$, C'=2 mN m$^{-1}$, LBS'=32 mN m$^{-1}$, Folding=37 mN m$^{-1}$. PANI: A"=50 mN m$^{-1}$, B"=21 mN m$^{-1}$, C"=3 mN m$^{-1}$, LBS"=20 mN m$^{-1}$, Folding=24 mN m$^{-1}$.
Figure 28:
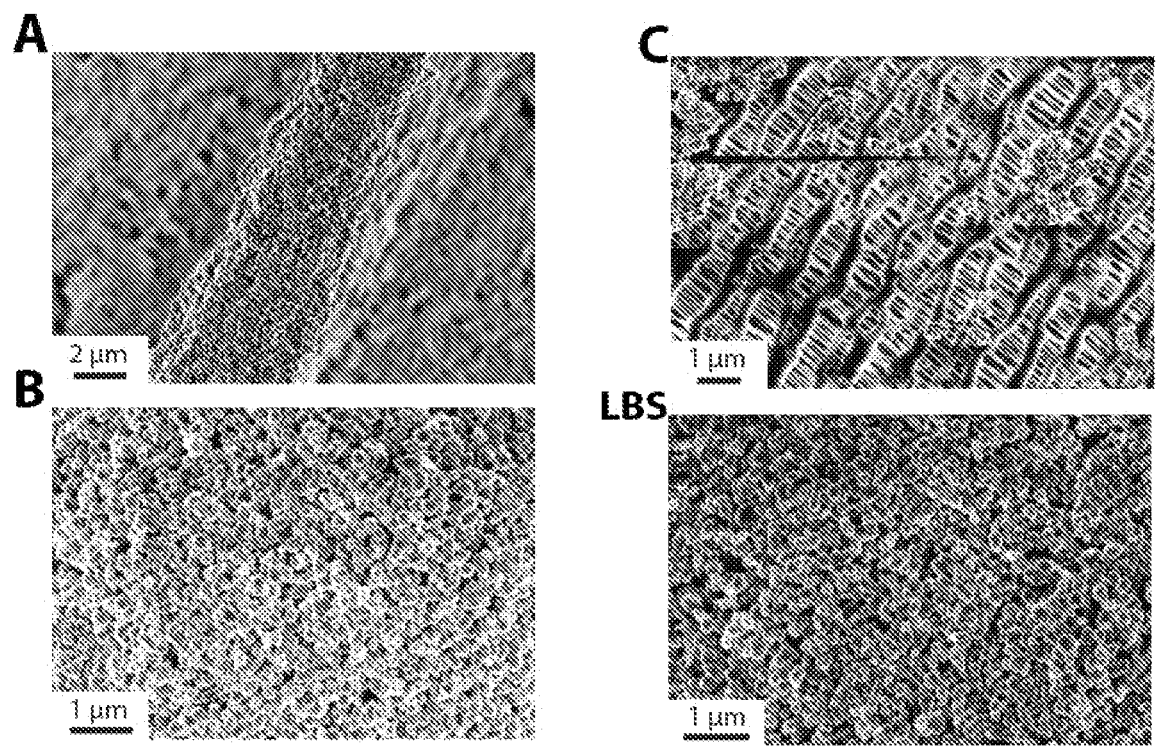
Figure 28:
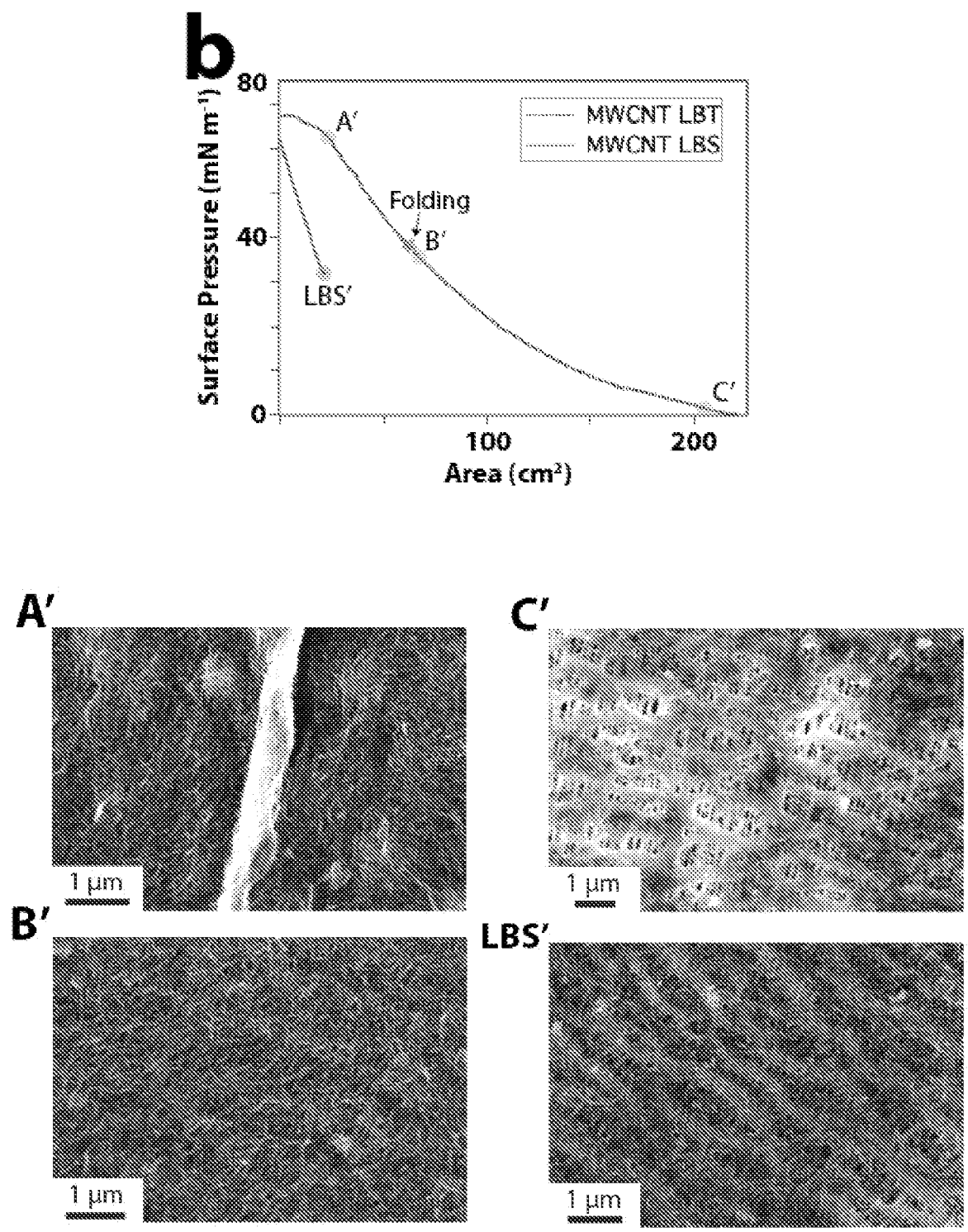
Figure 28:
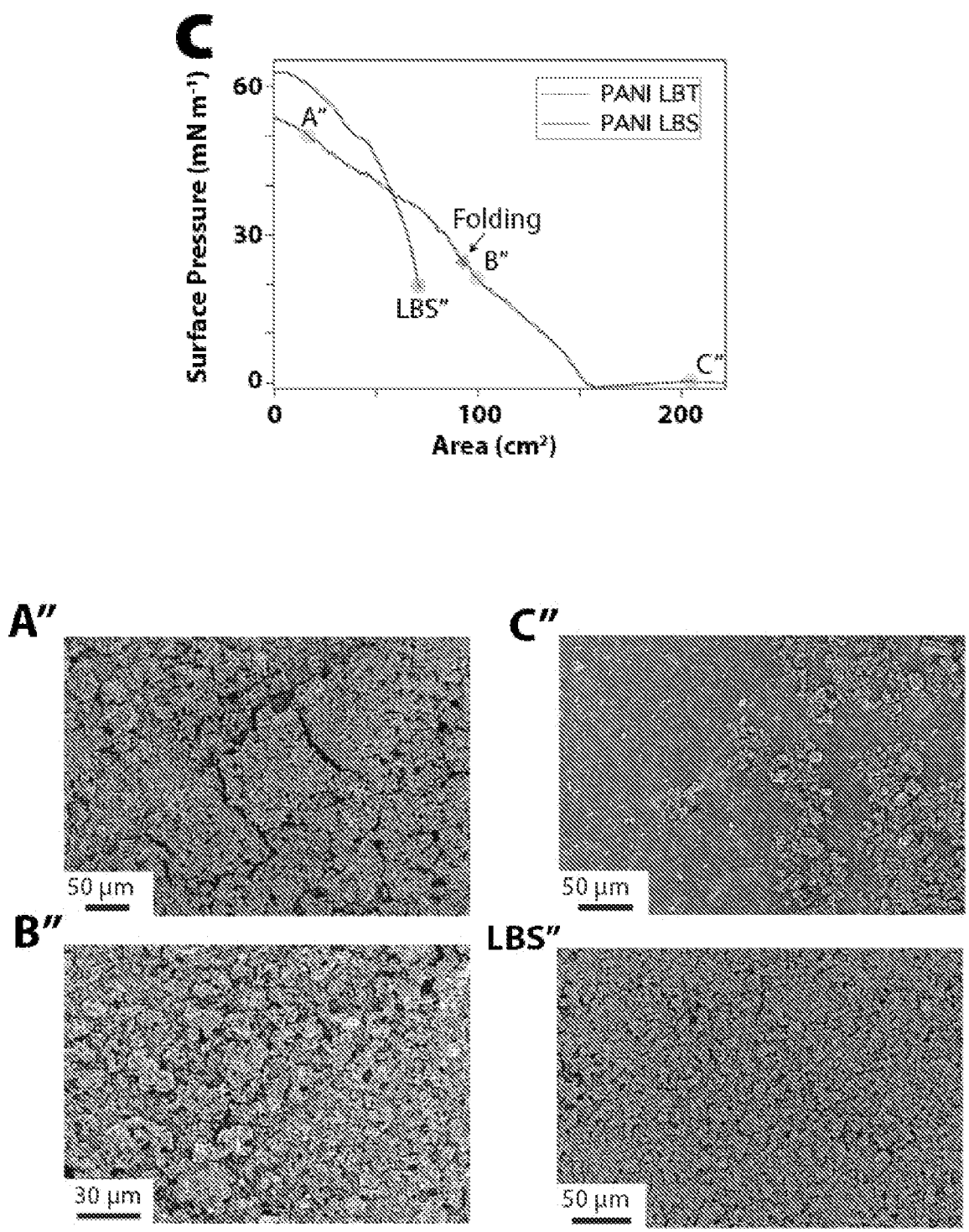
Figure 32:
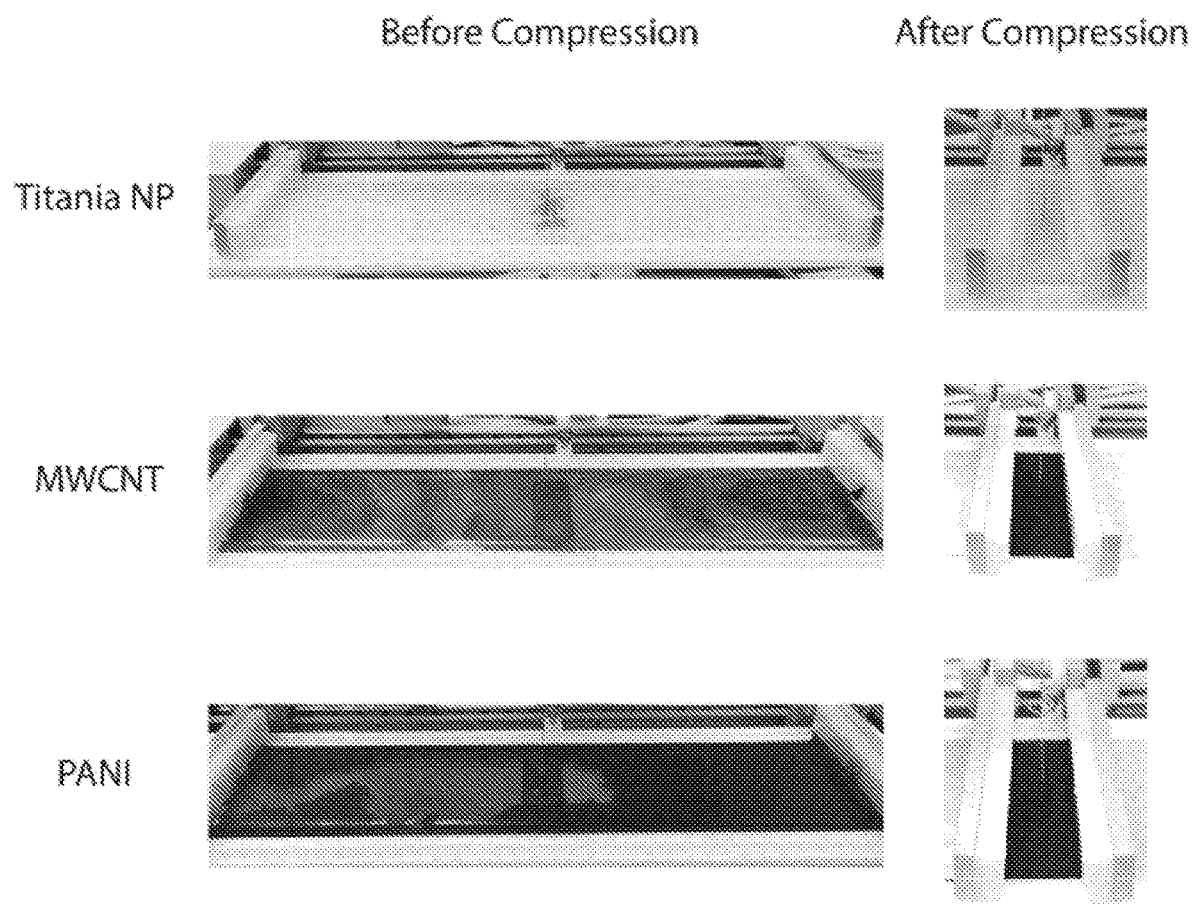
FIG. 32 shows physical images of Langmuir-Blodgett trough surface pressure profile measurements before and after the compression of the films of Titania NP, MWCNT, and PANI. Note that folding of the films, starting at the mechanical barriers, is shown in "After compression" which indicates that films are stable at liquid-gas interface.

To understand the fundamental processes responsible for self-assembled titania NP, MWCNT, and PANI films, surface pressure profiles of the three materials were measured using a conventional Langmuir-Blodgett trough (LBT) as shown in FIG. 28. To facilitate comparisons, profiles obtained using LBS and LBT are compared, and three surface pressures are chosen for each material coincident with the overly packed, fully packed, and poorly packed states. The full spectrum of surface film packing densities are apparent from the LBT profiles, including a regime of film buckling and folding at high surface pressures (See FIG. 32). The onset of folding behavior is evident as an inflection point where the concavity of the profile curve changes, which provide a convenient means of assessing achievement of fully packed high quality films.

FIG. 28a shows the surface pressure profiles of titania NP using LBT and LBS methods. Three surface pressures are chosen (A=54 mN m$^{-1}$, B=28 mN m$^{-1}$, C=1 mN m$^{-1}$) to observe the titania NP coatings on the separator. A, B, and C represents the surface pressures where the nanoparticles are overly packed, fully packed, and poorly packed, respectively. Analysis of the SEM images for titania NP coated separators, highest coating quality is made at point B. This means that around surface pressure of 28 mN m$^{-1}$, which is around the inflection point at 31 mN m$^{-1}$, will yield highly packed particle film on the water surface. The information is then used to verify the coating quality of LBS method. For the self-assembled films using LBS method, we measured the surface pressure profiles of the resulting films. In FIG. 28a, LBS surface pressure profile starts at a surface pressure of 28 mN m$^{-1}$, and no inflection point is observed. The starting surface pressure indicates that the self-assembly process exerts the pressure of 28 mN m$^{-1}$, and absence of the inflection point in the LBS profile verifies that the LBS method starts at highly-packed state. Hence, the uniform titania NP coating on the separator is made as shown in FIG. 28a SEM at LBS that matches well with the coating at point B. Analogous measurements for MWCNT (FIG. 28b) and PANI (FIG. 28c) were used to assess the state of order in these films. The surface pressures of A'=63 mN m$^{-1}$, B'=35 mN m$^{-1}$, C'=2 mN m$^{-1}$ for MWCNT and A"=50 mN m$^{-1}$, B"=21 mN m$^{-1}$, C"=3 mN m$^{-1}$ for PANI are chosen to investigate the film qualities. Highest coating qualities are obtained for B' and B" for MWCNT and PANI. The folding point for MWCNT and PANI are 37 mN m$^{-1}$ and 24 mN m$^{-1}$, and around these surface pressures yield optimized coating films. As results, LBS coating of MWCNT and PANI at LBS' (32 mN m$^{-1}$) and LBS" (20 mN m$^{-1}$) yield high qualities as we see in FIG. 28b and FIG. 28c.

Figure 29:
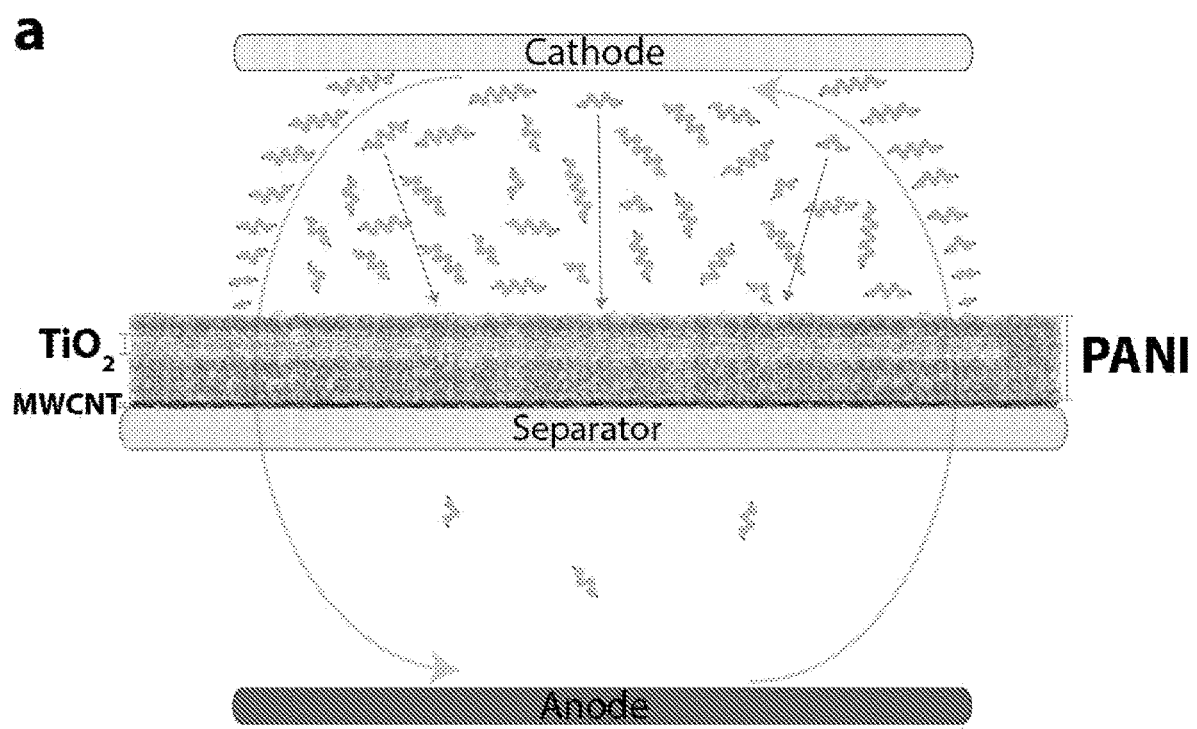
FIG. 29 shows (a) schematic illustration of laminated configured separator coating structure (laminated PANI) and LiPS flux diagram during the charge/discharge of the Li—S cell. (b) Demonstration of thin layer of MWCNT as an effective adhesion layer for PANI coating. (c) Demonstration of single-sided LBS coatings and the layer-by-layer coating process to fabricate the laminated PANI separator. (d) Mechanical strength demonstration of the laminated PANI separator. (e) Cross sectional SEM image of the laminated PANI separator. (f) SEM image of the titania NP-PANI boundary (3 coating layers of titania NPs on top of PANI coatings, see box labeled "Boundary" in FIG. 29).
Figure 29:
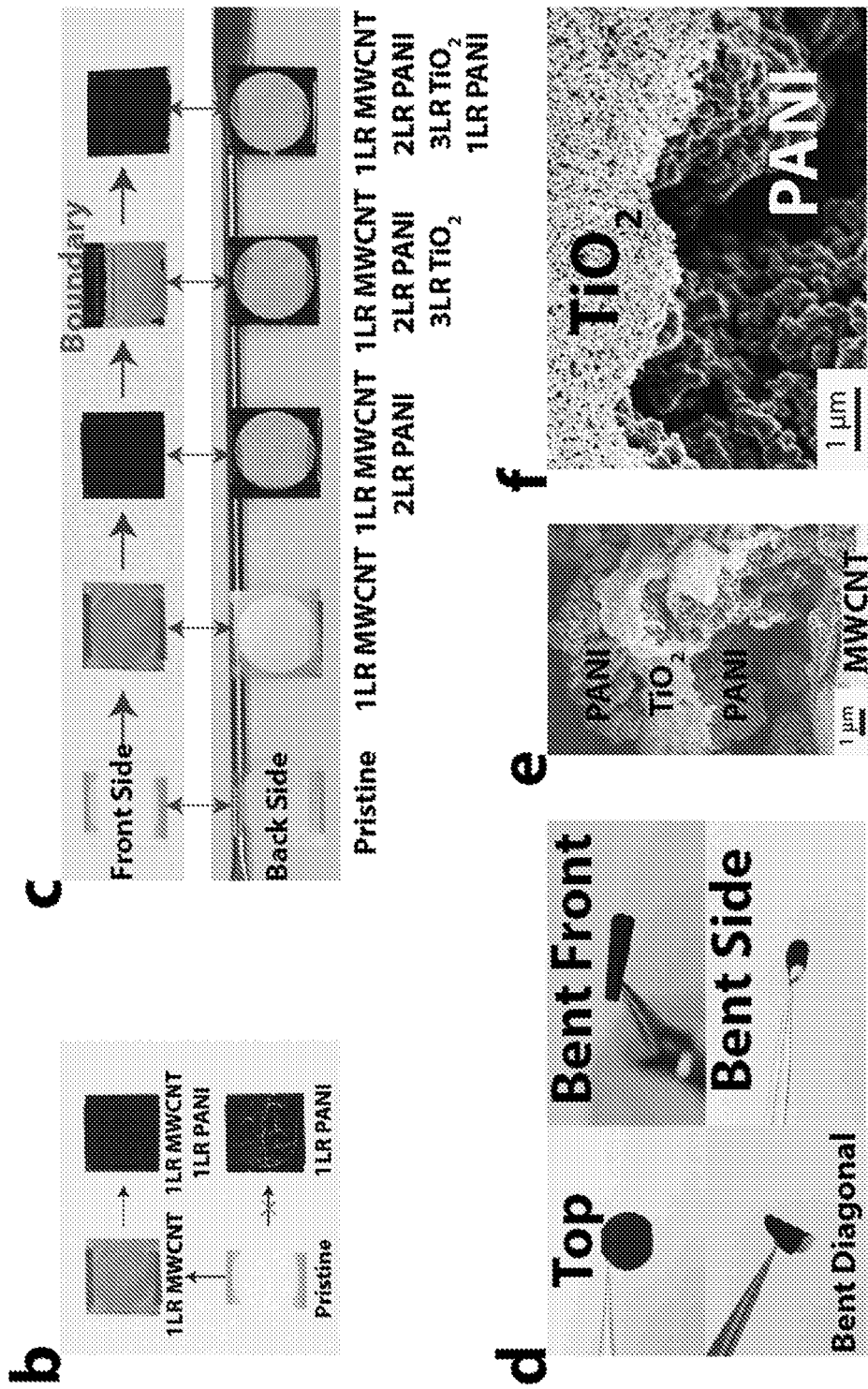
Figure 33:
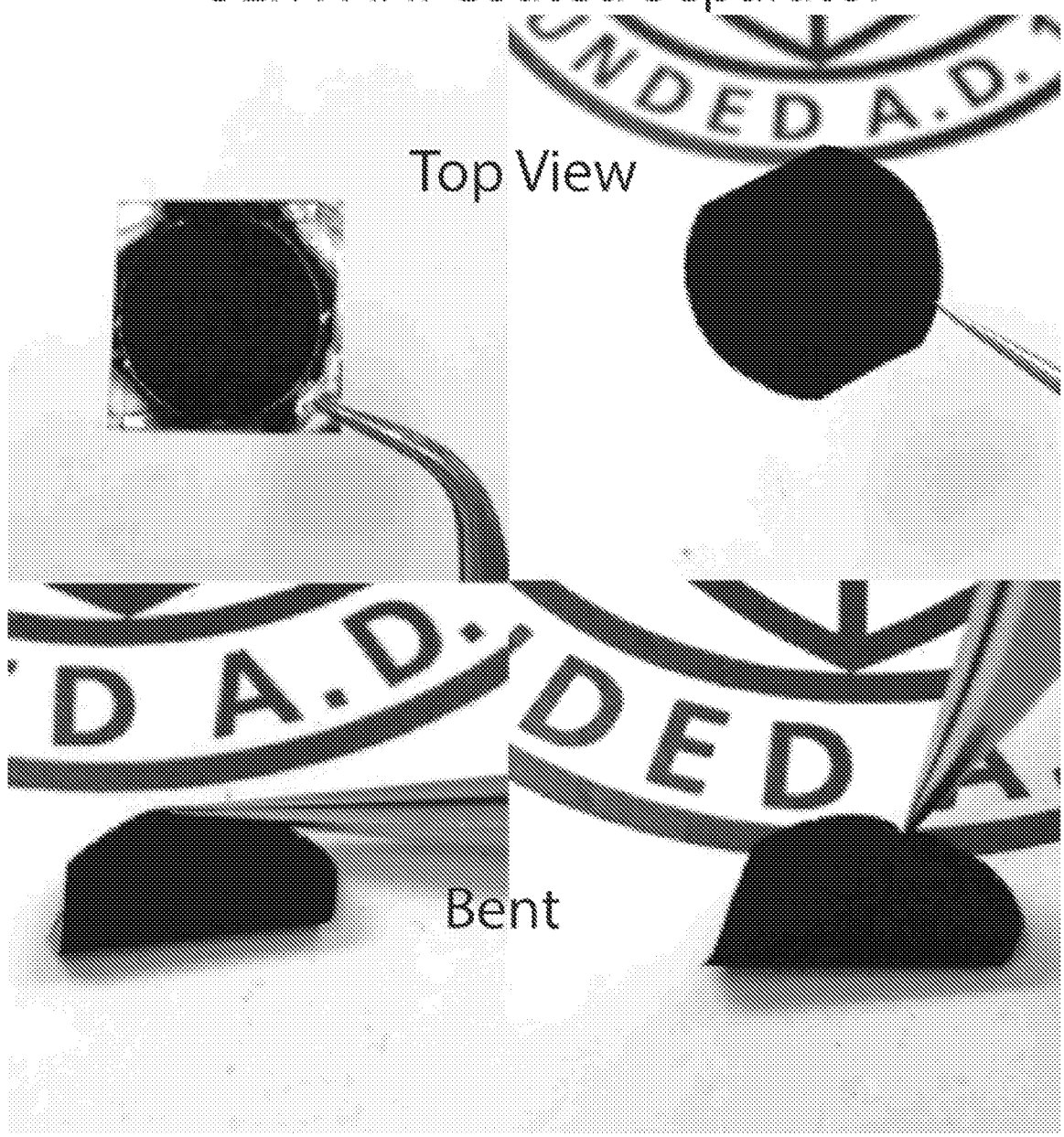
FIG. 33 shows a mechanical strength demonstration of 5LR PANI coated separator.

Building upon these fundamental studies, we employed the LBS method to create membranes in which the titania NP layers are sandwiched by PANI layers (See FIG. 29a) adhered to Celgard™ by thin MWCNT layer. As discussed earlier, this design was motivated by the hypothesis that a flexible membrane in a clip-like configuration in which two electronically conductive layers bracket sorbent NP layer would facilitate efficient trapping of LiPS in the membrane and utilization of the trapped LiPS by the conductive layers for high active material utilization. FIG. 29c shows the layer-by-layer configuration of the coatings. As illustrated in FIG. 29d and FIG. 33 the membranes are mechanically strong and their structure is completely preserved after mechanical distortion. FIG. 29e shows the cross sectional image of laminated PANI structure which is ~10 μm thick. To observe the boundary region that is indicated with the red box in FIG. 29c, we imaged this region using SEM. It is apparent that a very compact and porous 3D titania NP network is present on the top of PANI coatings.

Figure 34:
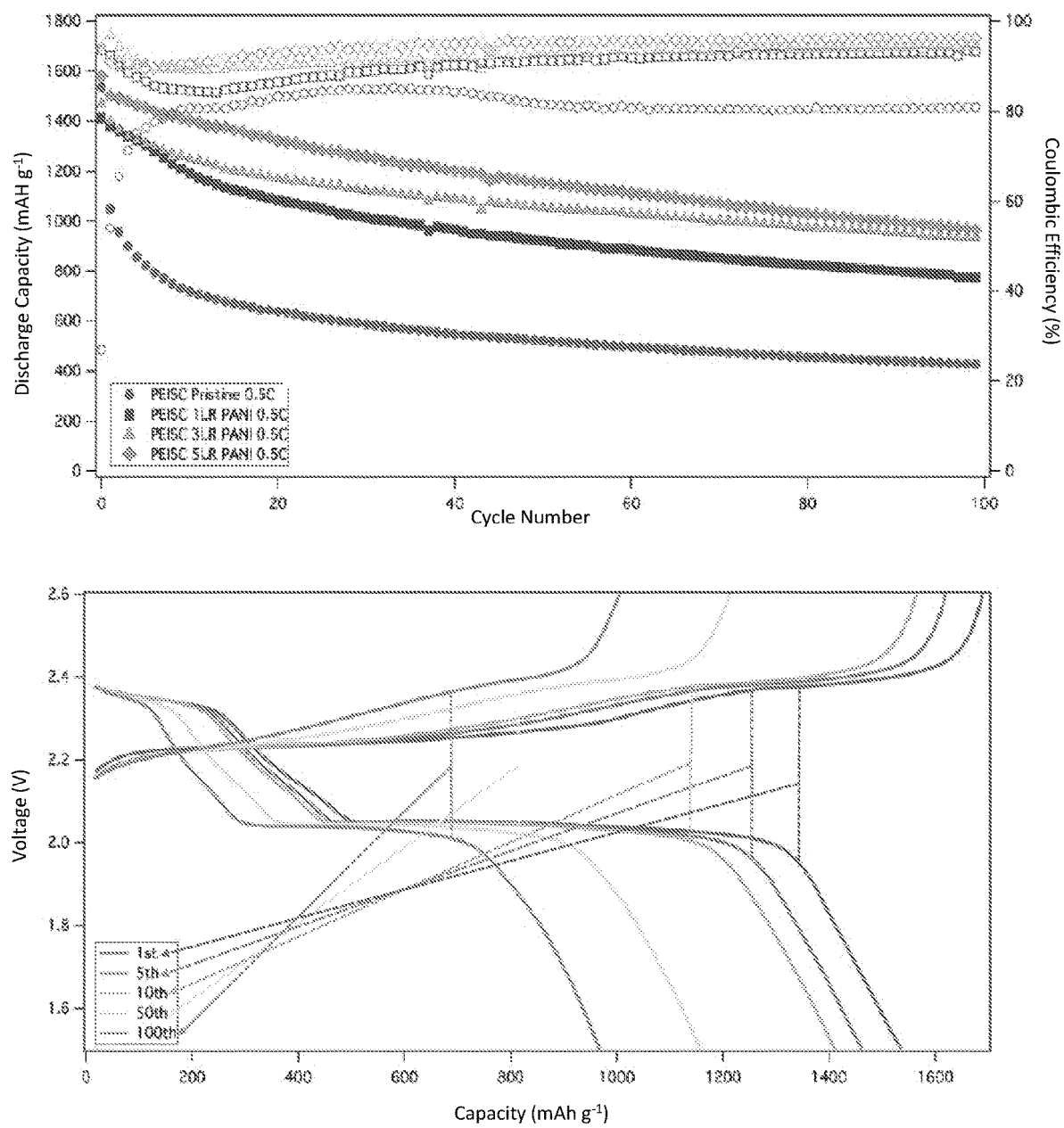
FIG. 34 shows cycling performance of the 1-5LR PANI coated separators and pristine separator with PEISC and no LiNO$_3$ in the electrolyte Li—S cells at 0.5 C for 100 cycles and the voltage profiles of 5LR PANI coated separator Li—S cell at 0.5 C for various cycles.
Figure 35:
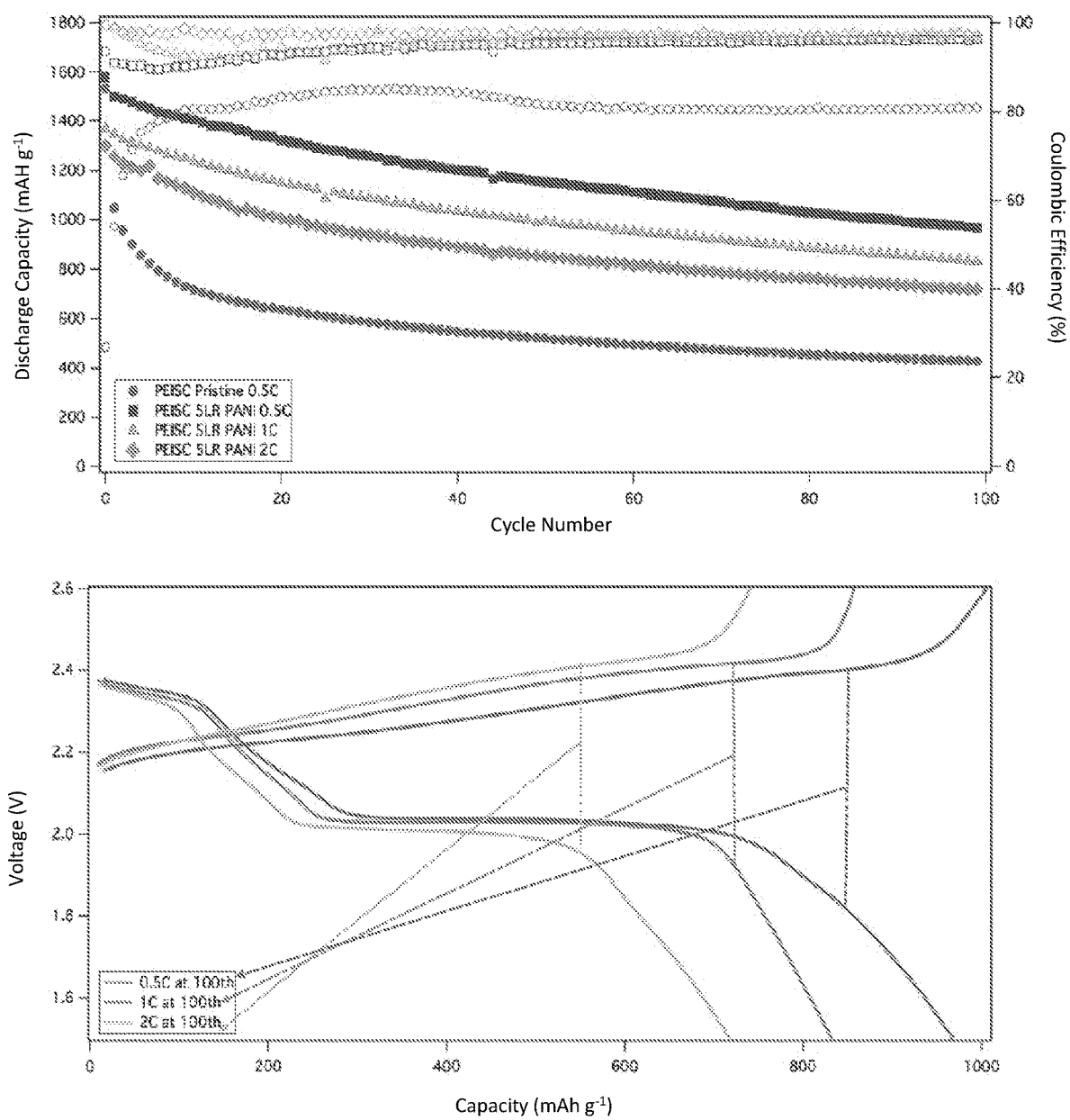
FIG. 35 shows cycling performance of 5LR PANI coated separators and pristine separator with PEISC and no LiNO$_3$ in the electrolyte Li—S cells for 100 cycles at three different C rates and the voltage profiles of 100$^{th}$ cycled 5LR PANI coated separators with PEISC Li—S cells at three different C rates for various cycles.
Figure 36:
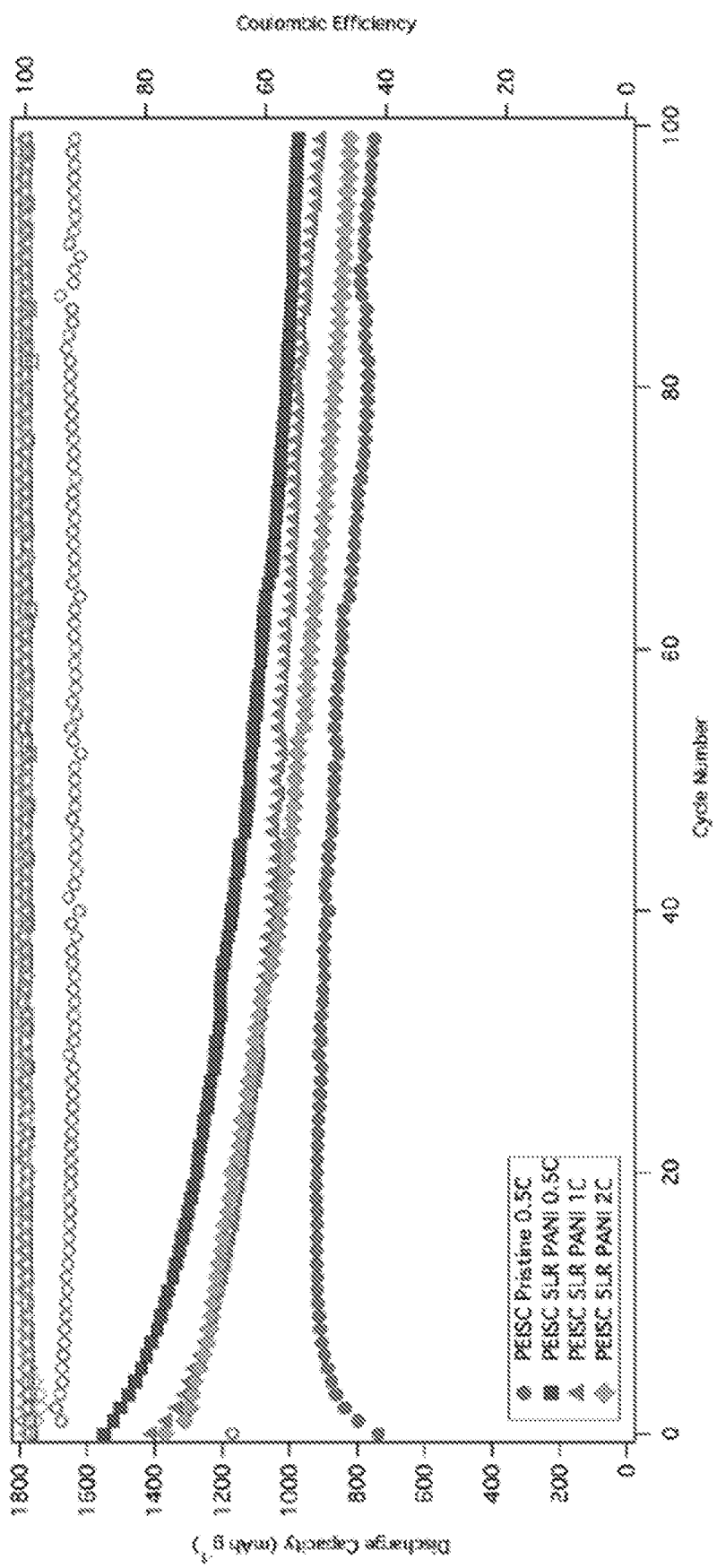
FIG. 36 shows cycling performance of 5LR PANI coated separators and pristine separator with PEISC and 0.05M LiNO$_3$ in the electrolyte Li—S cells for 100 cycles at three different C rates.

To investigate the effectiveness of the resultant membranes in regulating LiPS transport and utilization in Li—S cells, membranes based on the individual components with 1 to 5 layers (~3 μm to ~15 μm thick) were studied as separators in Li—S cells and the results compared with those based on the laminated MWCNT-PANI/titania/PANI design. FIG. 34 describes the cycling performance of the Li—S cells with 1, 3, and 5 coating layers of PANI alone on the separator, with 1M LiTFSI in a 1:1 DME/DOL solvent mixture with no LiNO$_3$ as electrolyte, polyethylenimine-MWCNT-sulfur composite cathode (PEISC) and Li metal anode. It is apparent in FIG. 34 that improved capacity retention and higher Coulombic efficiency (CE) are achieved as the number of PANI coatings increases on the separator. For the 5LR PANI separator, a capacity of ~1000 mAh g$^{-1}$ and 96% CE are achieved at the 100$^{th}$ cycle for a fixed 0.5 C discharge/charge rate. This can be compared to the results for the uncoated/pristine separator, which exhibits a capacity of 430 mAh g$^{-1}$ and CE of 80% after the 100$^{th}$ cycle at 0.5 C. The voltage profiles of 5LR PANI separator are shown in FIG. 34. FIG. 35 provides a more comprehensive account of the electrochemical cycling behaviors of the Li—S cells with 5LR PANI separator where results at three different C rates: 0.5 C, 1 C, and 2 C are described. At the 100$^{th}$ cycle, capacities of ~1000 mAh g$^{-1}$, ~860 mAh g$^{-1}$, ~740 mAh g$^{-1}$, and ~97% CE are obtained for 0.5 C, 1 C, and 2 C, respectively. The voltage profiles of 5LR PANI at three different C rates are shown in FIG. 35. For comparison, FIG. 36 shows the cycling performance of Li—S cells with 5LR PANI separator at 0.5 C, 1 C, and 2 C when 0.05M LiNO$_3$ is added in the electrolyte. Li—S cells with the 5LR PANI on the separator achieved ~99.9% CE for 100$^{th}$ cycles with the small amount of LiNO$_3$ in the electrolyte. The control's CE, however, remained ~91% in the presence of small amount of LiNO$_3$ due to more severe shuttling effect compare to that of the modified separator cells. The capacity retention, on the other hand, increased in the control due to the large number of amine groups in PEI chains, which anchor LiPS in the cathode. With the 5LR PANI coated separator at 100$^{th}$ cycle, capacities of ~1000 mAh g$^{-1}$, ~900 mAh g$^{-1}$, ~830 mAh g$^{-1}$, and ~99.9% CE are obtained for 0.5 C, 1 C, and 2 C, respectively. The voltage profiles of 5LR PANI at three different C rates are shown in FIG. 36.

Figure 30:
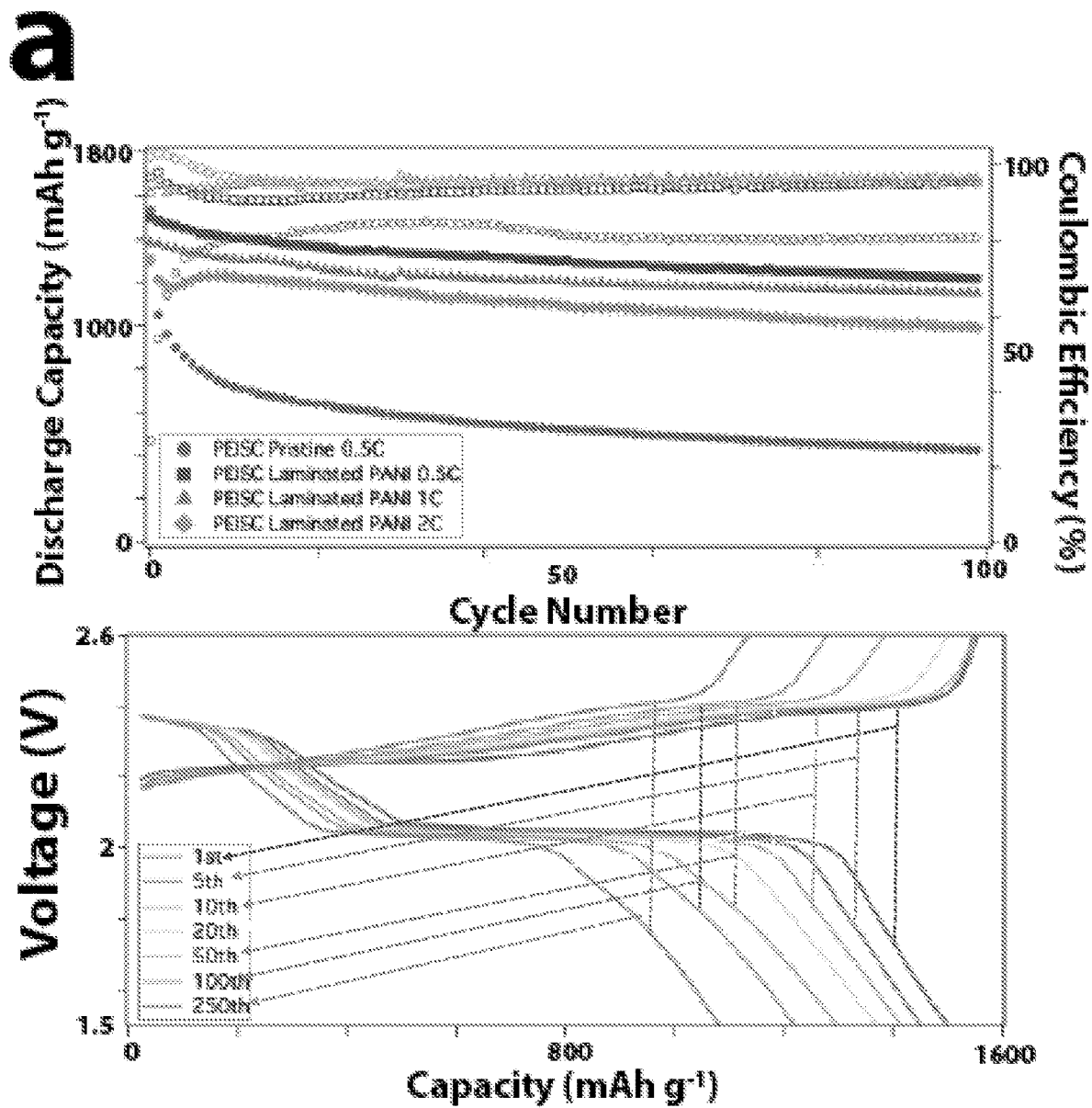
FIG. 30 shows (a) cycling performance of the laminated PANI separator and pristine separator with PEISC and no LiNO$_3$ in the electrolyte Li—S cells for 100 cycles at three different C rates and the voltage profiles of the laminated PANI separator with PEISC at 0.5 C for various cycles. (b) Cycling performance of the laminated PANI separator and pristine separator with PEISC and 0.05M LiNO$_3$ in the electrolyte Li—S cells for 100 cycles at three different C rates and the voltage profiles of the laminated PANI separator with PEISC at 0.5 C for various cycles. (c) Various C rate cycling performances of PEISC with the laminated PANI separator and 5LR PANI coated separator with no LiNO$_3$ in the electrolyte Li—S cells for 100 cycles. (d) Cyclic voltammetry measurement of the laminated PANI separator with PEISC and no LiNO$_3$ in the electrolyte Li—S cell. (e) Cycling performance of the laminated PANI separator and pristine separator with VISC and no LiNO$_3$ in the electrolyte Li—S cells for 100 cycles at 0.5 C and the voltage profiles of the laminated PANI separator with VISC at 0.5 C for various cycles. (f) Cycling performance of the laminated PANI separator and pristine separator with VISC and 0.05M LiNO$_3$ in the electrolyte Li—S cells for 100 cycles at 0.5 C and the voltage profiles of the laminated PANI separator with VISC at 0.5 C for various cycles. (g) Long time cycling performances of the laminated PANI separators with PEISC and VISC without LiNO$_3$ in the electrolyte Li—S cells at 0.5 C.
Figure 30:
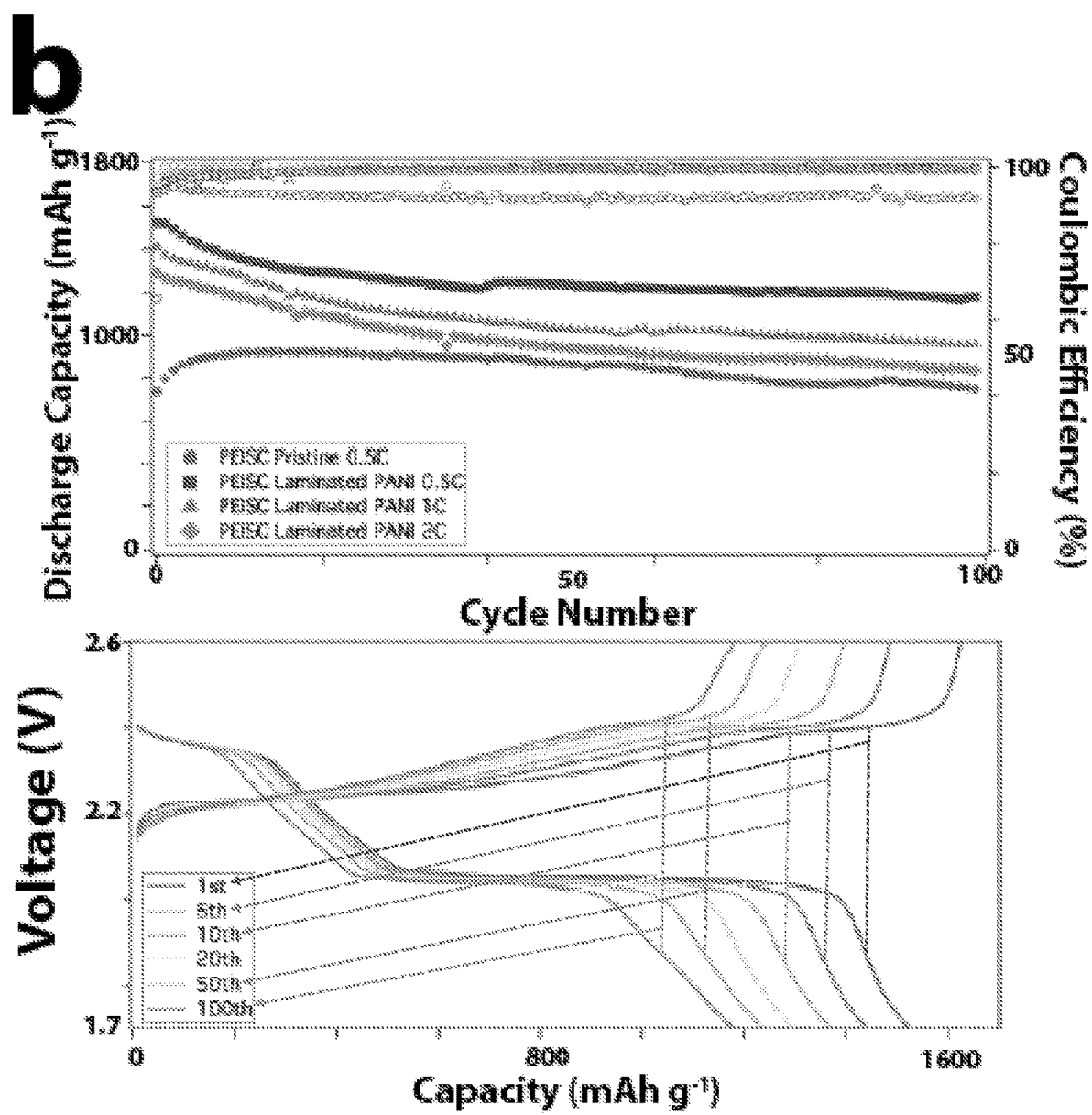
Figure 30:
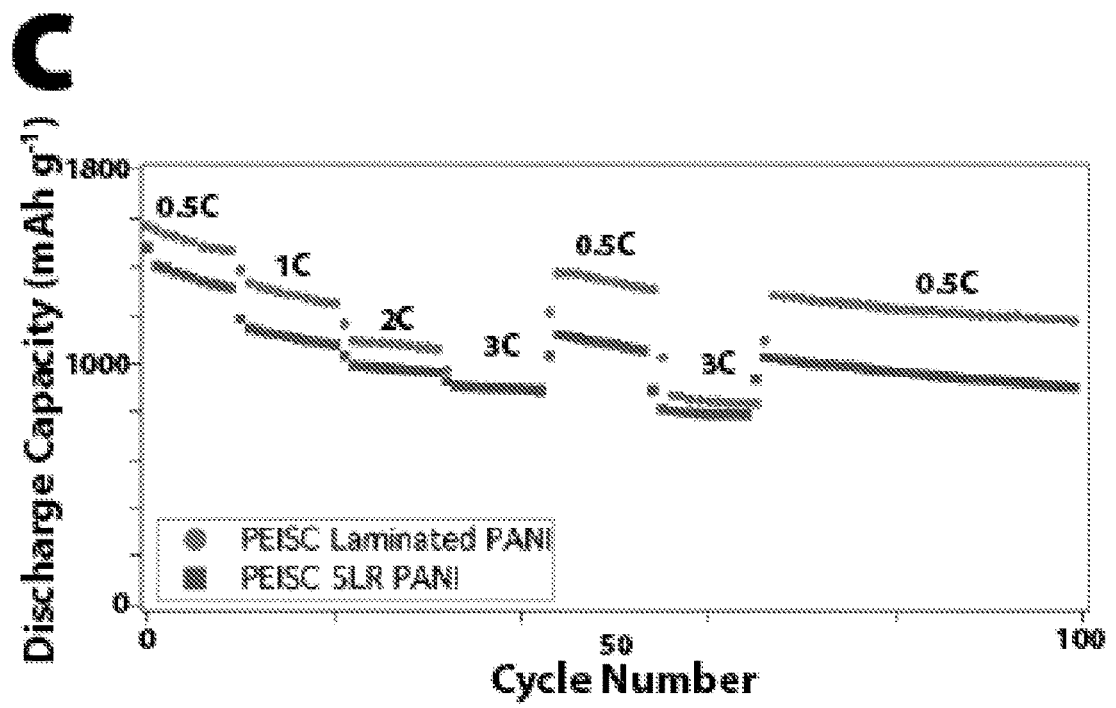
Figure 30:
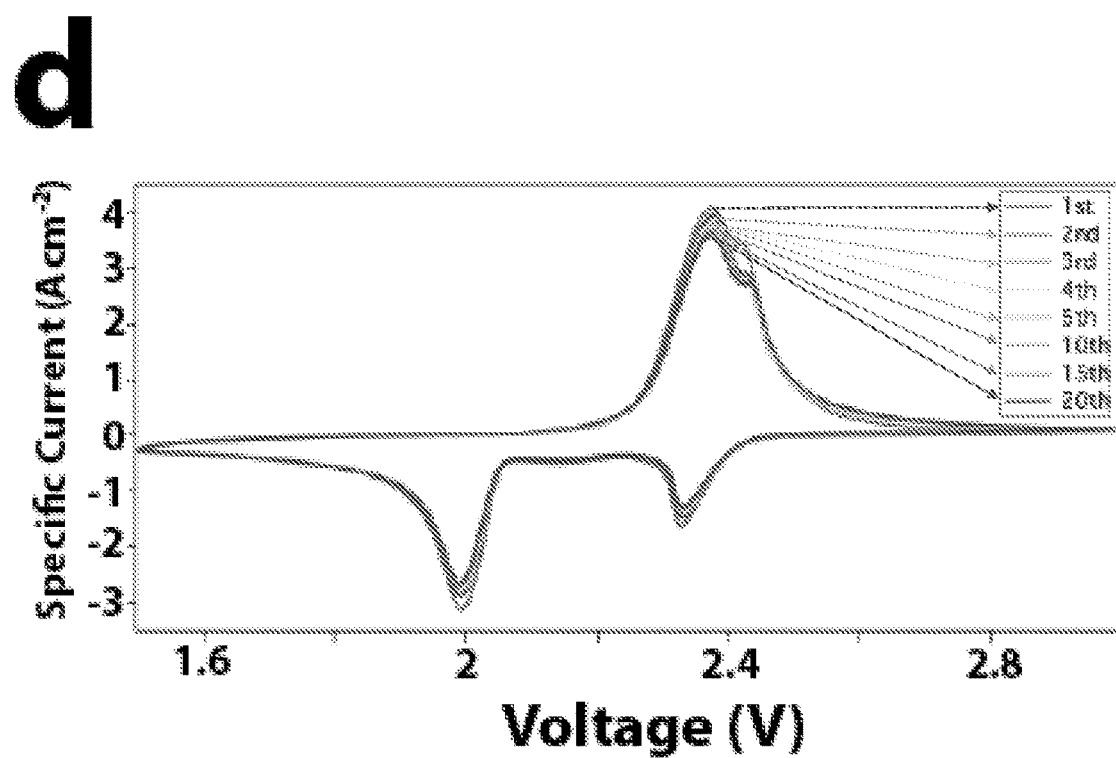
Figure 30:
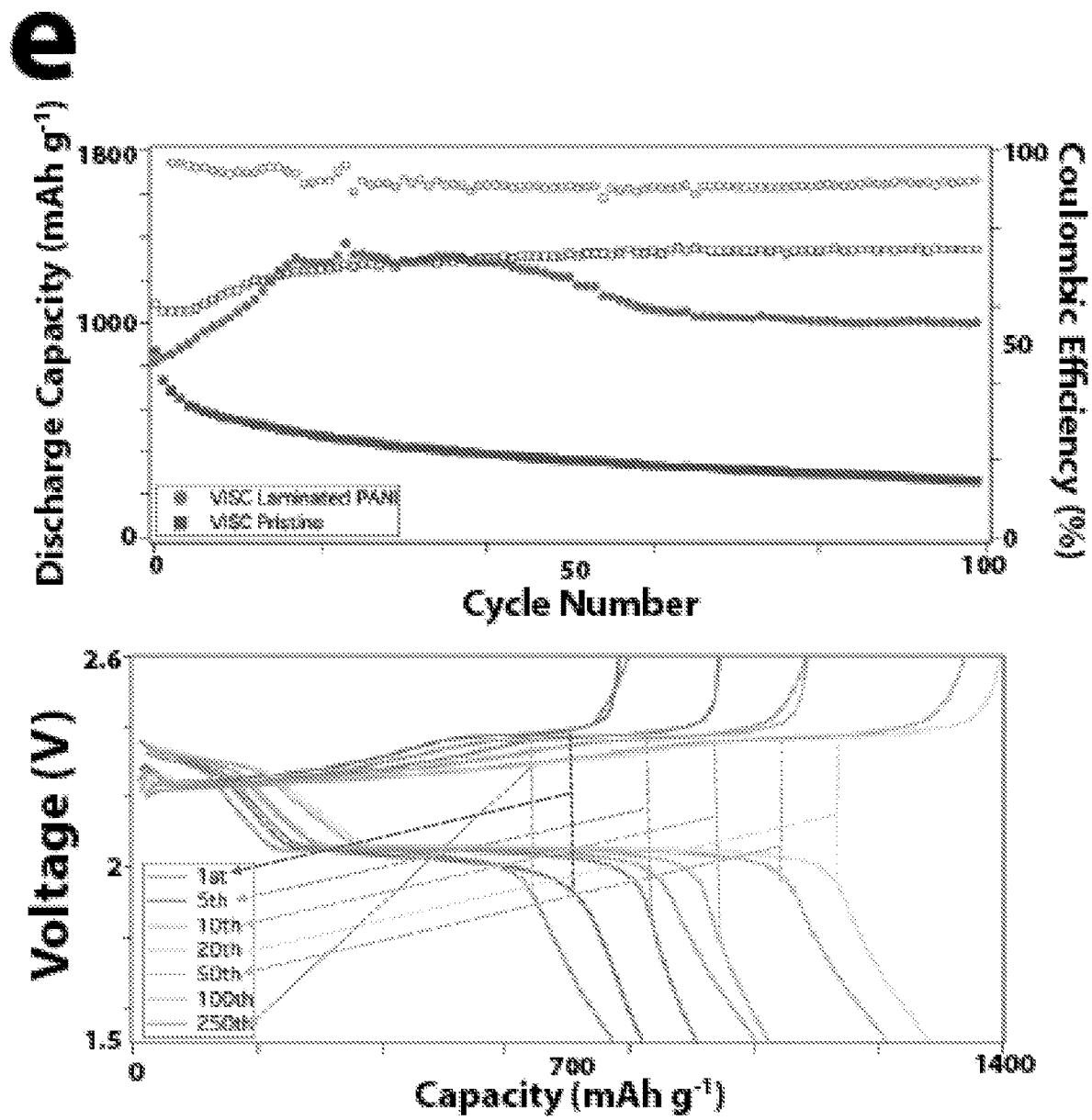
Figure 30:
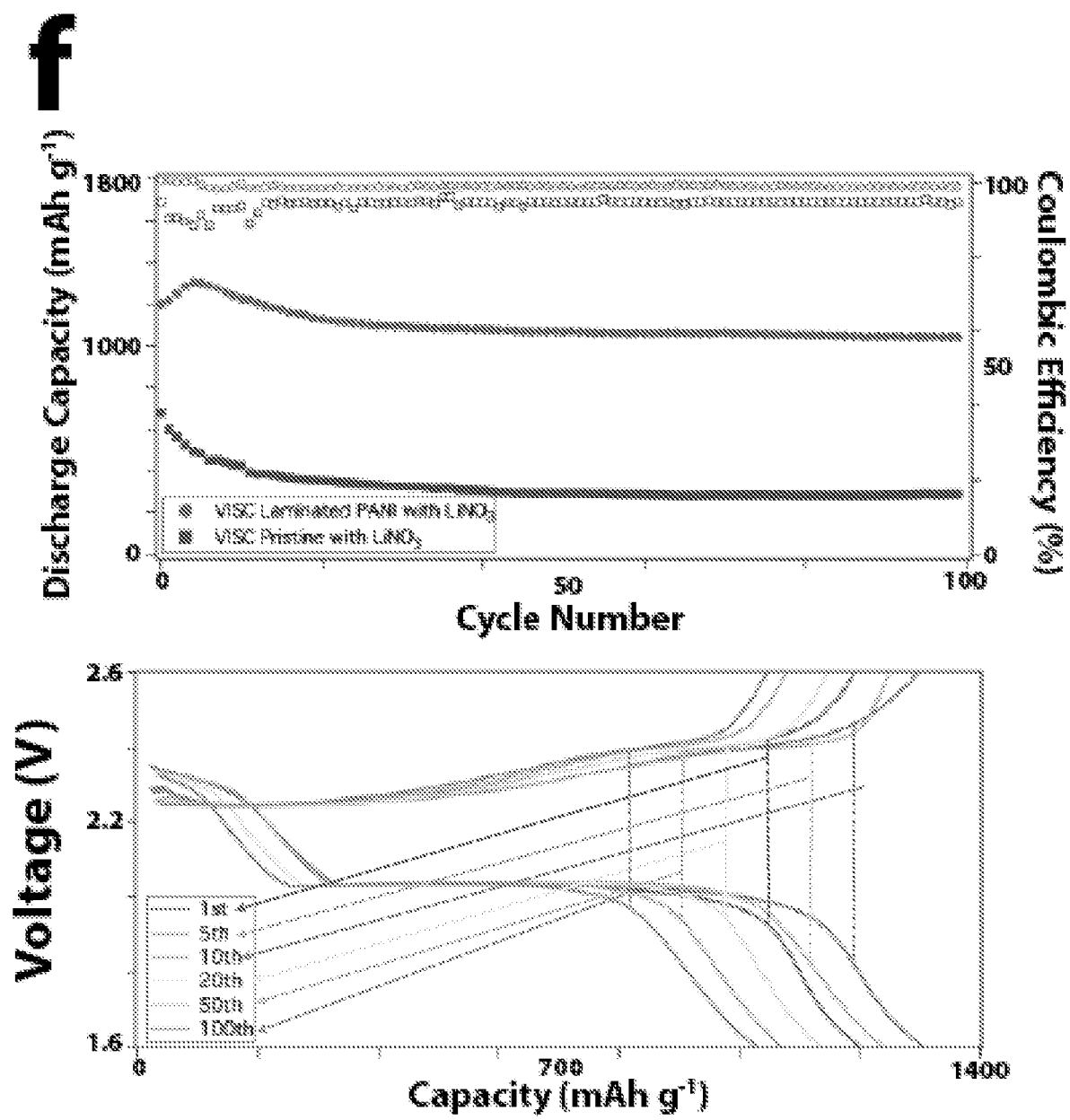
Figure 30:
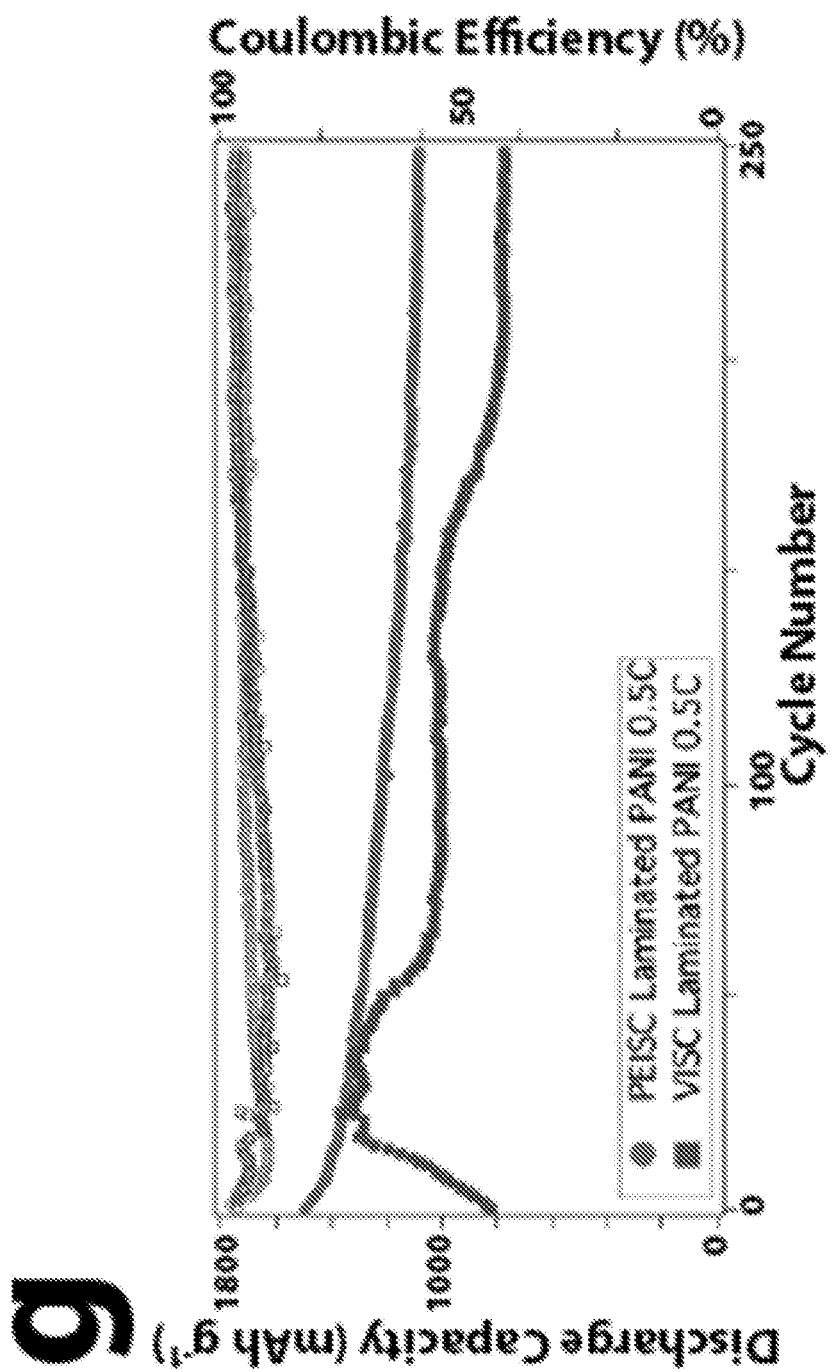
Figure 37:
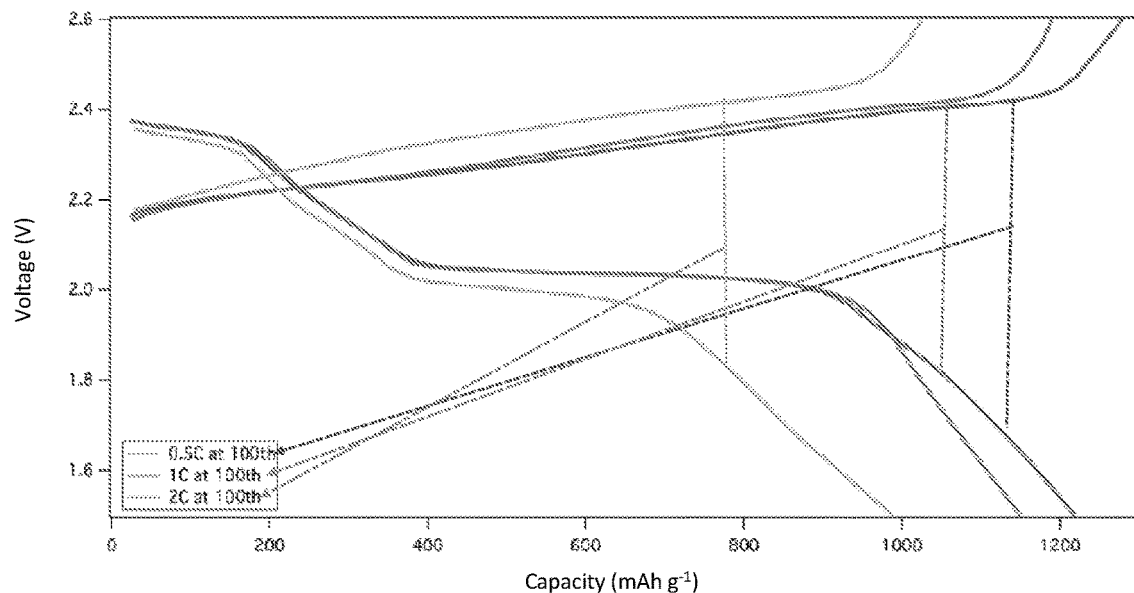
FIG. 37 shows (a) voltage profiles of the laminated PANI separator with PEISC and without LiNO$_3$ in the electrolyte Li—S cells at 100$^{th}$ cycle for three different C rates. (b) Voltage profiles of the laminated PANI separator with PEISC and with 0.05M LiNO$_3$ in the electrolyte Li—S cells at 100$^{th}$ cycle for three different C rates.
Figure 37:
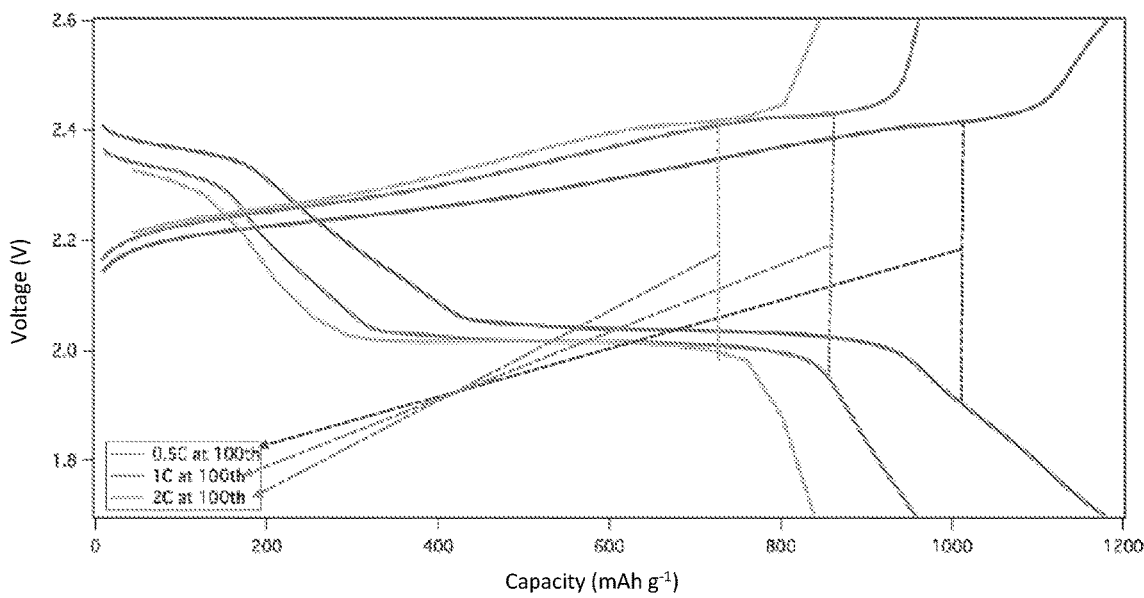

Next, we consider Li—S cells based on the laminated membrane composed of ~80 nm thick (1LR) MWCNT, ~9 μm thick (3LR) PANI, and ~900 nm thick (3LR) titania NP on Celgard™. In comparison to the single-component 5LR PANI (thickness of ~15 μm and mass loading of ~500 μg cm$^{-2}$)-based membranes assessed in the last section, the laminated PANI coating though more complex is thinner (~10 μm) and introduces a lower material mass (400 μg cm$^{-2}$) to the Li—S cell. FIG. 30a describes cycling performance and voltage profiles for Li—S cells based on these laminated membranes. It is seen that capacities of 1220 mAh g$^{-1}$, 1150 mAh g$^{-1}$, and 1000 mAh g$^{-1}$ are obtained at 0.5 C, 1 C, and 2 C, respectively, with ~97% CE at 100$^{th}$ cycle. Comparison with the results from the uncoated membranes shows that the capacity has approximately doubled and the CE increased markedly. It is instructive to compare these results with analogous ones described for other materials configurations, e.g. cation-shield (CE ~95%) and ionomer film (CE~97%) described previously for regulating LiPS mass transport and shuttling in Li—S cells. It is apparent that the CE values achieved for the laminated PANI membranes are comparable with those described for single ion conductors. A small amount of LiNO$_3$ (0.05M) was added in the electrolyte to observe its effect on electrochemical performance of Li—S cells with laminated membranes. As expected, (FIG. 30b) CE values approaching 99.9% are achieved without affecting cell capacity and cycling stability. Voltage profiles of the laminated PANI separator Li—S cells at three different C rates with/without LiNO$_3$ in the electrolyte is shown in FIG. 37. Moreover, various C rate performance is measured with the laminated PANI separator with no LiNO$_3$ in the electrolyte (See FIG. 30c). As the C rates increase (0.5 C to 1 C, 1 C to 2 C, 2 C to 3 C), 14%, 15%, and 17% decrease in the capacity is observed with the recovery capacity of 1310 mAh g$^{-1}$, which is 10% decrease from the previous 0.5 C cycling, after cycling the cell from 0.5 C to 3 C for 10 cycles at each C rates. Comparing this result with the Li—S cell with 5LR PANI separator, higher recovery capacity is obtained (Laminated PANI: 1310 mAh g$^{-1}$ & 5LR PANI: 1110 mAh g$^{-1}$) for the laminated PANI without losing the high C rate performances even though lesser amount of PANI is used. Together, these results provide strong support for our hypothesis that membranes based on laminated PANI structures simultaneously provide a path towards high energy and high power Li—S cells by regulating transport of LiPS without compromising active material utilization in the cathode.

FIG. 30d describes cyclic voltammograms of the Li—S cell with laminated PANI separator for LiNO$_3$ free system. Scan rate of 0.1 mV s$^{-1}$ and voltage window of 1.5V-3V is used to perform the measurement. The cathodic scans show distinctive voltage plateaus at 2.3V and 2V. The first peak at 2.3V represents cyclic sulfur breaking and forming high order LiPS ions whereas the next peak at 2V represents the reduction of high order LiPS ion to low order LiPS. This voltage plateaus are typical for Li—S cells that represent two-step reduction process of elemental sulfur. For the anodic scans, the distinctive voltage plateaus, oxidation peaks, are observed at 2.37V and 2.43V based on the phase transition mechanism. Stable anodic and cathodic peak positions are achieved for several cycles. Hence, highly reversible electrochemical reactions are confirmed for the Li—S cell with laminated PANI separator without LiNO$_3$ in the electrolyte.

A disadvantage of the PEISC is relatively low sulfur loading (1.2 mg cm$^{-2}$ S and content of 50% S). State-of-the-art Li—S cells require substantially higher sulfur loadings and content in the cathode. As more rigorous tests of the laminated PANI membranes, we also assessed the materials, vapor infused sulfur cathode (VISC), in Li—S cells with higher sulfur loading (3.5 mg cm$^{-2}$ S and 68% S), created by a previously described vapor infusion method. FIG. 30e describes cycling performance and voltage profiles of Li—S cells with both the pristine and laminated PANI separator membranes, with VISC and no LiNO$_3$ in the electrolyte. The control Li—S cell exhibits a capacity of ~270 mAh g$^{-1}$ and 74% CE after 100 cycles at 0.5 C. In contrast the laminated PANI separator displays a capacity of ~1000 mAh g$^{-1}$ and 94% CE after the 100 cycle at 0.5 C. Closer inspection of the cycling results for the VISC using the laminated PANI membrane separator show initial increase in the discharge capacity. This behavior is understood to be a manifestation of the laminated coatings capacity to reutilize LiPS as it is built up in the sorbent layer in the membrane. Our results therefore verify that the laminated PANI membrane separator is capable of cycling high sulfur loading cathodes in cells without LiNO$_3$ in the electrolyte. As before, we also performed studies in which 0.05M LiNO$_3$ is used in the electrolyte (See FIG. 30f). The results show that while similar capacity is observed as for the LiNO$_3$ free case, ~99.9% CE is achieved. FIG. 30e and FIG. 30f describes voltage profiles for the VISC cells with and without LiNO$_3$ in the electrolyte, it is apparent that they are stable in both cases. FIG. 30g shows that these favorable results are preserved in longer term cycling experiments, where Li—S cells with PEISC and VISC and no LiNO$_3$ are observed to yield discharge capacities of 1090 mAh g$^{-1}$ and 96% CE (PEISC) and 780 mAh g$^{-1}$ and 97% CE (VISC) after the 250 discharge cycle at 0.5 C. We therefore conclude that membranes based on the proposed laminated PANI configuration using existing Celgard™ separator as a substrate provide a promising path towards Li—S cells with stable electrochemical performance. The results also show that compact layers of PANI and titania NPs created by LBS work synergistically to improve membrane performance.

Figure 38:
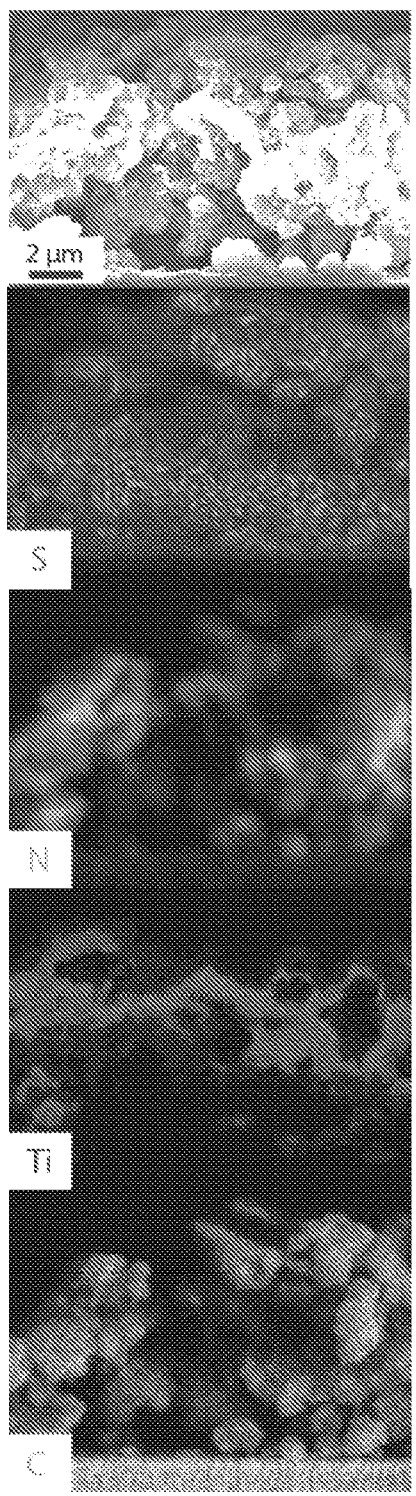
FIG. 38 shows SEM and EDXS (Cross sectional elemental mapping: Sulfur, Nitrogen, Titanium, and Carbon & Top-view elemental mapping: Sulfur and Nitrogen) of the cycled laminated PANI separator with VISC.
Figure 38:
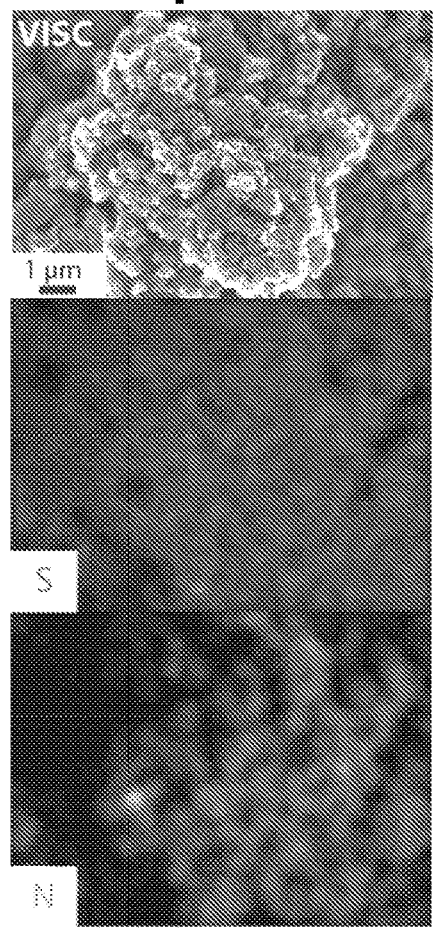

The cycled laminated PANI membranes were investigated via SEM and energy-dispersive X-ray spectroscopy (EDXS). FIG. 38 shows cross sectional and top view SEM and elemental mapping of sulfur, nitrogen, titanium, and carbon on the laminated PANI separator that is cycled 100 times with VISC and no LiNO$_3$ in the electrolyte. The laminated structure is observed to be well maintained after complete 100 cycles. This is due to the property of the PANI, which is known as soft polymer that could withstand the pressures from volumetric expansion of sulfur during the charge-discharge process. A strong field map of sulfur is also apparent in the cross sectional and top view of the laminated PANI-based membranes.

Figure 31:
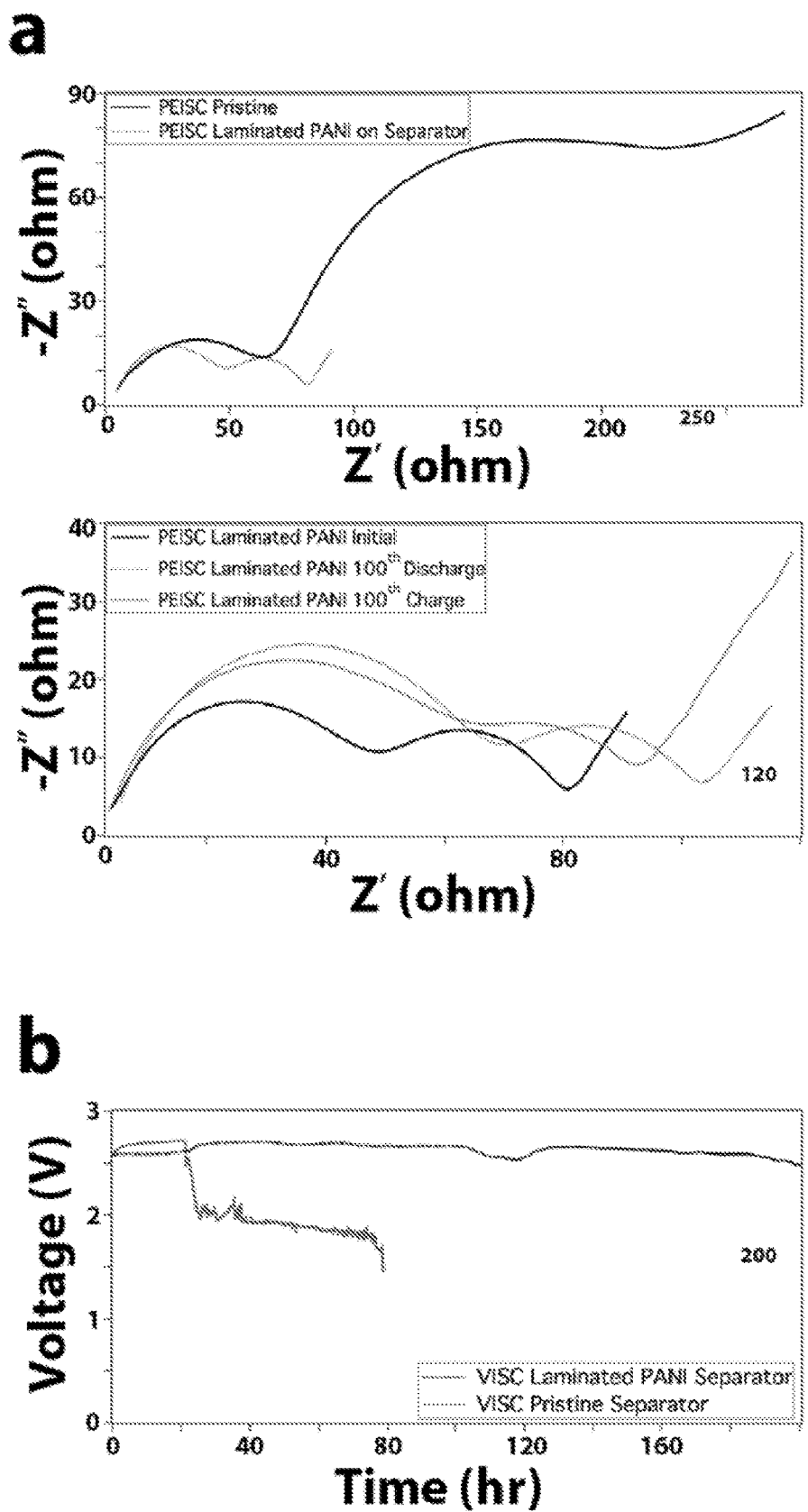
FIG. 31 shows (a) AC impedance measurements of non-cycled Li—S cells without LiNO$_3$ in the electrolyte and PEISC with the pristine and the laminated PANI separator-upper data and cycled corresponding Li—S cell with the laminated PANI separator after 100$^{th}$ discharge and charge-bottom data. (b) Self-discharge of pristine and the laminated PANI separators with VISC and no LiNO$_3$ in the electrolyte Li—S cells. (c) Li—S cells comparison data of 100$^{th}$ discharge capacity versus sulfur loading at three different C rates for our work and other literature works.
Figure 31:
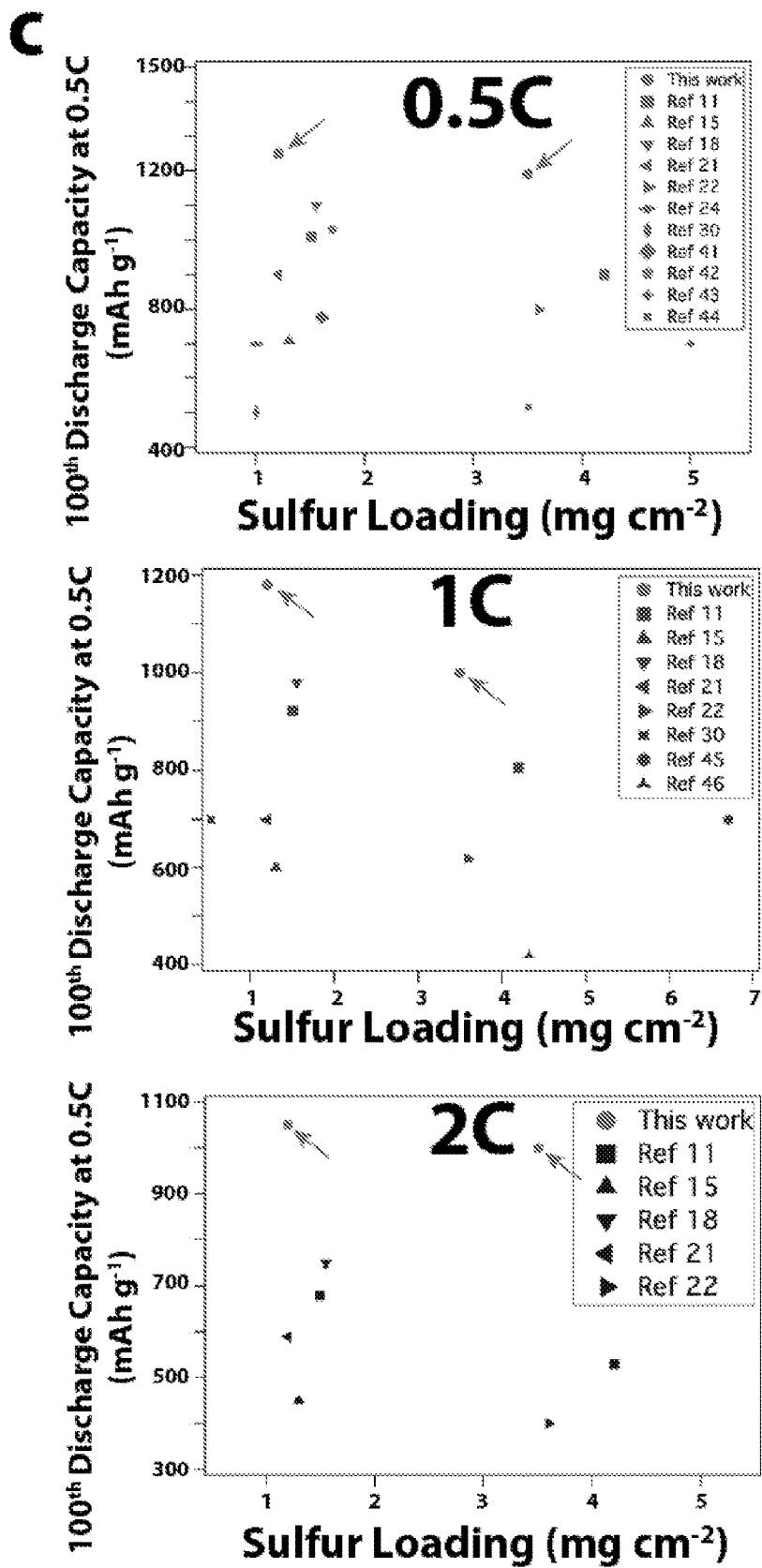

FIG. 31a shows the AC impedance (ACI) of Li—S cells with pristine and the laminated PANI separators with VISC and no LiNO$_3$ in the electrolyte for before and after cycling. The upper ACI data shows the impedance comparison between the Li—S cells with the laminated PANI and pristine separator before cycling, and lower impedance is measured for the laminated PANI separator Li—S cell indicating that the high conductivity of PANI helps to reduce the interfacial impedance. The bottom ACI data shows the impedance data of the laminated PANI separator Li—S cell before and after 100th cycle. Slight increase of impedance is observed after 100th discharge. This is because the laminated PANI coatings adsorb LiPS which increases the interfacial impedance. After 100th charge, the impedance gets lower than that of 100th discharge but higher than that of initial. This is due to the adsorbed LiPS is reutilized during the charge process which lowers the interfacial impedance, and since sulfur is present on the surface of the coatings on the separator, higher impedance is measured compared to the initial impedance measurement which the surfaces are free from LiPS and sulfur. Hence, reutilization and lower impedance of adsorbed LiPS is observed with the laminated PANI separator. We also performed self-discharge experiment with the laminated PANI separator Li—S cells with VISC and no LiNO$_3$ in the electrolyte (See FIG. 31b). With the laminated PANI separator, the Li—S cell can stably remain as initial state >200 hours whereas the Li—S cell with the pristine separator fails after 20 hours. This indicates that the top surface of PANI on the cathode provides a protection layer to alleviate the loss of sulfur during shelf time.

We compared our results with literature values as shown in FIG. 31c. It is apparent that the Li—S cell performances achieved with the proposed membranes stand out among current literature works in terms of the capacity and high rate performances achievable for high sulfur loadings in the cathode. The effect of the membranes are seen to be more dramatic at high current rates—at 2 C, for example, the results obtained using the laminated membrane separators are superior to all other literature describes at comparable sulfur loading. The high C rate, 2 C, gravimetrical and area capacities of the laminated PANI separator for PEISC and VISC are ~1050 mAh g$^{-1}$ for PEISC& ~1000 mAh g$^{-1}$ for VISC and 3.5 mAh cm$^{-2}$ for VISC & 1.2 mAh cm$^{-2}$ for PEISC.

In this example, we describe a facile coating methodology termed Langmuir-Blodgett-Scooping (LBS) that takes advantage of self-assembly and Marangoni stresses at an air/water interface to rapidly create multifunctional coatings of polyaniline (PANI), titania nanoparticles (titania NP), multi-walled carbon nanotube (MWCNT) and combinations of these materials on porous and non-porous solid supports. More generally, the LBS method is used to create nanoparticle and polymer coatings with single-particle/molecule thickness resolution on any non-reactive substrate, without the need for binders. The LBS technique is expected to be able to be applied in the industry in the near future because the method allows simple mechanisms to create well-ordered nanoparticles films and inexpensive/nonhazardous chemicals for the coating process. Sequential applications of the approach allows us to fabricate thin, multifunctional PANI/titania/PANI/MWCNT coatings in a layer-by-layer configuration on a polyolefin separator used for lithium-sulfur (Li—S) batteries. Application of the resultant membranes (separator+multifunctional coatings) to Li—S batteries is shown to enable cells with high capacity and stable cycling over a range of discharge rates (~1220 mAh g$^{-1}$, ~1150 mAh g$^{-1}$, and ~1000 mAh g$^{-1}$ are obtained at 0.5 C, 1 C, and 2 C respectively, with ~97% CE at 100th cycle), without the need for LiNO$_3$ additives in the electrolyte.

Preparation of PEISC and VISC: PEISC—The sulfur is infused to PEI attached MWCNT matrix as previously described. The S@C composite (80 wt %) was mixed with Super P (10 wt %) and polyvinylidene fluoride (10 wt %) dissolved in N-methyl-2-prolidone (15 wt %) in N-methyl-2-prolidone, and the mixture is ball-milled at 50 rev s$^{-1}$ for 30 minutes. The resulting viscous slurry was coated onto a carbon sprayed aluminum foil as a current collector using doctor-blade method. The coated slurry is then dried in a convection oven at 60° C. for 5 hours. The prepared electrode (1.2 mg cm$^{-2}$ S & 50% S) is cut into a circular disk.

VISC—sulfur was vapor-infused into the carbon fiber matrix via high temperature method. The S@C composite (85 wt %) was mixed with vapor grown carbon fiber (10 wt %) and polyvinylidene fluoride (5 wt %) dissolved in N-methyl-2-prolidone (15 wt %) in N-methyl-2-prolidone, and the mixture is ball-milled at 50 rev s$^{-1}$ for 30 minutes. The sulfur cathodes (3.5 mg cm$^{-2}$ S and 68% S) are prepared by coating the composite onto a carbon sprayed Al foil. Including coating materials of the laminated PANI, the sulfur contents for PEISC (43% S) and VISC (63% S) are achieved. The cathode size (1.266 cm$^2$) is used for the cathodes. Including the weight of the coating materials for laminated PANI separator, the sulfur content for VISC and PEISC are 63% and 43%, respectively.

Coating Process: Separator (Celgard™ 2500) is cut into a circular disk (1.6 cm diameter). A cover glass (1.8 by 1.8 cm) is used as a substrate for the cut separators. The separator is placed on top of the cover glass and the edges of the separator is taped with Kapton tape. LBS method requires tap water, prepared suspensions, a beaker, and micropipette. Prepared separator is quickly rinsed with running water. The suspension (<1 mL) is injected at the surface water via a neck of the beaker. During the self-assembly process, the separator is slowly raised followed by constant injection of the suspension. After single coating layer of desired material is coated on the separator, the coated separator is then dried on a hotplate (110° C.) for less than a minute. After coating a single layer, a drop of isopropanol (IPA) is applied to the coated separator to uniformly wet the surface with water, and the separator is remained in clean water about 10~20 seconds. After fully wetting the coated separator, another LBS coating is performed until desired number of layers and materials are coated. After desired numbers of coatings are achieved, the separator is dried on the hotplate (125° C.) for 1 minute to fully remove any moisture on the separator. To fabricate the laminated PANI structure, single coating of MWCNT is applied on the separator. After drying, a drop of IPA is used to fully wet the separator surface and remained inside of the clean water ~15 seconds. After MWCNT coating, 2 coatings of PANI are made on the separator followed by 3 coating layers of titania NP and ending with another layer of PANI. Each coating methods is same as mentioned above to coat these materials. After the final drying, the separator is removed from the cover glass substrate and used to fabricate Li—S cells.

Battery assembly: CR2032-type coin cells are used to make Li—S cells. Prepared separators, Li foil disks (0.5 inch in diameter), prepared cathodes, stainless-steel springs and spacers, and the electrolytes (40 μL, 1M Bis(trifluoromethane)sulfonamide lithium salt (LiTFSI, Sigma Aldrich) in DME:DOL (1:1 v/v) electrolyte with/without 0.05M LiNO$_3$) are used to assemble Li—S cells. First, electrolyte (20 μL) is applied onto coated side of the separator, and cathode is placed on top of the separator. Then, another half amount of the electrolyte is applied at the other side of the separator, and Li foil is placed. On top of the Li, stainless steel disk is placed, and the spring is placed next. After all the components are assembled, the coin cell is punched (15 MPa). The cell is rested around 15 minutes before testing. The assembly process is carried out in Ar filled gaseous environment (MBraun Labmaster).

Characterization: The assembled Li—S cells are tested at room-temperature and evaluated under galvanostatic conditions using Neware CT—3008 battery testers. Two voltage windows are chosen for Li—S systems that involve LiNO$_3$ co-salt in the electrolyte. Without the co-salt, 1.5V to 2.6V voltage window is chosen whereas with the co-salt, 1.7V to 2.6V voltage window is chosen to prevent the degradation on the passivation layer formed by LiNO$_3$ at the surface of Li. Cyclic voltammetry measurements are done by CHI600D potentiostat, and scan rate (0.1 mV s$^{-1}$) and voltage window (1.5V to 3V) is used during the analysis. LEO 1550 FESEM is used for SEM and EDXS analysis with 5 kV and 10 kV acceleration voltages. AC impedance spectroscopy is measured using Novocontrol N40 broadband dielectric spectroscopy. KSV NIMA L & LB Troughs equipment is used to characterize the films qualities and measure surface pressure profiles of the materials. The trough (7.5 cm×32.4 cm, See FIG. 32) is cleaned using pure ethanol and DI water to rinse off all contaminants. The trough is filled up with DI water. For LBT measurement, suspension (~3 mL) is spread at the surface of water and rested about 5 to 7 minutes to evaporate remaining ethanol from the suspension. The floating particles are compressed via mechanical barriers (3 mm min$^{-1}$) and the surface pressure profiles are measured. For LBS measurement, the trough area (~25 cm$^2$) is matched with the side of the beaker to compare actual coating process. The surface pressure profile is measured during the self-assembly process, and the fully formed films are compressed (3 mm min$^{-1}$) without resting to collect the full profiles.

Although the present disclosure has been described with respect to one or more particular embodiments and/or examples, it will be understood that other embodiments and/or examples of the present disclosure may be made without departing from the scope of the present disclosure.

What is claimed is:

1. A method of making an organized material on a substrate, wherein the organized material comprises one or more monolayers of nanoparticles disposed on at least a surface of a substrate and each monolayer of the layer is a close-packed arrangement of the nanoparticles, comprising:
   a) providing a coating composition in a container comprising:
      a monolayer of organized materials disposed on a liquid material comprising water and one or more additional liquid components that have lower surface tension than water, wherein the one or more additional liquid components is/are one or more alcohols; and
   b) transferring the monolayer of organized materials to the substrate, wherein the organized material on the substrate is formed.

2. The method of claim 1, wherein the monolayer of organized materials is transferred by dip coating.

3. The method of claim 1, wherein the monolayer of organized materials is transferred continuously to a substrate that is translated through the monolayer.

4. The method of claim 1, wherein the method is a continuous process.

5. The method of claim 1, wherein the one or more additional liquid components that have lower surface tension than water results in a surface tension gradient and formation of the organized materials.

6. The method of claim 1, wherein the organized material comprises particles having at least one dimension of 10 nm to 5,000 nm.

7. The method of claim 6, wherein the organized material comprises inorganic particles, organic particles, or a combination thereof.

8. The method of claim 7, wherein the inorganic particles are metal and/or metalloid particles, metal and/or metalloid oxide particles, or a combination thereof.

9. The method of claim 8, wherein the metal and/or metalloid particles comprise aluminum, copper, gold, lithium, magnesium, manganese, molybdenum, nickel, tin, titanium, zinc, silver, silicon, boron, germanium, sulfur, or a combination thereof and/or the metal oxide and/or the metalloid oxide particles comprise alumina, cobalt oxides, cupric oxides, hafnium oxides, iron oxides, lithium oxide, nickel oxides, manganese oxides, molybdenum oxides, palladium oxides, silver oxides, sodium oxide, tin oxides, titanium oxides, zinc oxide, germanium oxide, boron oxides, silicon oxides, or a combination thereof.

10. The method of claim 7, wherein the organic particles are carbon-material particles or polymer particles.

11. The method of claim 10, wherein the carbon-material particles are selected from carbon nanotubes (CNTs), functionalized CNTs, graphene, graphene oxides, reduced graphene oxides, graphites, fullerenes, buckytubes, diamond, amorphous carbons, vapor-grown carbon nanofibers, Super P carbon, Ketjen Black carbon, carbon fibers, hard carbons, hollow carbon nanoparticles, microporous carbon nanoparticles, mesoporous carbon nanoparticles, carbon nanorattles, and combinations thereof and/or the polymer particles are selected from polyaniline nanoparticles, polyacrylic acid, polyacrylates, polyacrylonitriles, polycarbonates, polyethers, polyolefins, polyimides, polymethylmethacrylate, polystyrenes, halogenated analogs thereof, and combinations thereof.

12. The method of claim 1, wherein the substrate comprises a reactive metal and/or metalloid external surface, a carbon surface, silicon oxide surface, or a silicon carbide surface or the substrate comprises a material selected from metal oxides, metal nitrides, metal carbonates, and nonmetals.

13. The method of claim 1, wherein two or more monolayers are formed on the substrate.

14. The method of claim 13, wherein all of the monolayers comprise the same material or at least two of the monolayers comprise different materials.

15. The method of claim 1, wherein the substrate comprises a first surface and a second surface and wherein the first surface and second surface are opposite surfaces of the substrate.

16. The method of claim 15, wherein at least one monolayer disposed on the first surface is a different material than at least one monolayer disposed on the second surface of the substrate.

17. The method of claim 16, wherein the substrate is a current collector, electrode, or separator.

18. A method of making an organized material on a substrate, wherein the organized material comprises one or more monolayers of organized materials disposed on at least a surface of a substrate and each monolayer is a close-packed arrangement of the organized materials, comprising:
a) providing a coating composition in a container comprising:
a monolayer of organized materials disposed on a liquid material comprising water and one or more additional liquid components that have lower surface tension than water, or
a monolayer of organized materials disposed on a liquid material comprising water and a surfactant, wherein the surfactant does not function as a dispersant in the coating composition; and
b) transferring the monolayer of organized materials to the substrate,
wherein the organized material on the substrate is formed, wherein additional materials are added to the coating composition as the monolayer of organized materials is transferred to the substrate.

19. A method of making an organized material on a substrate, wherein the organized material comprises one or more monolayers of organized materials disposed on at least a surface of a substrate and each monolayer is a close-packed arrangement of the organized materials, comprising:
a) providing a coating composition in a container comprising:
a monolayer of organized materials disposed on a liquid material comprising water and one or more additional liquid components that have lower surface tension than water, or
a monolayer of organized materials disposed on a liquid material comprising water and a surfactant, wherein the surfactant does not function as a dispersant in the coating composition; and
b) transferring the monolayer of organized materials to the substrate,
wherein the organized material on the substrate is formed, wherein the monolayer is transferred to a second substrate by physically contacting the organized material on the substrate with the second substrate and application of pressure.

20. A method of making an organized material on a substrate, wherein the organized material comprises one or more monolayers of nanoparticles disposed on at least a surface of a substrate and each monolayer of the layer is a close-packed arrangement of the nanoparticles, comprising:
a) providing a coating composition in a container comprising:
a monolayer of organized materials disposed on a liquid material comprising water and a surfactant, wherein a mixture of the materials and water is formed and, subsequently, the surfactant is added, and wherein the surfactant does not function as a dispersant in the coating composition; and
b) transferring the monolayer of organized materials to the substrate,
wherein the organized material on the substrate is formed, and
wherein addition of the surfactant results in a surface tension gradient and formation of the organized monolayer of materials.

21. The method of claim 20, wherein the monolayer of organized materials is transferred by dip coating.

22. The method of claim 20, wherein the monolayer of organized materials is transferred continuously to a substrate that is translated through the monolayer.

23. The method of claim 20, wherein the method is a continuous process.

24. The method of claim 20, wherein the organized material comprises particles having at least one dimension of 10 nm to 5,000 nm.

25. The method of claim 20, wherein the organized material comprises inorganic particles, organic particles, or a combination thereof.

26. The method of claim 25, wherein the inorganic particles are metal and/or metalloid particles, metal and/or metalloid oxide particles, or a combination thereof.

27. The method of claim 26, wherein the metal and/or metalloid particles comprise aluminum, copper, gold, lithium, magnesium, manganese, molybdenum, nickel, tin, titanium, zinc, silver, silicon, boron, germanium, sulfur, or a combination thereof and/or the metal oxide and/or the metalloid oxide particles comprise alumina, cobalt oxides, cupric oxides, hafnium oxides, iron oxides, lithium oxide, nickel oxides, manganese oxides, molybdenum oxides, palladium oxides, silver oxides, sodium oxide, tin oxides, titanium oxides, zinc oxide, germanium oxide, boron oxides, silicon oxides, or a combination thereof.

28. The method of claim 25, wherein the organic particles are carbon-material particles or polymer particles.

29. The method of claim 28, wherein the carbon-material particles are selected from carbon nanotubes (CNTs), functionalized CNTs, graphene, graphene oxides, reduced graphene oxides, graphites, fullerenes, buckytubes, diamond, amorphous carbons, vapor-grown carbon nanofibers, Super P carbon, Ketjen Black carbon, carbon fibers, hard carbons, hollow carbon nanoparticles, microporous carbon nanoparticles, mesoporous carbon nanoparticles, carbon nanorattles, and combinations thereof and/or the polymer particles are selected from polyaniline nanoparticles, polyacrylic acid, polyacrylates, polyacrylonitriles, polycarbonates, polyethers, polyolefins, polyimides, polymethylmethacrylate, polystyrenes, halogenated analogs thereof, and combinations thereof.

30. The method of claim 20, wherein the substrate comprises a reactive metal and/or metalloid external surface, a carbon surface, silicon oxide surface, or a silicon carbide surface or the substrate comprises a material selected from metal oxides, metal nitrides, metal carbonates, and non-metals.

31. The method of claim 20, wherein two or more monolayers are formed on the substrate.

32. The method of claim 31, wherein all of the monolayers comprise the same material or at least two of the monolayers comprise different materials.

33. The method of claim 20, wherein the substrate comprises a first surface and a second surface and wherein the first surface and second surface are opposite surfaces of the substrate.

34. The method of claim 33, wherein at least one monolayer disposed on the first surface is a different material than at least one monolayer disposed on the second surface of the substrate.

35. The method of claim 20, wherein the substrate is a current collector, electrode, or separator.

* * * * *